(12) United States Patent
Roth et al.

(10) Patent No.: US 7,074,061 B1
(45) Date of Patent: Jul. 11, 2006

(54) VERSATILE COMMUNICATIONS CONNECTORS

(75) Inventors: David Roth, Pasadena, CA (US); Joakim Ahlström, Pasadena, CA (US); David Goetz, Los Angeles, CA (US); Paul H. Glad, Salt Lake City, UT (US)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 09/024,885

(22) Filed: Feb. 17, 1998

Related U.S. Application Data

(63) Continuation-in-part of application No. 08/799,799, filed on Feb. 13, 1997, now Pat. No. 5,773,332, which is a continuation of application No. 08/402,084, filed on Mar. 10, 1995, now abandoned, which is a continuation-in-part of application No. 08/151,249, filed on Nov. 12, 1993, now Pat. No. 5,411,405.

(51) Int. Cl.
*H01R 13/60* (2006.01)

(52) U.S. Cl. ............................... 439/131; 439/638

(58) Field of Classification Search ................ 439/344, 439/676, 131, 638
See application file for complete search history.

(56) References Cited

U.S. PATENT DOCUMENTS

| | | |
|---|---|---|
| 1,989,823 A | 2/1935 | Raabe |
| 3,433,886 A | 3/1969 | Myers |
| 3,553,635 A | 1/1971 | Lundergan et al. |
| 3,613,043 A | 10/1971 | Scheller et al. |
| 3,622,684 A | 11/1971 | Press et al. |
| 3,685,002 A | 8/1972 | Kennedy |
| 3,777,303 A | 12/1973 | McDonough |

(Continued)

FOREIGN PATENT DOCUMENTS

| CA | 2101354 | 1/1994 |
|---|---|---|

(Continued)

OTHER PUBLICATIONS

Research Disclosure, No. 31788, Kenneth Mason Publications Ltd. England, Sep. 1990.*

(Continued)

*Primary Examiner*—Neil Abrams
(74) *Attorney, Agent, or Firm*—Stuart A. Whittington

(57) ABSTRACT

An apparatus for conveying signals between a communications card and a signal utilization device or network. In one form (FIGS. 1,2), structures are provided for receiving an RJ series plug and for making electrical connection with at the contacts on the plug and conveying any signals on the contacts to a communications device such as a telephone, facsimile machine, modem, or a local area network adapter. A body (102) includes one or more recesses (106) which receive the plug. An expandable and stretchable membrane (114) isolates the contacts in the plug from electrical contact with an object in a surrounding environment such that passage of current from one or more of the electrical contacts to an object present in the surrounding environment is prevented. Also provided (FIGS. 7, 14) is a replaceable direct access arrangement (151, 258) which is replaceably held within the communications device (150, 250). Both the structures providing the receptacles and the direct access arrangement are easily removable in case of damage or if other functions are desired. The replaceable direct access arrangement allows operation in countries having different telecommunications standards and allows operation with many different communications devices. Wireless communication is also provided.

42 Claims, 42 Drawing Sheets

U.S. PATENT DOCUMENTS

| | | |
|---|---|---|
| 3,794,956 A | 2/1974 | Dubreuil |
| 4,047,781 A | 9/1977 | DeNigris et al. |
| 4,059,321 A | 11/1977 | Rasmussen et al. |
| 4,103,985 A | 8/1978 | Krolak et al. |
| 4,109,295 A | 8/1978 | Rostek et al. |
| 4,225,209 A | 9/1980 | Hughes |
| 4,241,974 A * | 12/1980 | Hardesty |
| 4,242,721 A | 12/1980 | Krolak et al. |
| 4,303,296 A | 12/1981 | Spaulding |
| 4,482,938 A | 11/1984 | Nordan |
| 4,497,526 A | 2/1985 | Myers |
| 4,511,198 A | 4/1985 | Mitchell et al. |
| 4,603,229 A | 7/1986 | Menchetti |
| 4,611,875 A * | 9/1986 | Clarke et al. |
| 4,648,682 A | 3/1987 | Tubbs |
| 4,679,879 A | 7/1987 | Triner et al. ................ 439/425 |
| 4,734,043 A | 3/1988 | Emert et al. |
| 4,758,168 A | 7/1988 | Awakowiez et al. |
| 4,781,626 A | 11/1988 | Lazarchik .................. 439/680 |
| 4,809,360 A | 2/1989 | Kraft |
| 4,878,848 A | 11/1989 | Ingalsbe |
| 4,944,698 A * | 7/1990 | Siemon et al. .............. 439/676 |
| 4,954,928 A | 9/1990 | Jullien |
| 4,968,260 A | 11/1990 | Ingalsbe |
| 4,969,830 A | 11/1990 | Daly et al. |
| 4,984,982 A | 1/1991 | Brownlie et al. |
| 4,986,762 A | 1/1991 | Keith |
| 4,993,962 A | 2/1991 | Noda et al. |
| 4,997,381 A | 3/1991 | Oh |
| 5,035,641 A | 7/1991 | Van-Santbrink et al. |
| 5,035,649 A | 7/1991 | Collier et al. |
| 5,038,250 A | 8/1991 | Uenaka et al. |
| 5,043,721 A | 8/1991 | May |
| 5,082,450 A | 1/1992 | Warren, Sr. et al. |
| 5,085,591 A | 2/1992 | Warren, Sr. et al. |
| 5,114,356 A | 5/1992 | Taybl et al. |
| 5,122,069 A | 6/1992 | Brownlie et al. |
| 5,132,877 A | 7/1992 | Branan et al. |
| 5,159,533 A | 10/1992 | Kuang |
| 5,182,698 A | 1/1993 | Kobayashi et al. |
| 5,183,404 A * | 2/1993 | Aldous et al. .............. 439/676 |
| 5,196,994 A | 3/1993 | Tanuma et al. |
| 5,242,310 A | 9/1993 | Leung |
| 5,244,397 A | 9/1993 | Anhalt |
| 5,260,994 A | 11/1993 | Suffi |
| 5,285,014 A | 2/1994 | Gilchrist |
| 5,296,692 A | 3/1994 | Shino |
| 5,310,360 A | 5/1994 | Peterson |
| 5,319,516 A | 6/1994 | Perkins |
| 5,336,099 A | 8/1994 | Aldous et al. |
| 5,338,210 A * | 8/1994 | Beckham et al. ........... 439/131 |
| 5,385,479 A | 1/1995 | Okada |
| 5,386,340 A | 1/1995 | Kurz |
| 5,391,083 A | 2/1995 | Roebuck et al. |
| 5,391,094 A * | 2/1995 | Kakinoki et al. ........... 439/638 |
| 5,395,268 A * | 3/1995 | Okada ........................ 439/676 |
| 5,411,405 A * | 5/1995 | McDaniels et al. ......... 439/131 |
| 5,457,601 A | 10/1995 | Georgopulos et al. |
| 5,470,237 A | 11/1995 | Byezek et al. |
| 5,477,418 A | 12/1995 | MacGregor et al. |
| 5,499,923 A | 3/1996 | Archibald et al. |
| 5,505,628 A | 4/1996 | Ramey et al. |
| 5,505,633 A | 4/1996 | Broadbent |
| 5,509,811 A | 4/1996 | Homic |
| 5,532,898 A | 7/1996 | Price |
| 5,537,436 A | 7/1996 | Bottoms et al. |
| 5,538,442 A | 7/1996 | Okada |
| 5,547,401 A | 8/1996 | Aldous et al. |
| 5,548,483 A | 8/1996 | Feldman |
| 5,561,727 A | 10/1996 | Akita et al. |
| 5,562,463 A | 10/1996 | Tan |
| 5,562,504 A | 10/1996 | Moshayedi |
| 5,608,606 A | 3/1997 | Blaney |
| 5,608,607 A | 3/1997 | Dittmer |
| 5,611,055 A | 3/1997 | Krishan et al. |
| 5,619,396 A | 4/1997 | Gee et al. |
| 5,628,055 A | 5/1997 | Stein |
| 5,634,802 A | 6/1997 | Kerklaan |
| 5,637,018 A | 6/1997 | Gargiulo |
| 5,679,013 A | 10/1997 | Matsunaga et al. |
| 5,692,914 A * | 12/1997 | Mitani et al. ................ 439/131 |
| 5,702,271 A | 12/1997 | Steinman |
| 5,735,715 A | 4/1998 | Olson |
| 5,773,332 A | 6/1998 | Glad |
| 5,775,951 A * | 7/1998 | Gargiulo ..................... 439/131 |
| 5,912,806 A | 6/1999 | Onoda et al. |
| 5,940,275 A | 8/1999 | Laity |
| 5,984,731 A | 11/1999 | Laity |
| 6,011,690 A | 1/2000 | Hughes et al. |
| 6,012,953 A | 1/2000 | Francis |
| 6,095,851 A | 8/2000 | Laity et al. |
| 6,115,257 A | 9/2000 | Laity |
| 6,116,962 A | 9/2000 | Laity |
| 6,146,209 A | 11/2000 | Francis |
| 6,164,989 A * | 12/2000 | Glad et al. .................. 439/131 |
| 6,183,308 B1 | 2/2001 | Laity |
| 6,488,542 B1 | 12/2002 | Laity |

FOREIGN PATENT DOCUMENTS

| | | |
|---|---|---|
| CA | 2103514 | 2/1994 |
| CA | 2070571 | 10/1994 |
| DE | 1 195 385 | 6/1965 |
| DE | 29607724 U1 | 8/1996 |
| EP | 0355 413 | 7/1989 |
| EP | 0 729 206 | 8/1996 |
| EP | 0 793 310 | 3/1997 |
| EP | 0 917 254 | 5/1999 |
| JP | 62-29344 | 2/1987 |
| JP | 62-78656 | 4/1987 |
| JP | 64-10585 | 7/1987 |
| JP | 64-10585 | 1/1989 |
| JP | 1-96055 | 6/1989 |
| JP | 1-97652 | 6/1989 |
| JP | 1-243384 | 9/1989 |
| JP | 2-90481 | 3/1990 |
| JP | 2-162667 | 6/1990 |
| JP | 3-36477 | 4/1991 |
| JP | 3-262069 | 11/1991 |
| JP | 3-292519 | 12/1991 |
| JP | 4-10748 | 1/1992 |
| JP | 4-51761 | 2/1992 |
| JP | 6-52923 | 7/1992 |
| JP | 6-61658 | 8/1992 |
| JP | 6-61659 | 8/1992 |
| JP | 05-250291 | 9/1993 |
| JP | 8-162233 | 6/1996 |
| JP | WO 99/41805 | 8/1999 |
| WO | WO 94-17572 | 8/1994 |
| WO | WO 95/13633 | 5/1995 |

OTHER PUBLICATIONS

"Phone Jacks" by Mouser Electronics.
"Modular Jacks" by Pan Pacific Enterprise Co., Inc.
"Fujitsu IC Memory Card Connector, User's Manual", by Fujitsu.
"Computer Reseller/VAR Catalog" by Belkin Components.
"Flash Memory Card" by Centennial.
"The Wizard electroinc organizer" by SHARP.
"IC Memory Card" by Panasonic.
"INT4000 Cellular Data Interface" NEC spec.

"First V.34 PCMCIA modems begin shipping; more expected shortly" by Wendy Pickering—*PC Week*, Jan. 9, 1995, pp 45 & 48.

"Wireless Physical Layer Standards" by Jan Boer, et al.—*THe Global Magazine of Commerical Wireless Technology*, Oct. 1994, vol. 2, No. 10, pp. 15-17.

"Emerging Commercial Applications for Spread Spectrum Radio" by Jim K. Omura—*The Global Magazine of Commercial Wireless Technology*, Oct. 1994, vol. 2, No. 10, pp. 25, 26 & 28.

Egghead Software Product Cataolg, p. 16- "Maxtor DeskRunner desktop adapter"; "Maxtor Mobile Max hard drive"; "MobileMax PCMCIA flash memory card".

The PC Zone, vol. 17CD product catalog, p. 61—"Descartes Card Reader/Writer".

"PCMCIA Redefines Mobile Computing" by Earle J, Robinson—*P/C Computing*, Jul. 1993, pp. 238-248 & 252.

"Worldport Fax/Data PCMCIA 2.0 Modem" USRobotics.

"623K Telephone Jacks" by Molex p. 61.

"616L Type Telephone Jacks" by Molex p. 81.

"Unique Features for SRAM Card" one page.

Power Macintosh 4400 series user Manual, Apple Computer, Inc. 1997. pp. 1-60.

\* cited by examiner

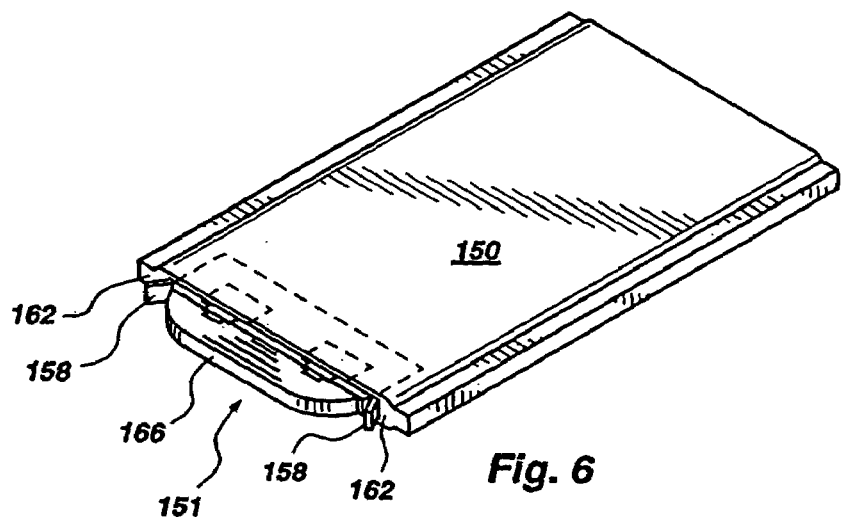
*Fig. 6*
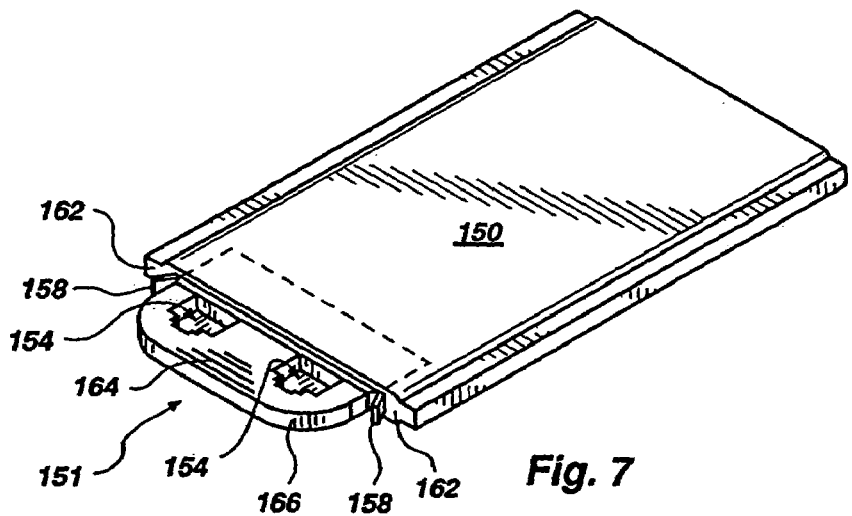
*Fig. 7*
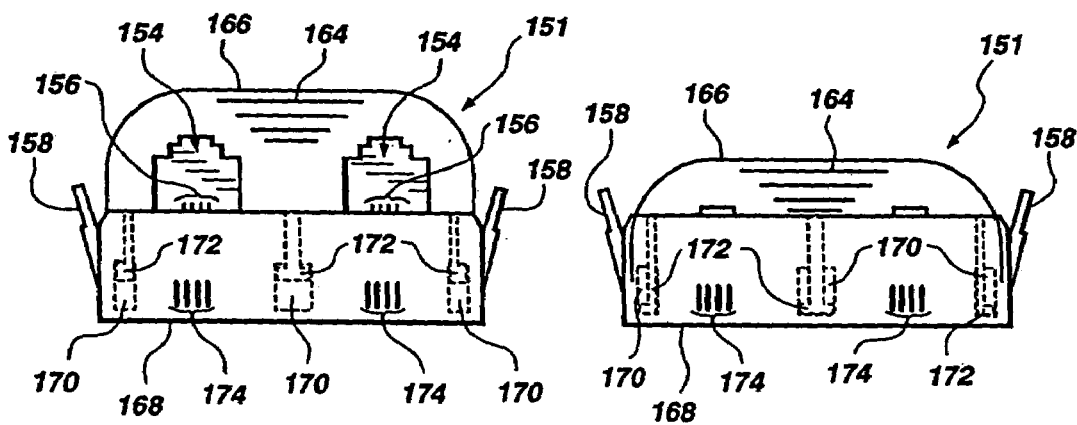
*Fig. 8*     *Fig. 9*

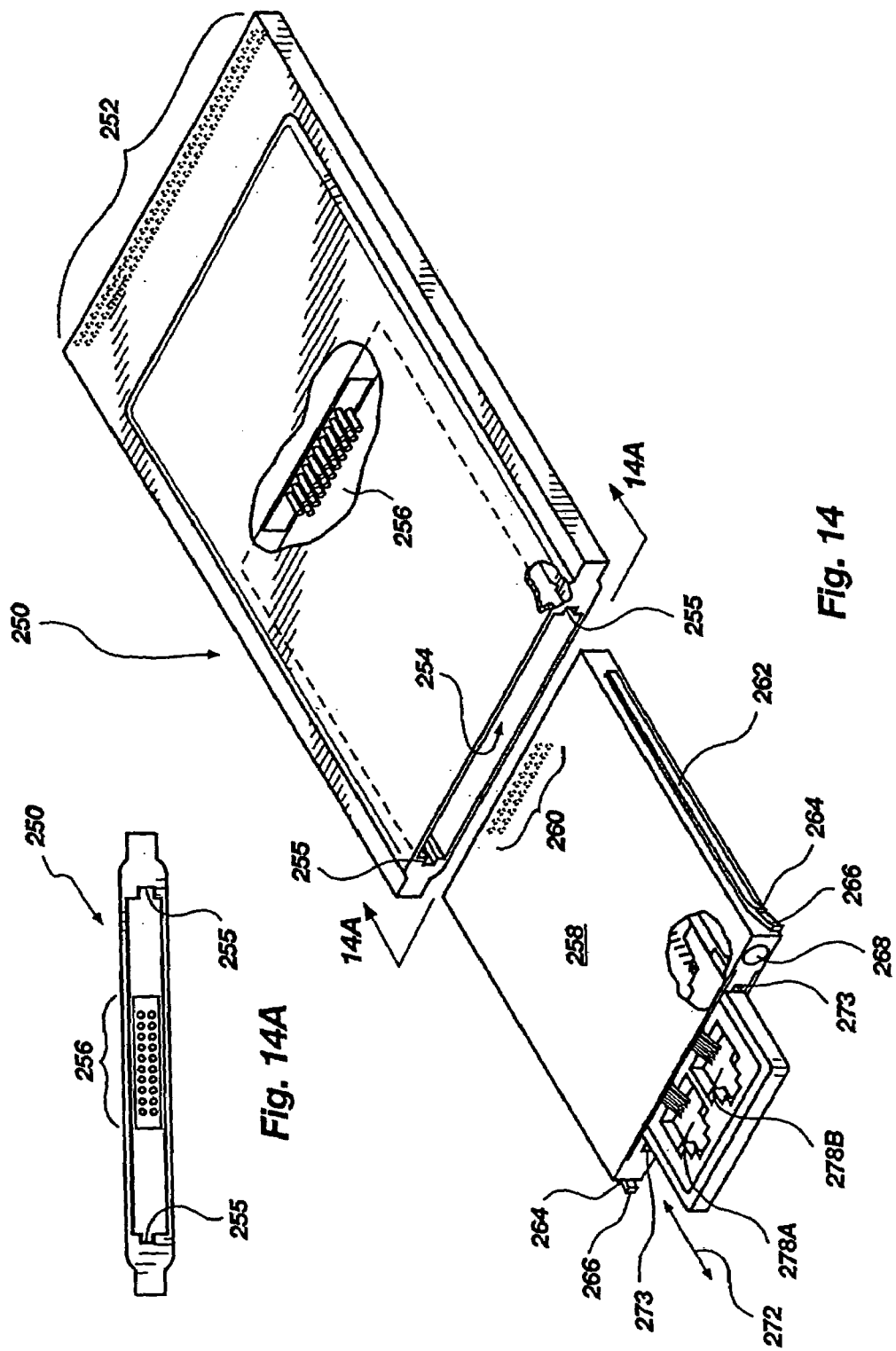

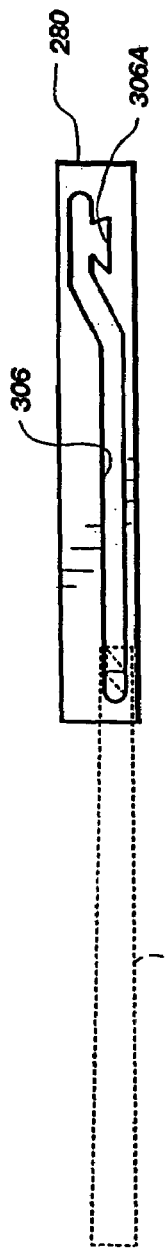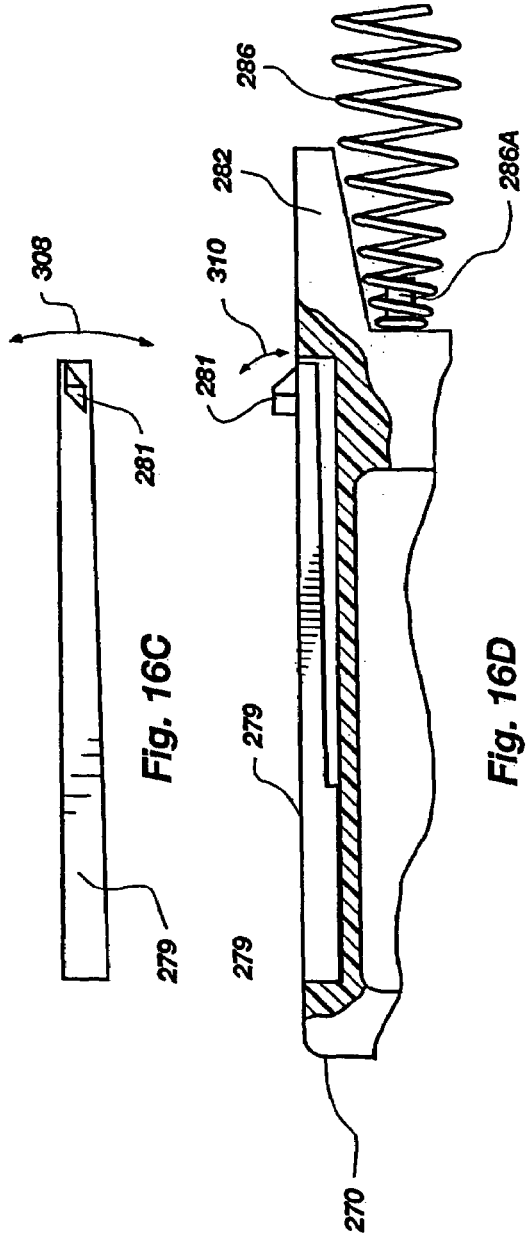
Fig. 16B
Fig. 16A
Fig. 16C
Fig. 16D

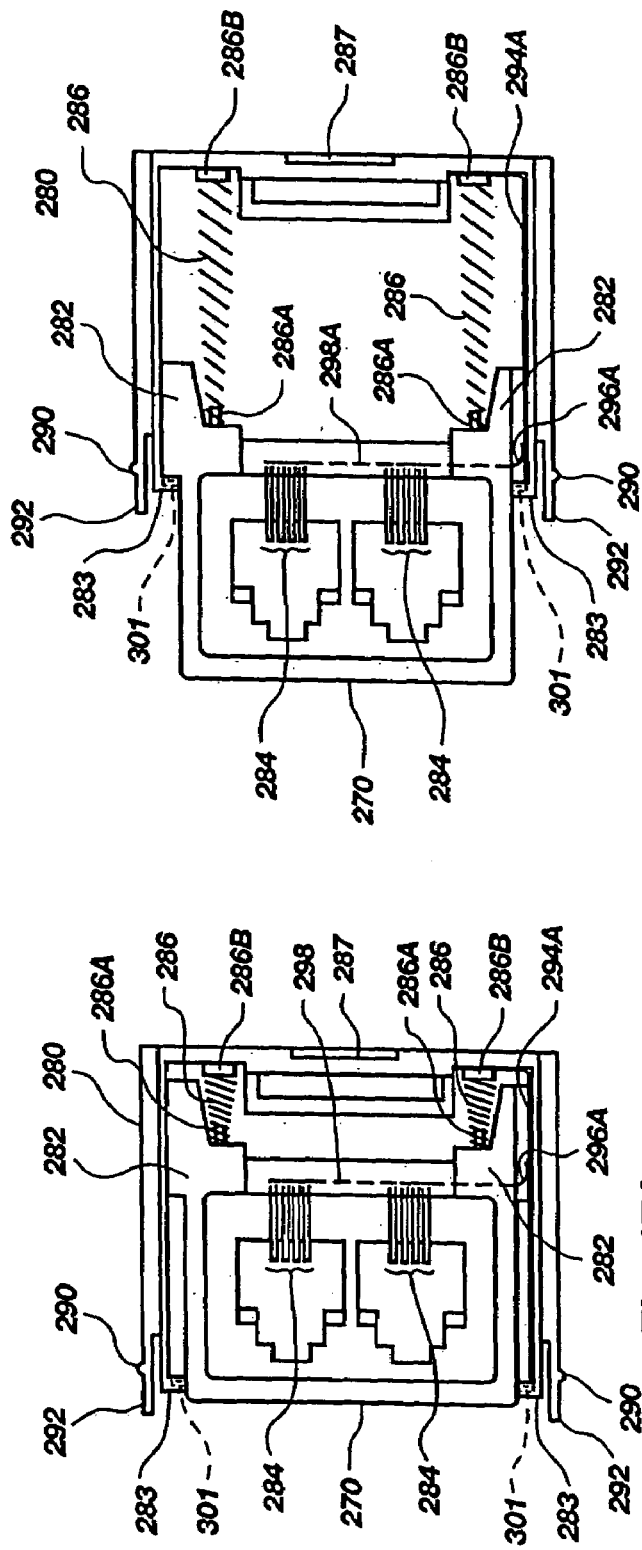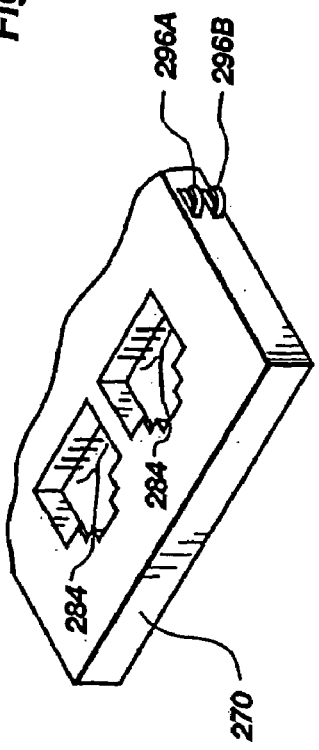

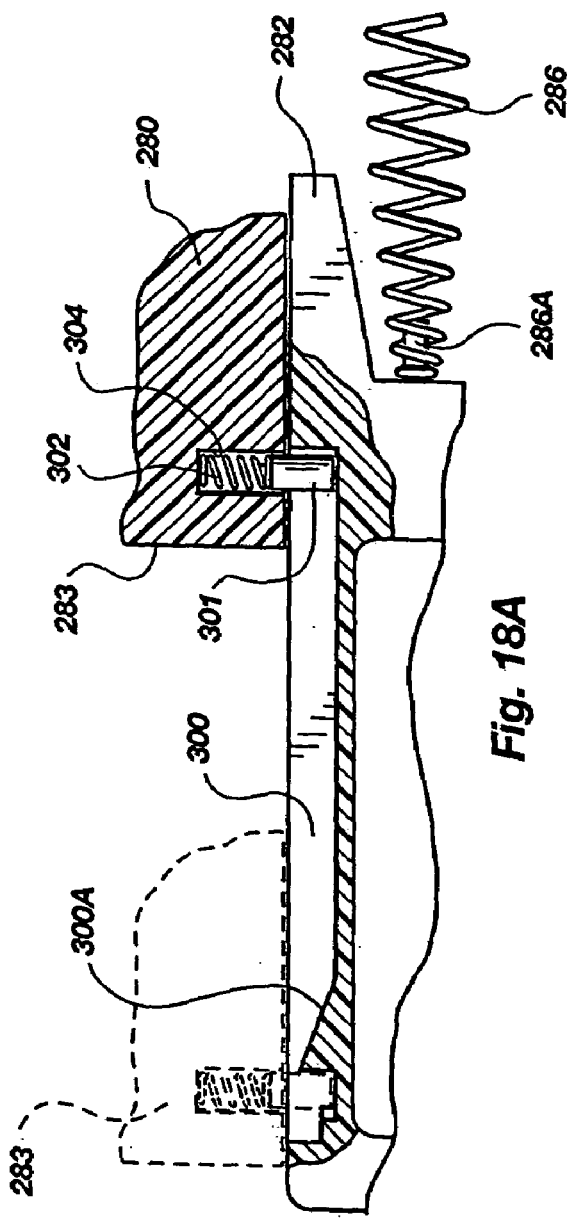
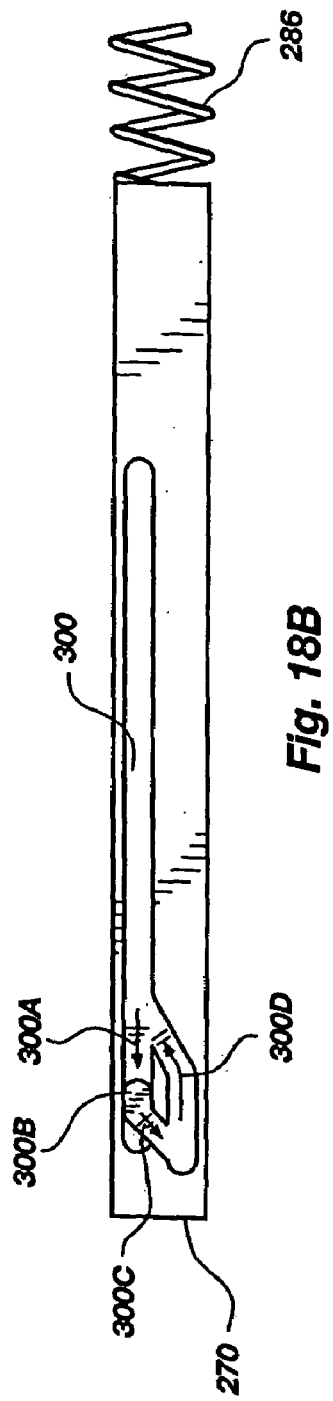
Fig. 18A
Fig. 18B

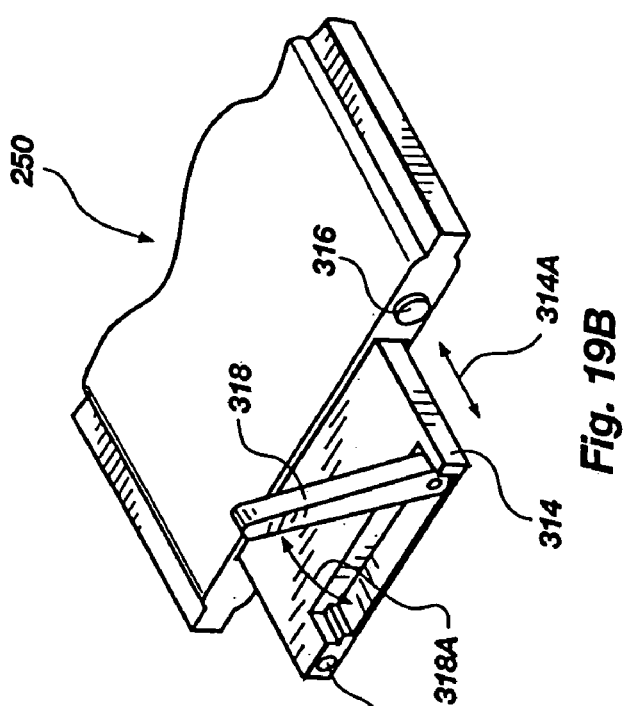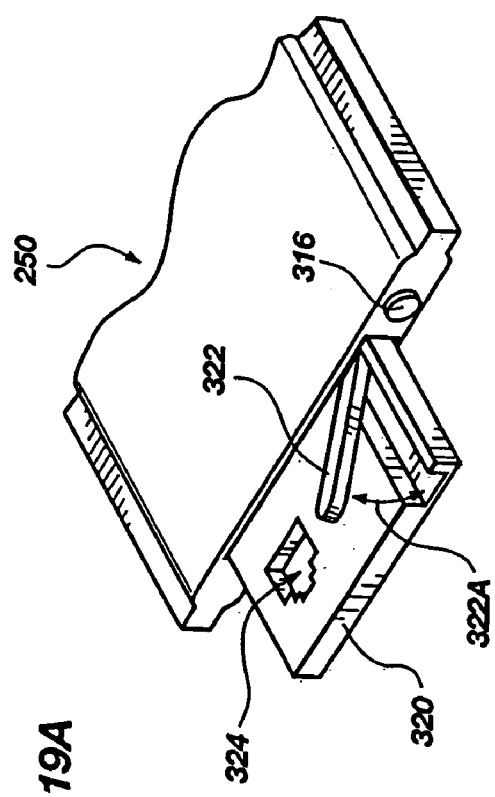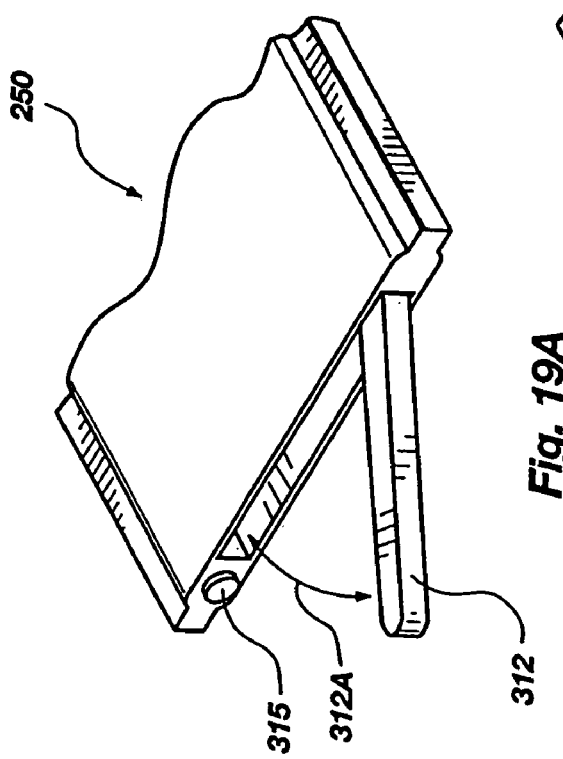

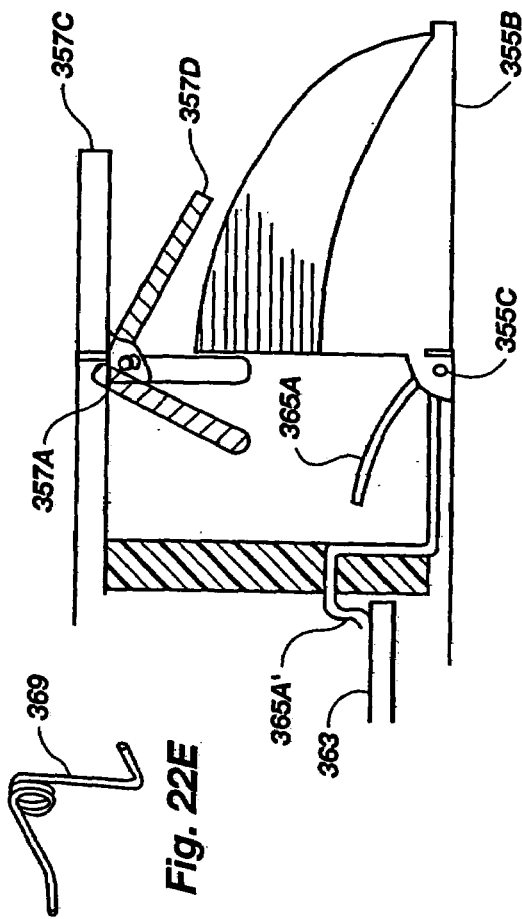
Fig. 22B
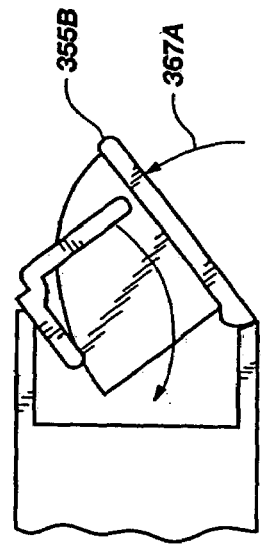
Fig. 22D
Fig. 22E
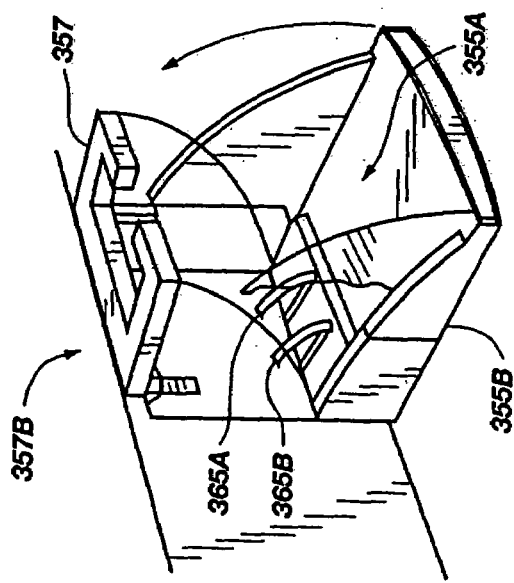
Fig. 22A
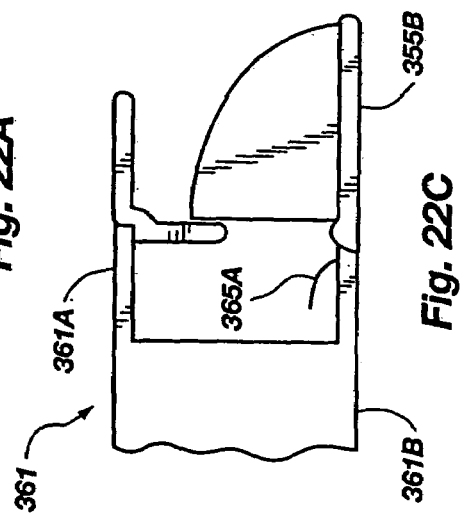
Fig. 22C

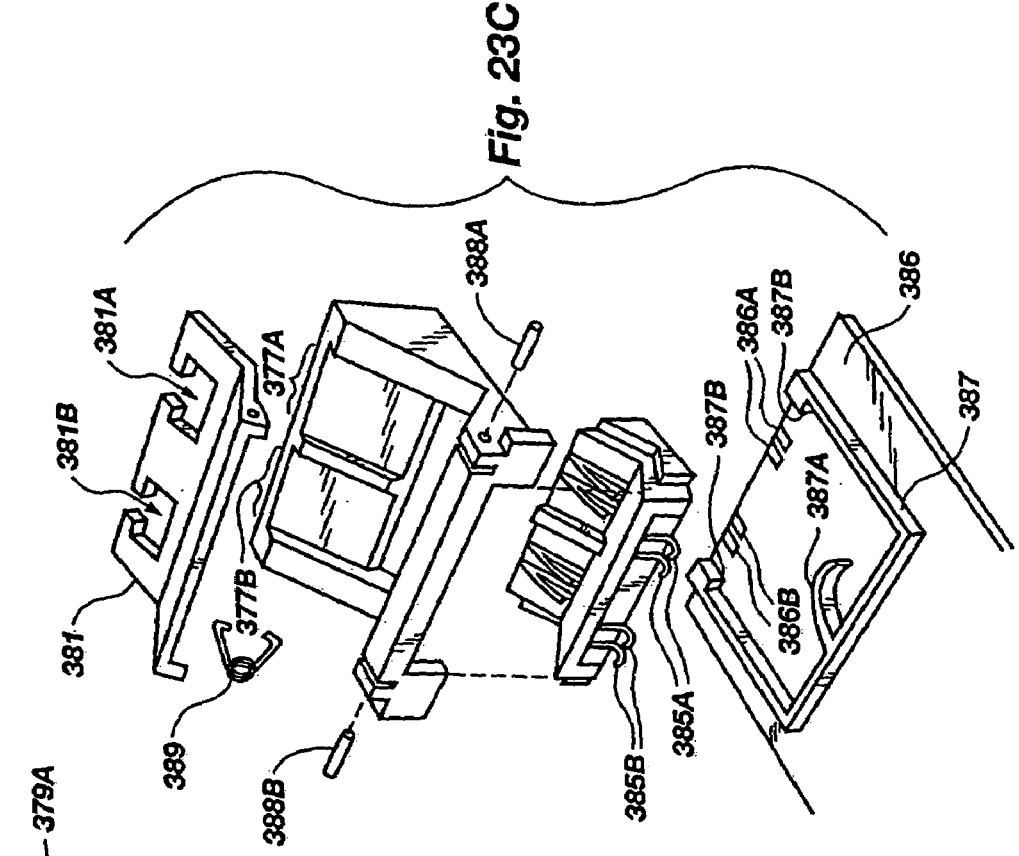
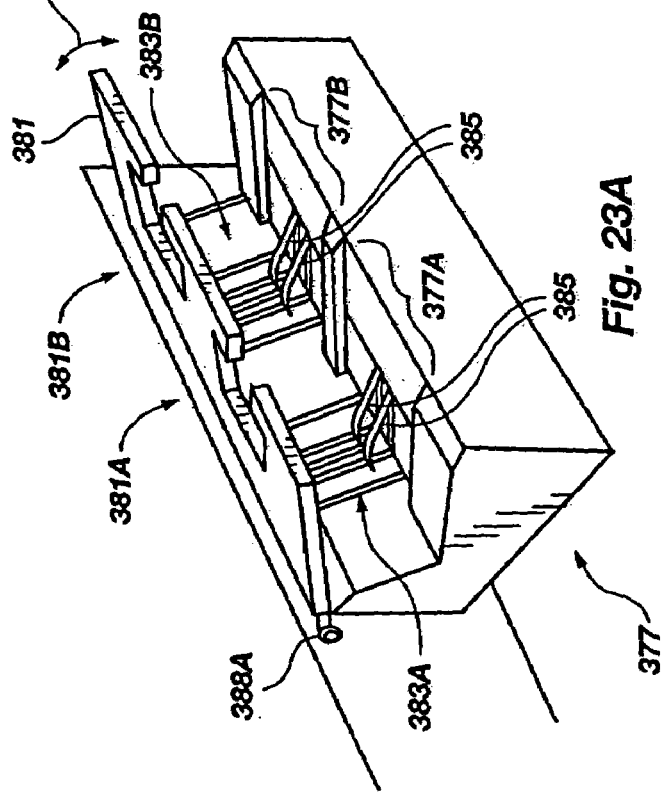
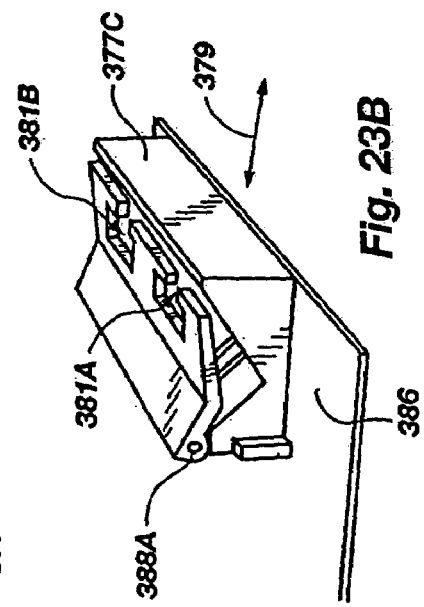

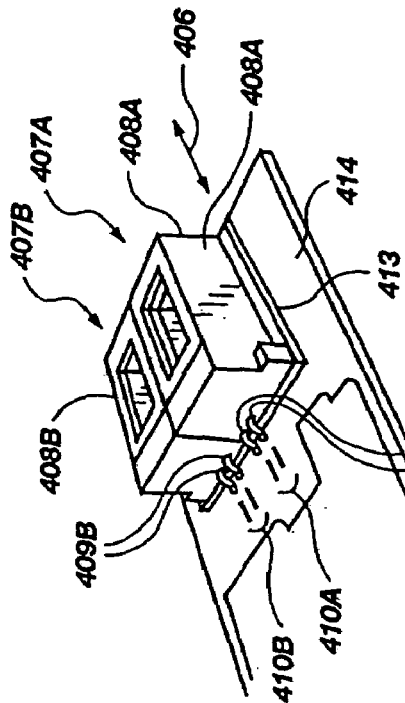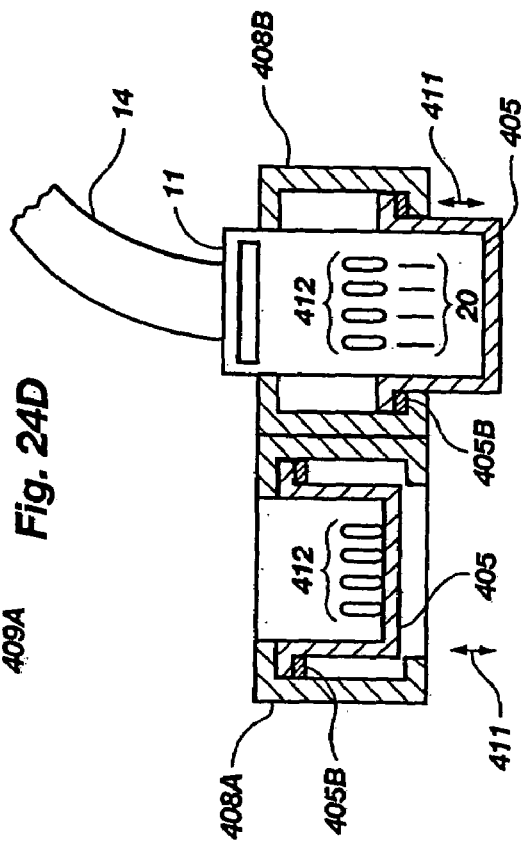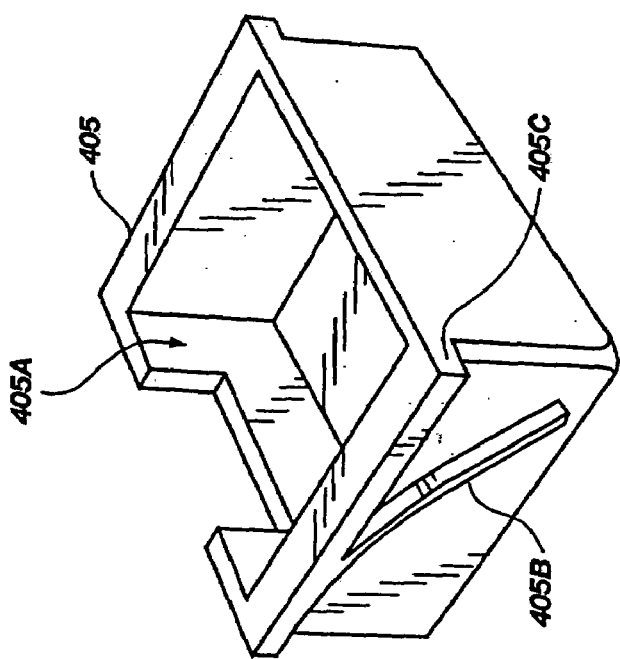

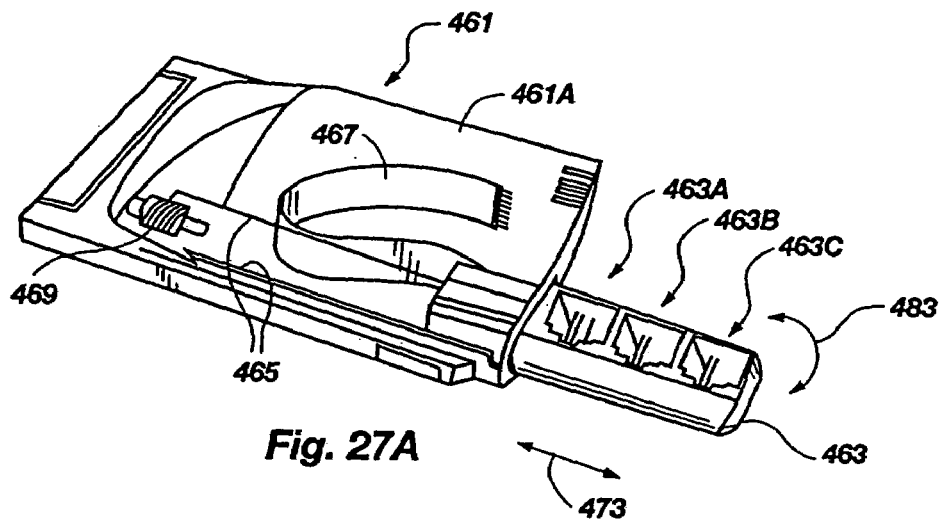
Fig. 27A
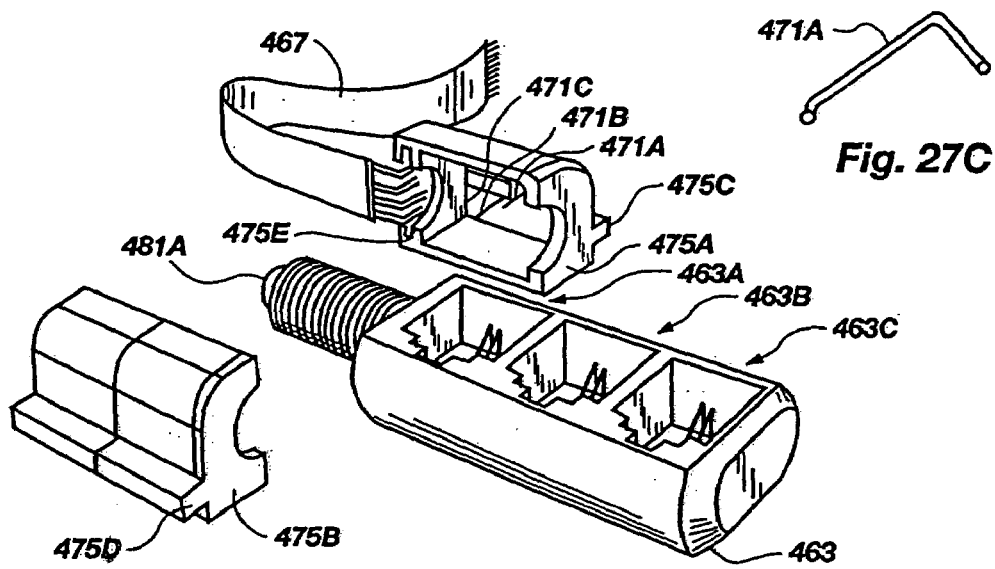
Fig. 27C
Fig. 27B
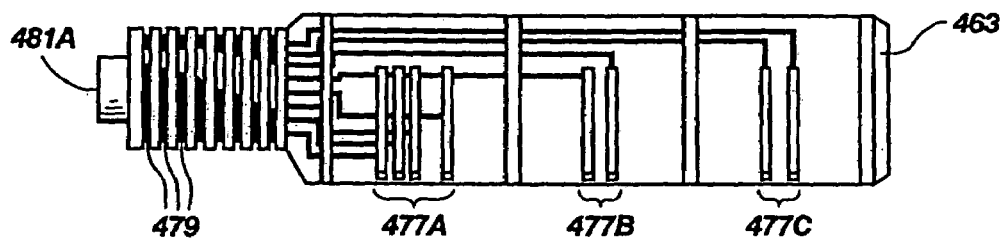
Fig. 27D

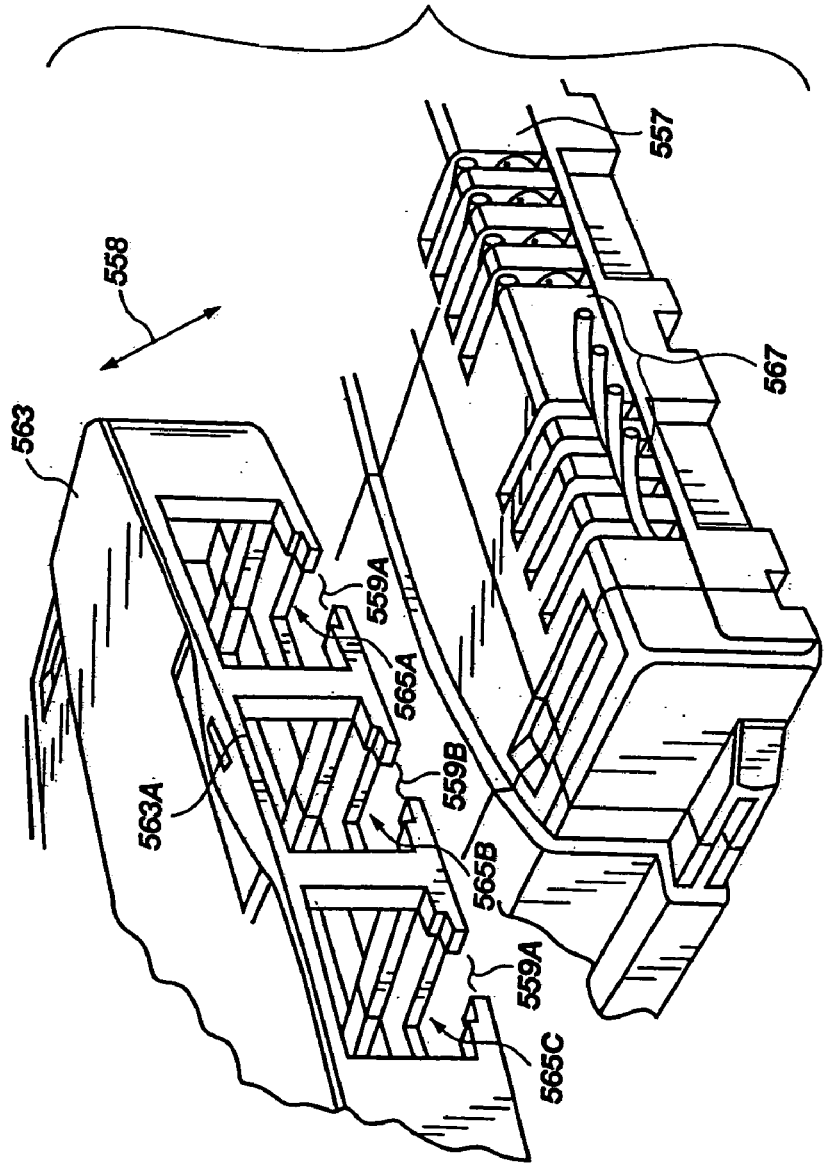

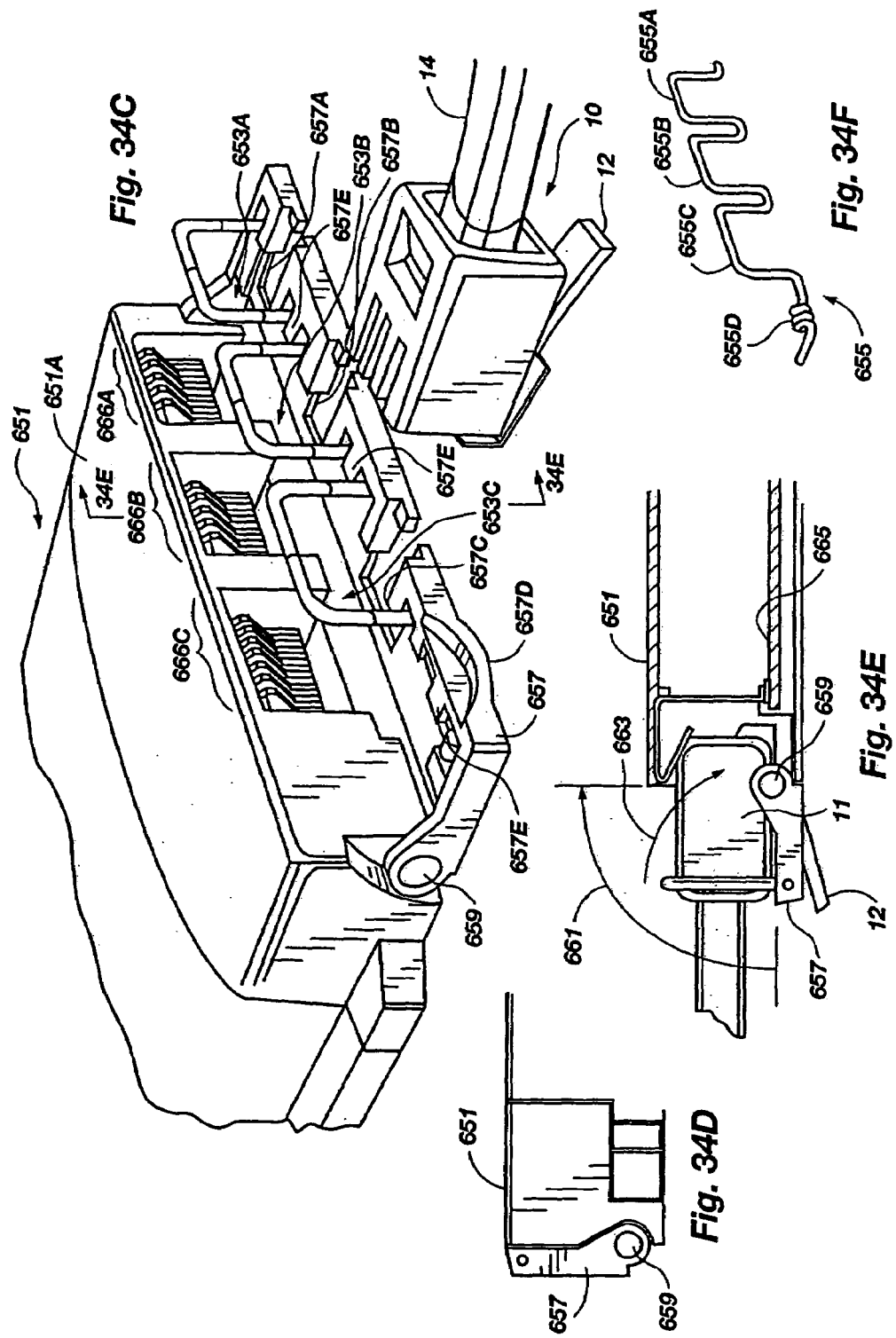

VERSATILE COMMUNICATIONS CONNECTORS

RELATED APPLICATIONS

This application is a continuation-in-part of U.S. patent application Ser. No. 08/799,799 filed on Feb. 13, 1997 entitled Adaptable Communications Connectors (now U.S. Pat. No. 5,773,332), which is a continuation of U.S. patent application Ser. No. 08/402,084 filed on Mar. 10, 1995 (now abandoned) entitled Adaptable Communications Connectors which is a continuation-in-part of U.S. patent application Ser. No. 08/151,249 filed on Nov. 12, 1993 (now U.S. Pat. No. 5,411,405) entitled Miniature Electrical Communications Connectors.

BACKGROUND

1. The Field of the Invention

This invention relates to electronic communication devices. More particularly, the present invention relates to connectors used to attach a communications line to a computer.

2. The Background Art

Telecommunications services have become an integral part of modern society. The number of telephones in the United States alone exceeds 150 million. Moreover, communications within an organization between people and machines further increases the size of the communications network. The vast majority of the communications devices now in use require a wired connection to a communications line. Such communications devices include, for example, telephones, facsimile machines, modems, and local area network (LAN) adapters. Wireless communications, however, are becoming more commonplace in many instances.

In order to conveniently attach a communications line to a communications device, standard connectors have been promulgated. The most popular of these connectors is known in the art as the RJ-xx series of connectors. Of the RJ-xx series of connectors, the RJ-11, RJ-12, and RJ-45 connectors are widely used. The RJ-11 connector comprises a six contact plug and a corresponding jack which is standardized in the industrialized world. The conventional six contact RJ-11 connector has the desirable attributes of having both low cost and high reliability.

The RJ-xx series of connectors, mostly the RJ-11 connector, is commonly used to attach a communications device such as a telephone, facsimile machine, or a modem (all of which may be integrated into a single device) to a communications line. Such devices are becoming smaller, so small that one or more dimensions of the customary RJ-11 jack, also referred to as a receptacle, is larger than a corresponding dimension of communications device. For example, communication devices which comply with the Personal Computer Memory Card International Association (PCMCIA), also referred to as PC Card, standards have dimensions of about 2.1 inches by about 3.4 inches with a thickness of only 3.5 mm, 5 mm, 8 mm, or 10.5 mm. Such small communications devices cannot incorporate customary RJ-xx series receptacles but still require compatibility with RJ-xx series plugs in order to attach to a communications line.

U.S. Pat. No. 5,183,404 to Aldous provides several schemes for providing a miniature RJ-11 compatible receptacle. Disadvantageously, many of the schemes set forth in Aldous leave the electrical contacts exposed to the surrounding environment. Thus, a user may come in contact with the electrical contacts of the plug, which in the U.S. may carry more than 80 volts. Further, since the contacts of the RJ-11 plug are exposed, the contacts may be inadvertently shorted together. Thus, the scheme included in the Aldous reference presents a danger of electrical shock and electrical short circuit. Moreover, some of the receptacle schemes disclosed in the Aldous reference are particularly prone to breakage and damage because of inherently weak structures.

Thus, it would be an advance in the art to provide a miniaturized communications connector which overcomes these drawbacks.

BRIEF SUMMARY AND OBJECTS OF THE INVENTION

In view of the above described state of the art, the present invention seeks to realize the following objects and advantages.

It is a primary object of the present invention to provide a communications line receptacle for use with a miniaturized communications device wherein the electrical contacts are shielded or isolated from the surrounding environment.

It is also an object of the present invention to provide a miniaturized communications line connector which is resistant to breakage and which can be stored out of the way when not being used.

It is a further object of the present invention to provide a communications line receptacle which is readily replaceable if broken.

It is another object of the present invention to provide a communications card which can be readily adapted to meet various communications standards.

It is a further object of the present invention to provide a communications card which can provide wireless communications.

These and other objects and advantages of the invention will become more fully apparent from the description and claims which follow, or may be learned by the practice of the invention.

The present invention provides an apparatus for receiving an RJ-xx series plug and making electrical connection with at least two conductors on the plug and conveying any signals on the conductors to a communications device such as a telephone, facsimile machine, modem, local area network adapter, or some other device.

The apparatus includes a body, also referred to as a body means. A recess, or recess means, is provided on the body. In some embodiments the recess means preferably includes an open first end and a closed second end. In other embodiments, the recess means preferably includes open first and second ends. The recess means preferably has dimensions such that the plug is closely received therein. A means is also provided for releasably engaging the plug such that the plug is releasably held in the recess.

At least first and second electrical conductors are provided in the recess. Each of the electrical conductors are positioned such that they have electrical continuity with the electrical contacts in the plug when the plug is received into the recess. A means for conveying any electrical signal present on the electrical contacts to the communications device is also provided.

A replaceable direct access arrangement unit allows the communications card to be interfaced with telephone systems, or other communications systems, which may each require adherence to a different standard. When necessary, a user merely replaces an existing direct access arrangement unit with another direct access arrangement unit which is compatible with the wired telephone system or the wireless communications system that is available to the user.

Also preferably included with the recess means is an expandable means for isolating the contacts in the plug from electrical continuity with an object in a surrounding environment such that passage of current from one or more of the electrical contacts to an object present in the surrounding environment is prevented. The expandable means is located at the second end of the recess and is preferably a stretchable membrane. The expandable means expands to accommodate a plug received in the recess and tends to return, and can be returned by a user, to a position within the thickness of the body when not being used so the apparatus assumes a compact configuration.

Embodiments of the present invention include receptacle modules which receive an RJ-xx series plug. One preferred embodiment of the present invention includes a means for holding the body which receives the RJ-xx series plug. The means for holding the receptacle body or the receptacle module can be easily installed in and removed from the communications device by the user. The present invention allows the body to be retracted into and extended from the communications device while still allowing easy removal and replacement of the body making up the receptacle module. Another preferred embodiment of the present invention includes means for pivotally rotating the body into and out of the communications device such that the body is substantially entirely within the communications device when not being used and the body is rotated to a position where the recess which receives the plug is accessible to the user when desired.

BRIEF DESCRIPTION OF THE DRAWINGS

In order to better appreciate how the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 6 is a perspective view of a third embodiment of the present invention with a removable receptacle module illustrated in a retracted position.

FIG. 7 is a perspective view of the third embodiment of the present invention represented in FIG. 6 with the removable receptacle module illustrated in an extended position.

FIG. 8 is a top plan view of the removable receptacle module represented in FIG. 7.

FIG. 9 is a top plan view of the removable receptacle module represented in FIG. 6.

FIG. 14 is a perspective view of a sixth embodiment of the present invention having a replaceable direct access arrangement unit ready to be inserted into the communications card.

FIG. 14A is an end view taken along line 14A—14A of FIG. 14.

FIGS. 16A, 16B and 16C are side views, and FIG. 16D is a top view, of a mechanism which functions to retract and extend the receptacle module into and out of the replaceable direct access arrangement.

FIGS. 17A and 17B are top views showing the electrical interconnection between the receptacle module and the replaceable direct access arrangement and the accompanying mechanism which retracts and extends the receptacle module into and out of the replaceable direct access arrangement.

FIG. 17C is a detailed perspective view of the electrical interconnection circuit between the receptacle module and the frame represented in FIGS. 17A–B.

FIGS. 18A and 18B are top and side views, respectively, of a mechanism which functions to retract and extend the receptacle module into and out of the replaceable direct access arrangement.

FIGS. 19A–C are perspective views of three different antenna configurations which may be included in embodiments of the present invention.

FIGS. 22 A–E provide various perspective views of the pivoting cover of FIG. 22.

FIGS. 23 A–C provide various perspective views of the sliding drawers of FIG. 23.

FIGS. 24 C–E provide various perspective views of the receptacles of FIG. 24.

FIGS. 27 A–D provide various perspective views of the rotatable and retractable member of FIG. 27.

FIGS. 34 C–F provide various perspective views of the receptacles of FIG. 34.

FIGS. 35 A–D provide various perspective views of the receptacles of FIG. 35.

DETAILED DESCRIPTION OF THE PREFERRED EMBODIMENTS

Reference will now be made to the drawings wherein like structures will be provided with like reference designations.

U.S. patent application Ser. No. 08/799,799, filed Feb. 13, 1997 and Ser. No. 08/971,501, filed Nov. 17, 1998, both of which are now incorporated by reference herein in their entireties.

Figure 1:
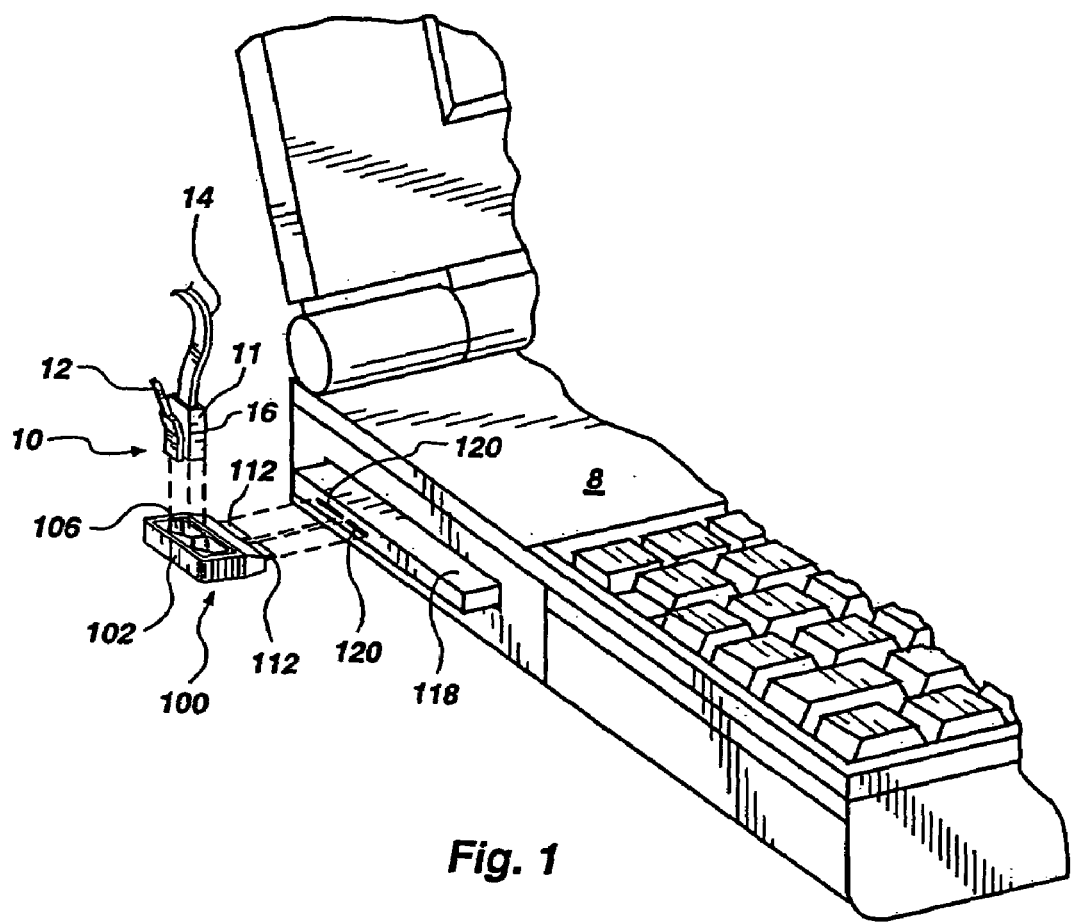
FIG. 1 is a partial perspective view of a lap top computer with a communications card partially inserted therein and a first embodiment of the present invention ready to be coupled to the communications card.

As is evident to those skilled in the art, advances in technology are allowing many different electrical devices to be made smaller than was contemplated just a few years ago. Represented in FIG. 1 is a partial perspective view of a lap top computer 8. In order to meet the demand for devices utilized with such lap top computers without adding any significant weight or bulk, devices such as a modem card 118 (shown partially withdrawn from the lap top computer 8) which complies with the PCMCIA (also known as PC Card) standards have been produced. Significantly, while most lap top computers are generally note book size (about 8.5 inches by 11 inches) or smaller, the need for further miniaturization of devices such as the modem card 118 will increase as computing devices of all kinds continue to shrink.

The lap top computer 8 represented in FIG. 1 includes a PCMCIA compliant socket 124. The Personal Computer Memory Card International Association (PCMCIA) promulgates the PCMCIA standard which has gained wide acceptance in the industry. It is preferred that the PCMCIA compliant socket adhere to PCMCIA standard pertaining to Type I, Type II, and Type III cards. The preferred standards specify the physical, electrical, and environmental parameters which compliant devices must meet. The system and method of the present invention described herein are preferably compatible with the PCMCIA Card Services Specification 2.1 and Card Services Specification 2.1 as well. This standard and the accompanying specifications are well-known in the art and PCMCIA release 2.1, PCMCIA Card Services Specification 2.1, and Card Services Specification 2.1, PCMCIA Standard Release 2.1, and all releases promulgated thereafter (including the PC Card standard (1995)), are now all incorporated by reference herein in their entireties. It is to be understood that the present invention can be utilized with other PCMCIA specifications and standards which are now available or which become available in the future as well as with other similarly instructive standards which are now available in the industry or which become available in the future. Examples of such other specifications and standards include the CardBus PC Card standard which is also now incorporated by reference in its entirety. Further information regarding the implementation of these standards can be obtained from the publication Anderson, D. & Shanley, T., CardBus System Architecture (1996) (published by Addison-Wesley Publishing Company) which is also now incorporated herein in its entirety.

The modem card 118 shown in FIG. 1 can also represent numerous other communication devices, for example, a local area network adaptor, voice mail device, telephonic communication device, or a facsimile device. Indeed, with the continuing trend of miniaturizing such devices, all of these devices may be combined into one card the size of the modem card 118 represented in FIG. 1. All of these devices are examples of those intended to come within the scope of the meaning of the term "communication device" as used herein. Even further, other devices which require communication with one or more additional devices which are now available or which may become available in the future are intended to also come within the meaning of the term communication device as used herein.

As used herein, the term "data utilization device" is intended to include all digital computing devices which are adaptable to receive data or instructions via a communications medium. Perhaps the most common current example of such a device is the personal computer.

Figure 2:
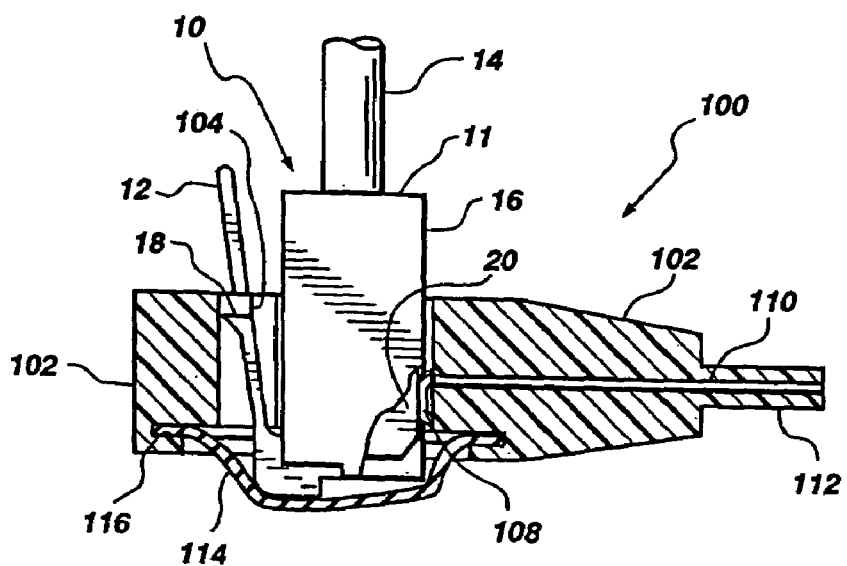
FIG. 2 is a cross sectional view of the first embodiment of the present invention represented in FIG. 1.
Figure 3:
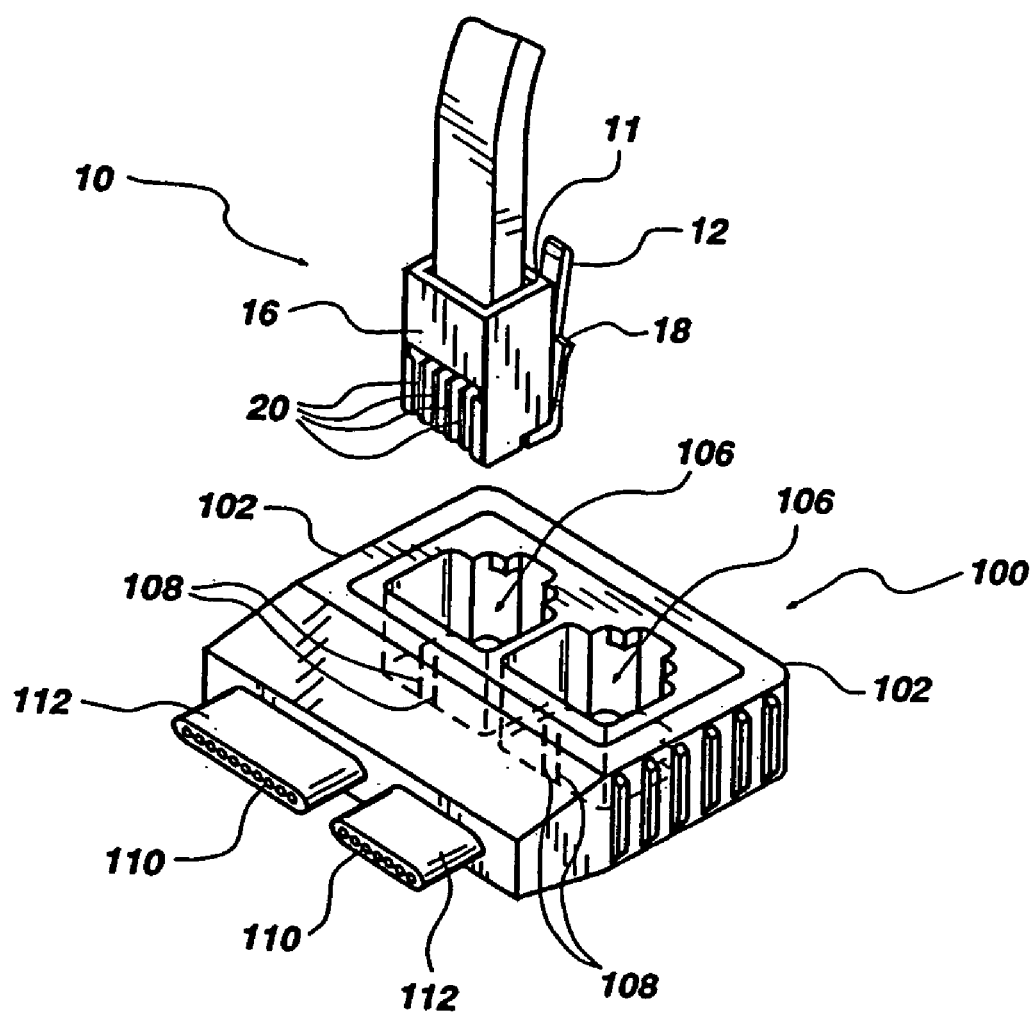
FIG. 3 is a reverse perspective view of the first embodiment of the present invention represented in FIG. 1.

A plug, which is compatible with the RJ-xx series industry standard, is indicated generally at 10 in FIGS. 1, 2, and 3. The RJ plug 10 includes a block 11 which has a first face 16 into which a plurality of electrical contacts 20 are recessed. The electrical contacts 20 are connected to wires (not explicitly represented in FIGS. 1–3) contained within a cable 14 which lead to the communications network, to another communications device, or some other device. A biased clip 12, which is integrally molded as part of the block 11, is used to hold the plug 10 in a corresponding receptacle.

Detailed information regarding the RJ-xx series of connectors can be found in the publication found at Title 47 (Telecommunications), Code of Federal Regulations, Chapter I (Federal Communications Commission), Subchapter B (Common Carrier Services), Part 68 (Connection of Terminal Equipment to the Telephone Network), Subpart F (Connectors), Section 68.500 (1992) which is now incorporated herein by reference in its entirety.

FIGS. 1–3 represent a first preferred arrangement of the present invention embodied in a receptacle module generally represented at 100. The receptacle module 100 includes a male coupling 112 which provides both physical and electrical connections to a corresponding female coupling 120 provided in the modem card 118. It will be appreciated that many different structures available in the industry provide equivalent functions to the male coupling 112 and the female coupling 120.

The receptacle module 100 includes a body 102 which can preferably be fabricated from a plastic material using techniques known in the art but can also be fabricated using any suitable materials and techniques now available or which may become available in the future. Two recesses, both of which are generally indicated at 106 in FIG. 3, are formed in the body 102. The inclusion of two recesses 106 desirably allows accommodation of two communication lines by the receptacle module 100.

A cross sectional view of one of the recesses 106 is provided in FIG. 2. FIG. 2 also shows the plug 10 inserted into the recess 106. The recess 106 has a first open end and a second closed end. When an RJ-xx series plug is inserted into the recess 106, a plurality of conductors 108 communicates with one of its respective contacts 20. The conductors 108 are preferably spring-like so that they are in firm electrical continuity with the contacts 20. In some applications only two conductors 108 are provided while more than two conductors 108 are provided in other applications. Each of the conductors 108 is joined to a respective hollow pin, one of which is shown in cross section at 110, which mates with corresponding pins provided in the female coupling (120 in FIG. 1) It will be appreciated that the number of pins and conductors can be varied in accordance with the particular application for the receptacle block. Moreover, it is within the scope of the present invention to utilize any techniques now available, or which become available in the future, to provide electrical connection between the conductors in the recesses and the coupling structure.

Still referring to FIG. 2, as the plug 10 is received into the recess, a ledge 104 provided on the biased clip 12 engages a ridge 18 formed on the body 102 and protrudes into the recess 106. The biased clip 12 and the ledge 104 cooperate to hold the plug 10 in the recess 106. When removal of the plug 10 is desired, the biased clip 12 is compressed and the plug 10 is removed from the recess 106.

Enclosing one end of the recess is an expandable member 114. In the embodiment of the invention represented in FIG. 2, the expandable member is an elastic and stretchable membrane. The expandable member 114 is preferably a rubber-like material which is an electrical insulator. The expandable member 114 is anchored in a groove 116 provided in the body 102 around the recess 106.

As clearly shown in the cross section of FIG. 2, when the plug 10 is fully inserted into the recess 106 the expandable member 114 is moved to expand the depth of the recess 106. The expandable member 114 isolates the contacts 20 from exposure to the surrounding environment. If the expandable member 114 were not included, as in the previously available schemes, the contacts 20 would be exposed to the surrounding environment and the possibility that the contacts 20 will be shorted together is present. It is also possible that the contacts 20 could be shorted to an electrical ground, pass a current to a user who touches the contacts 20, or some other event might occur which would damage the communications devices attached to the cable 14. As known in the art, voltages of more than 70 volts regularly are present on the contacts 20 when connected to the common carrier telephone network in the United States.

The illustrated expandable member 114 is preferably fabricated from a rubber-like material which is flexible enough to allow the end of the plug 10 to expand the flexible member 114 without undue force being exerted on the plug 10. The material from which the expandable member 114 is fabricated should be strong enough to allow long time use without any failure, e.g., tearing. Those skilled in the art will appreciate that the perimeter of the expandable member 114 should be securely anchored in the groove 116.

It is to be understood that structures other than the expandable member 114 can function as the expandable means for isolating the contacts 20 from electrical continuity with any object in the surrounding environment. For example, a combination of rigid panels joined together to allow expansion can function as the expandable means. Further, a combination of rigid elements and elastic elements, or one or more rigid elements which fold within the thickness of the body 102, can be devised using the information contained herein. It is preferred that the thickness of the body 102 be not greater than the thickness of the modem card 118. Thus, the expandable member 114 should tend to automatically return to within the plane of the body 102 once the plug 10 is removed and/or allow the user to collapse the expandable member 114.

Referring to FIG. 3, it is preferred that the recesses 106 have particular dimensions. It is preferred that the two unbroken side walls of the recess each have a length in the range from about 0.265 inches to about 0.285 inches and the single remaining straight wall, which is perpendicular to the two side walls, have a dimension in the range from about 0.45 inches to about 0.475 inches for compatibility with RJ-45 plugs. It is also preferred that the two unbroken side walls of the recess have a length in the range from about 0.265 inches to about 0.285 inches and the single remaining straight wall, which is perpendicular to the two side walls, have a dimension in the range from about 0.375 inches to about 0.4 inches for compatibility with RJ-11 and RJ-12 plugs.

Figure 4:
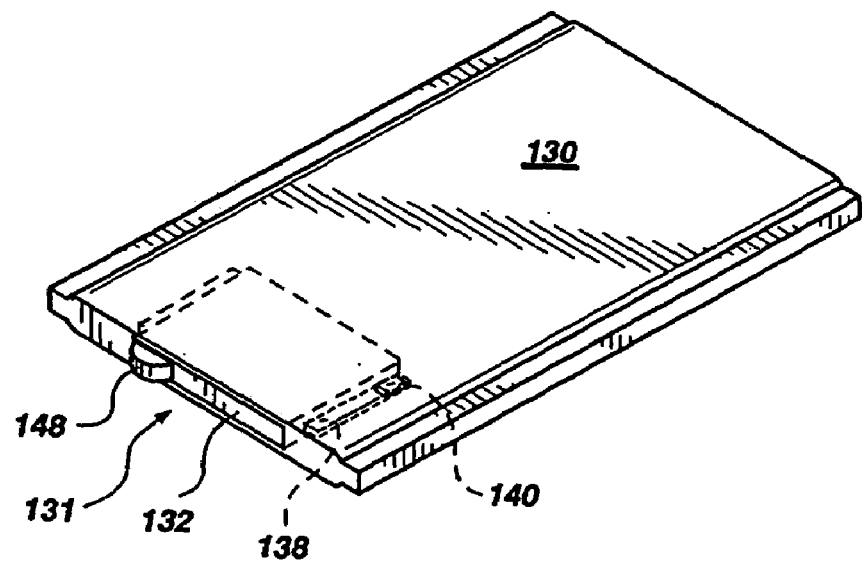
FIG. 4 is a perspective view of a second embodiment of the present invention with a receptacle module illustrated in a retracted position.

FIG. 4 is a perspective view of a second embodiment of the present invention with a receptacle module, generally represented at 131. The receptacle module 131 is illustrated in FIG. 4 as being retracted into a communications card 130. The communications card 130 can house any of the communications devices indicated earlier.

The receptacle module 131 includes a body 132 and a finger pull 148 formed thereon. The receptacle module 131 is conveniently kept in its retracted position illustrated in FIG. 4 until the communications card 130 needs to be connected to a communications line (not shown in FIG. 4). When needed, the user grasps the finger pull 148 and pulls the receptacle module 131 to its extended position represented in FIG. 5.

Figure 5:
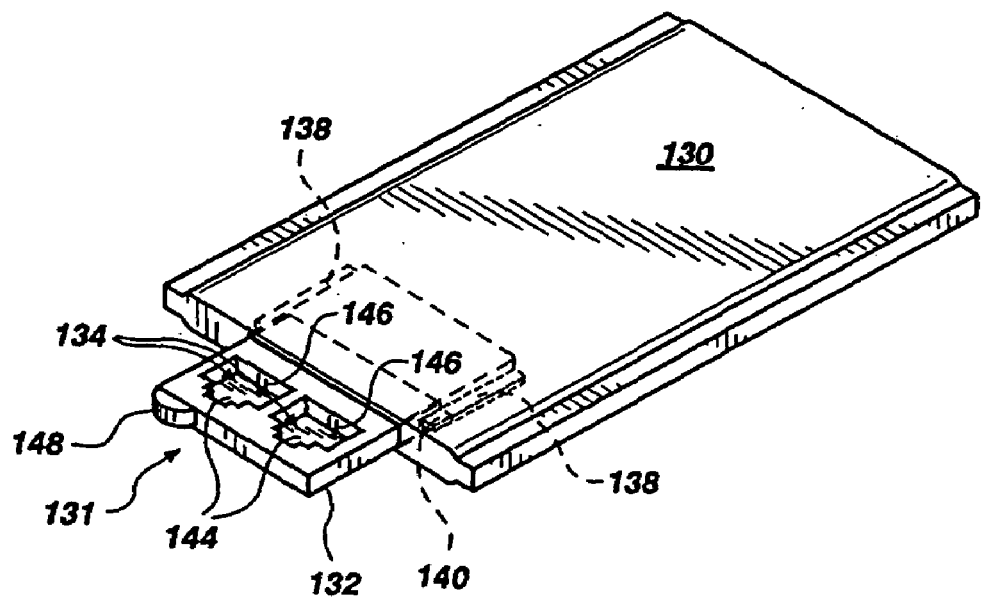
FIG. 5 is a perspective view of the second embodiment of the present invention represented in FIG. 4 illustrated in an extended position.

FIG. 5 illustrates the receptacle modules in its extended position. The receptacle module 131 includes a pair of ridges (one shown in phantom image at 140 in FIGS. 4 and 5) which extend from the sides of the receptacle module 131 and which slide along a pair of grooves, shown best in phantom image in FIG. 5 at 138.

The receptacle module 131 includes two recesses, each generally indicated at 134, with each recess including a plurality of conductors 146. Each recess 134 also preferably includes an expandable member 144 which can be identical, similar, or equivalent to the expandable member 114 discussed in connection with FIGS. 1–3.

FIG. 6 is a perspective view of a third embodiment of the present invention including a removable receptacle module generally represented at 151. The removable receptacle module 151 is shown in place in a communications card 150 as has been explained earlier. The removable receptacle module includes a body 166 which is illustrated in FIG. 6 in a retracted position. It will be appreciated that the retracted position illustrated in FIG. 6 can be used or the body 166 can be fully withdrawn into the communications card 150 housing. In order to use the apparatus, a user preferably grasps finger grips 166 and pulls the body 166 out to an extended position as represented in FIG. 7.

The removable receptacle module 151 is advantageously easily removable from the communications card 150. In order to remove the entire removable receptacle module 151 from the communications card 150, a pair of wings 158 are squeezed inwardly so a ledge (158 in FIG. 8) provided on each wing 158 disengages from an edge 162 of the communications card 150 housing. The entire removable receptacle module 151 can then be removed from the communications card 150. It will be appreciated that other structures can carry out the function of the wings 158, as will be explained later in this disclosure.

It is common for a receptacle module, such as receptacle module 100, to be broken or damaged during use. If a receptacle module, or other structure providing connection to a communications line is permanently affixed to the communications card or its equivalent, then the only practical recourse is replacement of the entire communications card, even though only the receptacle module has been damaged. The embodiment of the present invention represented in FIGS. 6–9 provides that the receptacle module can be easily replaced in case of damage.

Moreover, the removable receptacle module 151 can be replaced with another removable receptacle module which is adapted to receive another size or style of plug (not represented in FIGS. 6–9). For example, the RJ-11, RJ-12, and RJ-45 connectors have all been generally adopted for specialized applications. Thus, a removable receptacle module adapted for use with RJ-11 plugs can be easily replaced with a removable receptacle module adapted for use with RJ-45 plugs and so forth.

FIGS. 8 and 9 provide detailed views of the removable receptacle module 151 with the body 166 in an extended and retracted position, respectively. Provided in the body 166 are a pair of recesses, generally indicated at 154, and a plurality of conductors 156. Each recess 154 preferably includes an expandable member, generally indicated at 154, as has been previously explained.

As represented in FIGS. 8 and 9, the removable receptacle module 151 includes a shell 168 from which the wings 156 extend and in which the body 166 slides. It will be appreciated that many different structures can be devised by those skilled in the art to carry out the functions of the shell using the teachings contained herein. Attached to the body 166 are three guides 172 which slide within three respective grooves 170. The guides 172 and the grooves 172 are configured so that the body 168 is held captive in, i.e., cannot be completely removed from, the shell 168. Also represented in FIGS. 8 and 9 are a plurality of electrical conductors indicated at brackets 174 which mate with suitable structures within the communications card 150 housing to allow transfer of signals between the communications line (not illustrated in FIGS. 8 and 9) and the communications card (150 in FIGS. 6 and 7).

It will be appreciated that since the housing 168 of the receptacle module 151 is retained within the communications card 151, and that the communications card 150 is held within a lap top computer or a cabinet of some kind, the shell 168 is protected from breakage and damage so it can be removed without undue difficulty even if damage does occur to other components of the removable receptacle module 151.

Figure 10:
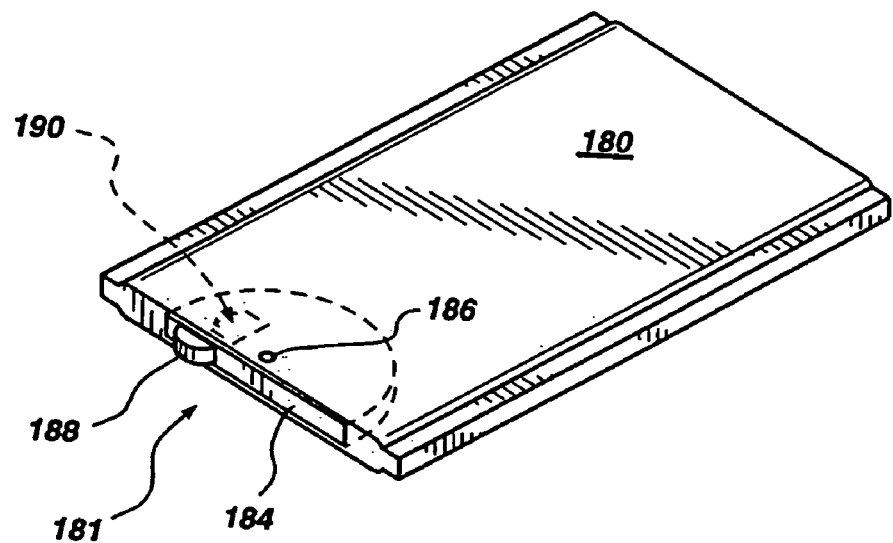
FIG. 10 is a perspective view of a fourth embodiment of the present invention with the receptacle module illustrated in a retracted position.

FIG. 10 provides a perspective view of a fourth embodiment of the present invention. The embodiment illustrated in FIG. 10 includes a receptacle module, generally indicated at 181, illustrated in a retracted position. The receptacle module 181 includes a body 184 which is preferably semicircular in shape and rests, when in its retracted position, within a cavity in a communications card 180, the cavity being generally indicated at 182 in FIG. 11. The cavity 182 is preferably semicircular in shape but can be any shape which provides sufficient room to accommodate the body 184 in its retracted position.

Figure 11:
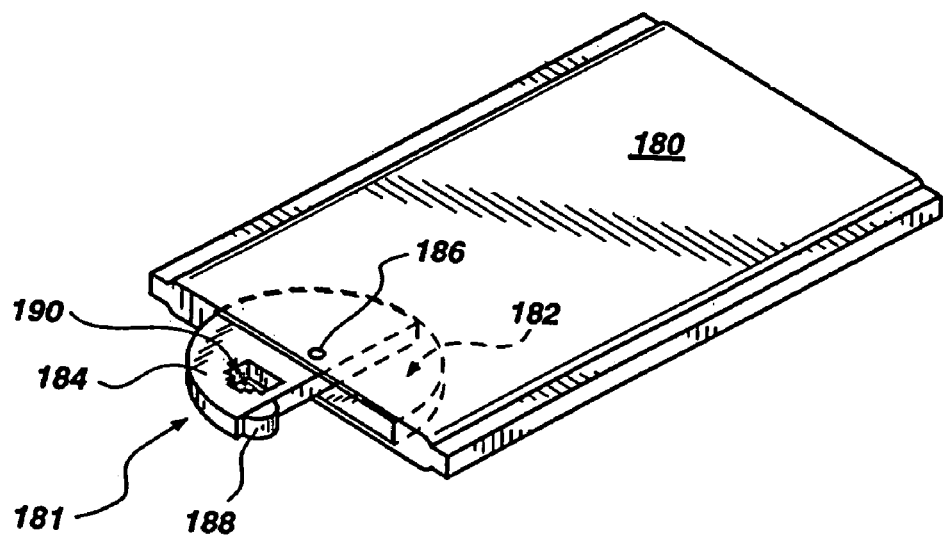
FIG. 11 is a perspective view of the fourth embodiment of the present invention represented in FIG. 10 with the receptacle module illustrated in an extended position.

The body 184 is attached to the communications card 180 housing by way of a pivot 186. The pivot 186 allows the body 184 to be rotated by pulling on a finger grip 188 to an extended position as illustrated in FIG. 11. In its extended position, the receptacle module 181 allows access to a recess 190 which is preferably configured as explained earlier and is ready to receive a plug, such as plug 10 in FIG. 1. Electrical connections between the conductors (not illustrated) disposed in the recess 190 and the circuitry contained in the communications card 190 are provided as can be designed by those skilled in the art. Those skilled in the art can also arrive at numerous structures which are equivalent to those illustrated in FIGS. 10 and 11 using the teachings contained herein.

Figure 12:
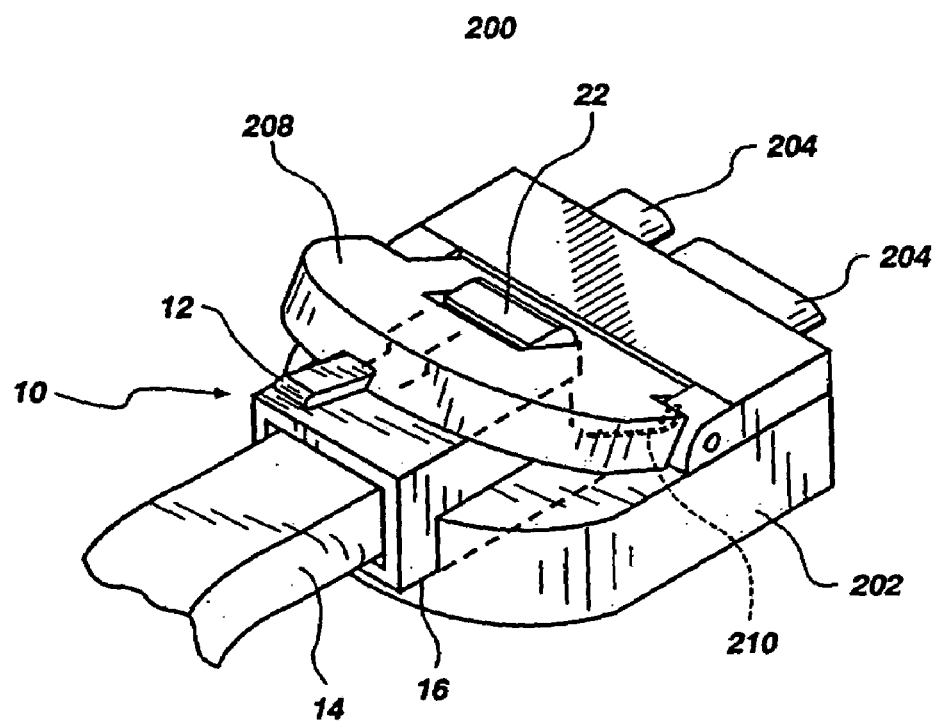
FIG. 12 is a perspective view of a fifth embodiment of the present invention.
Figure 13:
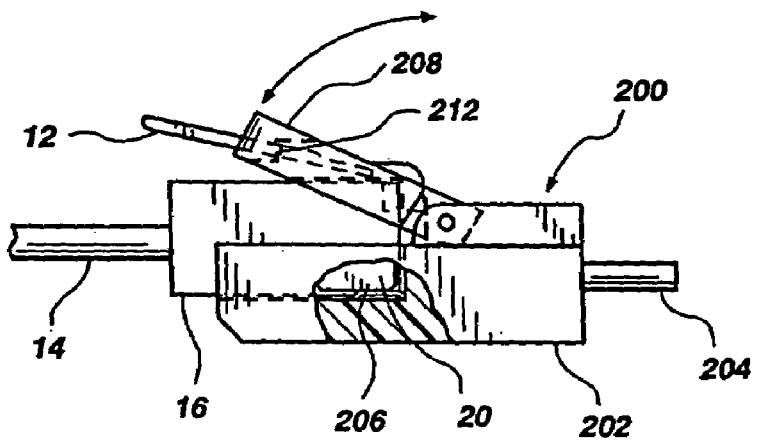
FIG. 13 is a side elevational view of the fifth embodiment of the present invention represented in FIG. 12.

FIG. 12 provides a perspective view of a fifth embodiment of the present invention which includes a receptacle module, generally indicated at 200, with male couplings 204 similar to those represented in FIGS. 1–3 at 112 and which are received by a communications card such as those described earlier. A body 202 is provided with a recess into which the plug 10 is inserted. As illustrated best in the cross sectional view of FIG. 13, a plurality of conductors 206 are provided which communicate with respective contacts 20 on the plug 10.

With the plug 10 in position on the body 202, a lever 208 holds the plug 10 in place. The lever 208 is biased toward the body 202 by a spring 210. A ledge 212 provided on the lever 208 engages the ridge (18 in FIGS. 2 and 3) provided on the clip 12 to further hold the plug in place. An aperture is provided on the lever 208 to accommodate a hump 22 which is provided on plugs which comply with the RJ-xx series standards. It will be appreciated that the biased lever provides a much more secure and convenient to use apparatus than any of those available in the art which are suitable for use with RJ-xx series plugs and which is suitable for use with miniaturized devices such as the previously described communications cards.

Reference will next be made to FIG. 14. FIG. 14 provides a perspective view of a preferred sixth embodiment of the present invention. The embodiment of FIG. 14 provides a communications card 250 which includes a replaceable direct access arrangement 258 which is shown ready to be inserted into the communications card 250. As is known in the industry, the communications card 250 makes electrical connection to a computing device via connector sockets, which are represented at 252 in FIG. 14.

The inclusion of a replaceable direct access arrangement, also referred to as a data access arrangement (abbreviated "DAA"), provides important advantages not previously available in the industry. In the past, DAAs provided a few functions such as: matching the impedances between the telephone line and the modem; receiving data from the telephone line; transmitting data onto the telephone line; providing a pulse dial; and detecting an incoming ring signal. Significantly, different countries and regions of the world require that the DAA carry out different functions.

Presently, it has become practice in the industry to supply a DAA with a modem in accordance with whatever country the user intends to make the connection to a telephone line, i.e., "U.S." modems are sold in the U.S. and "German" modems are sold in Germany. Since desktop personal computers are very seldom moved from country to country, it has been satisfactory in the past to purchase a modem which can be used in only one country; if the user moved, a new modem was purchased if necessary.

Significantly, the widespread popularity of portable personal computers, and the use of PCMCIA cards in desktop computers, has meant that the computer or the computer peripheral is not bound to any particular location but can travel to any location in the world. Unfortunately, the industry has not recognized, and has not begun to effectively solve, the problems faced by a portable computer user traveling from country to country. Available telephone communication devices are ill suited for use in one or more countries which a user might visit. Even if the desirability of providing a telephone communication device and DAA which is suitable for use in multiple countries was recognized in the industry, the requirements of some countries mandate the use of components which seem too large to allow their incorporation into a communications card which is used with a portable computer.

The present invention solves these problems found in the industry by including a replaceable DAA 258 which is received into a cavity which is generally indicated at 254 in FIG. 14. The replaceable DAA 258 not only can carry out the customary functions already known in the art, but in accordance with the present invention the replaceable DAA 258 can also carry out other desirable functions as described herein.

The replaceable DAA 258 preferably makes electrical connection with the communications card 250 via twenty connector pins 256 provided in the back of the cavity 254 and corresponding connector sockets 260 provided on the rear of the DAA 258. As necessary, a user can install an appropriate replaceable DAA 258 to perform the functions necessary to obtain direct connection to a country's telephone system or to perform some other function.

It will be appreciated, and as will be explained shortly, the replaceable DAA 258 can house components different than those necessary to connect to a telephone line such as providing the components necessary to interface with a computer network or provide wireless communication service such as cellular telephone service or carry out some other function.

Represented in FIG. 14 are grooves 255 into which are received respective ridges 262 provided on the sides of the replaceable DAA 258. The grooves 255 are more clearly represented in the end view of FIG. 14A. The grooves 255 and the ridges 262 function to guide the replaceable DAA 258 into and out of the cavity 254. The replaceable DAA 258 is preferably held in the cavity 254 by a pair of flexible ledges 264 which engage corresponding notches 257 provided on the inner surface of the cavity 254. FIG. 14B illustrates the communications card 250 when the replaceable DAA 258 is fully inserted into the cavity 254.

To remove the replaceable DAA 258 from the remainder of the communications card 250, a pair of tabs 266 are squeezed, resulting in the ledges 264 being released from the notches 257, and allowing the replaceable DAA 258 to be extracted from the cavity 254. It will be appreciated that many different arrangements can be arrived at by those skilled in the art to allow the components of the replaceable DAA 258 to be connected to, and removed from, the remainder of the communications card 250.

The replaceable DAA 258 illustrated in FIG. 14 is provided with a receptacle module 270 which is provided with a pair of RJ-xx series receptacles represented at 278A&B which are adapted to connect to a communications line having a RJ-xx series plug such as those represented in FIGS. 1–3. It will be appreciated that the RJ-xx series receptacles 278A&B can be provided with the expandable member 114 shown in FIG. 2 if desired. It is within the scope of the present invention to provide the receptacle module 270 with structures to allow its removal as shown in FIG. 1 or to include structures to allow extension out of, as shown by the phantom image of FIG. 14, the replaceable DAA 258 and retraction into the replaceable DAA 258 in the direction of arrow 272 as represented in FIG. 14B.

Figure 14B:
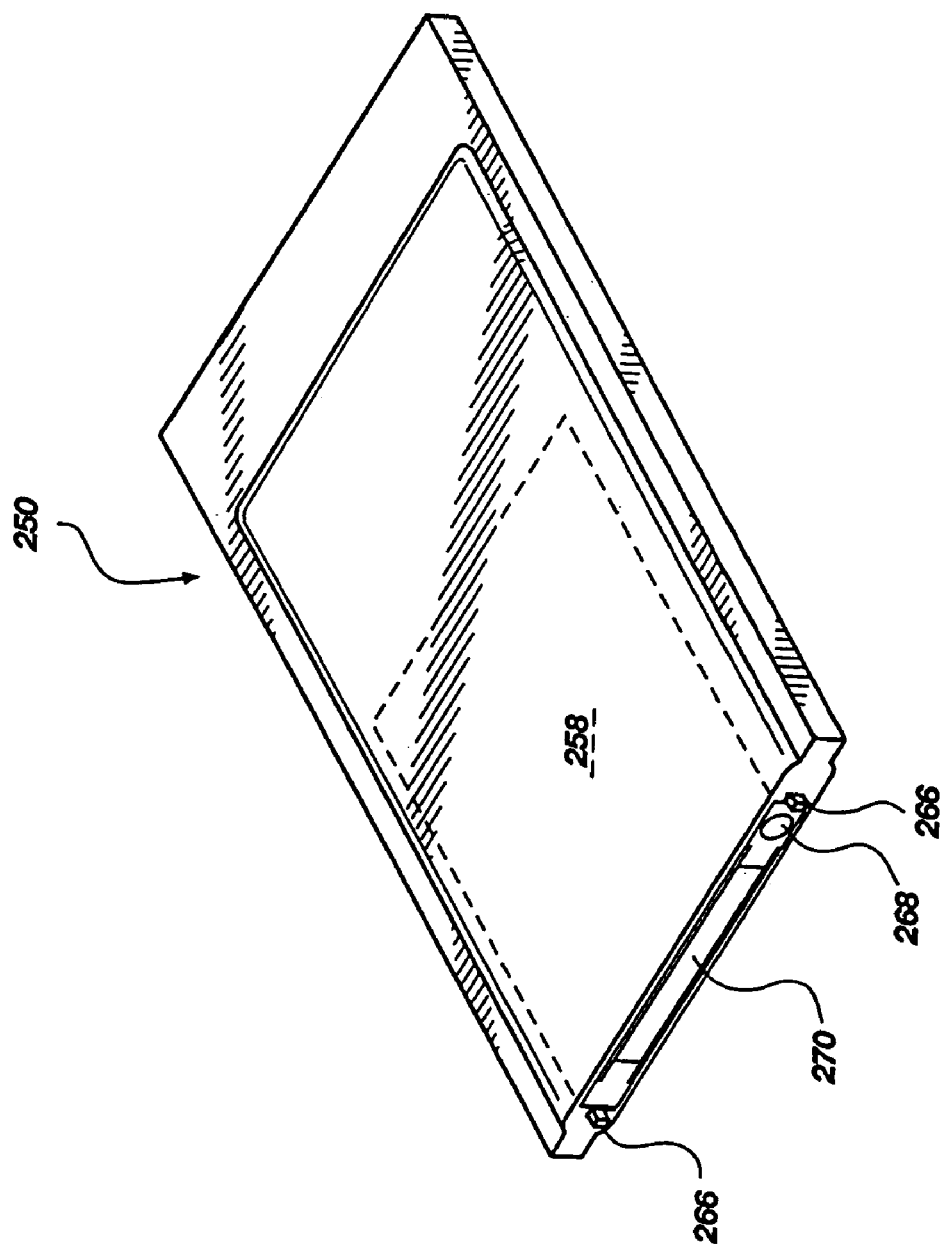
FIG. 14B is a perspective view of the embodiment illustrated in FIG. 14 showing the components retracted into the communications card.
Figure 14C:
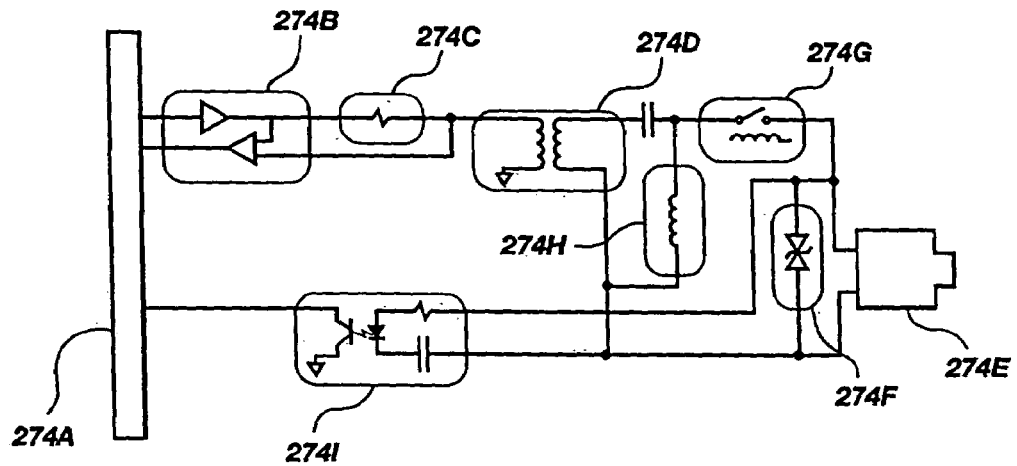
FIGS. 14C–E are block diagrams illustrating the preferred functions carried out by the replaceable direct access arrangement unit.
Figure 14D:
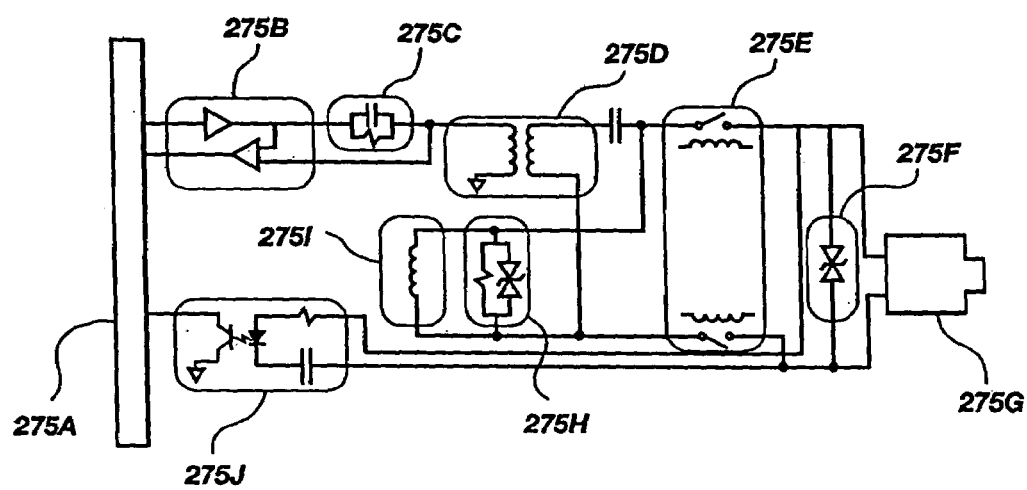
Figure 14E:
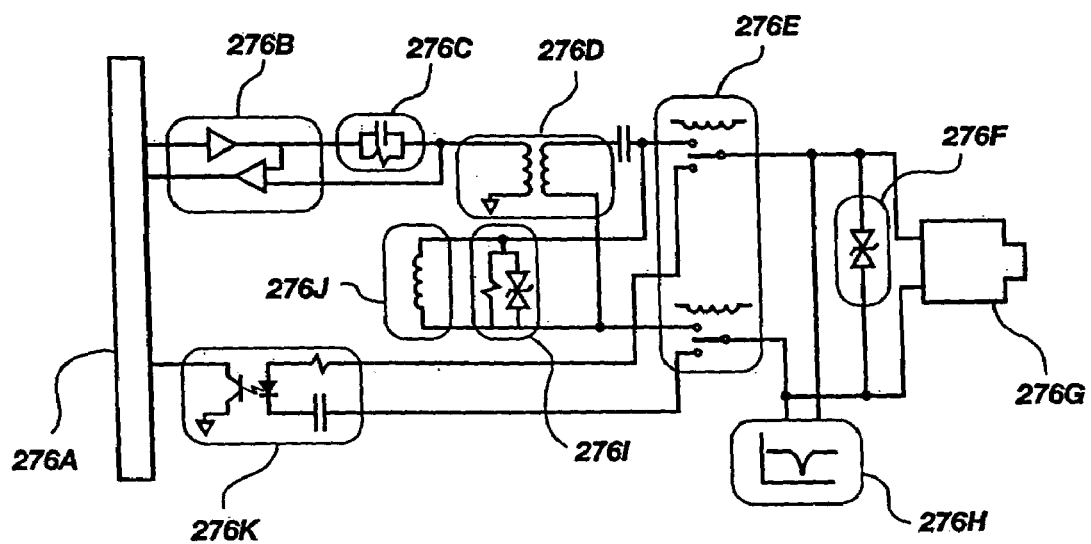

FIGS. 14C–E are high level block diagrams illustrating some of the preferred functions carried out by the replaceable DAA 258. As suggested above, a number of different replaceable DAA 258 units can be provided, each being adapted to carry out a particular function and the user changing the replaceable DAA 258 as necessary. Provided below in Tables A–C are descriptions of the preferred functions carried out by the blocks represented in FIGS. 14C–E, respectively.

TABLE A

FIG. 14C
US DAA

| | |
|---|---|
| 274A | Modem connection |
| 274B | Hybrid circuit |
| 274C | AC impedance network |
| 274D | Signal transducer |
| 274E | Line connector |
| 274F | Transient protection |
| 274G | Loop relay |
| 274H | DC holding current |
| 274I | Ring detect circuit |

TABLE B

FIG. 14D
Norway DAA

| | |
|---|---|
| 275A | Modem connection |
| 275B | Hybrid circuit |
| 275C | AC impedance network |
| 275D | Signal transducer |
| 275E | Loop relays |
| 275F | Transient protection |
| 275G | Line connector |
| 275H | Pulse dial |
| 275I | DC holding current |
| 275J | Ring detect |

TABLE C

FIG. 14E
German DAA

| | |
|---|---|
| 276A | Modem connection |
| 276B | Hybrid circuit |
| 276C | AC impudence network |
| 276D | Signal transducer |
| 276E | Loop relays |
| 276F | Transient protection |
| 276G | Line connector |
| 276H | Billing tone filter |
| 276I | Pulse dial |
| 276J | DC holding current |
| 276K | Ring detect |

Figure 14F:
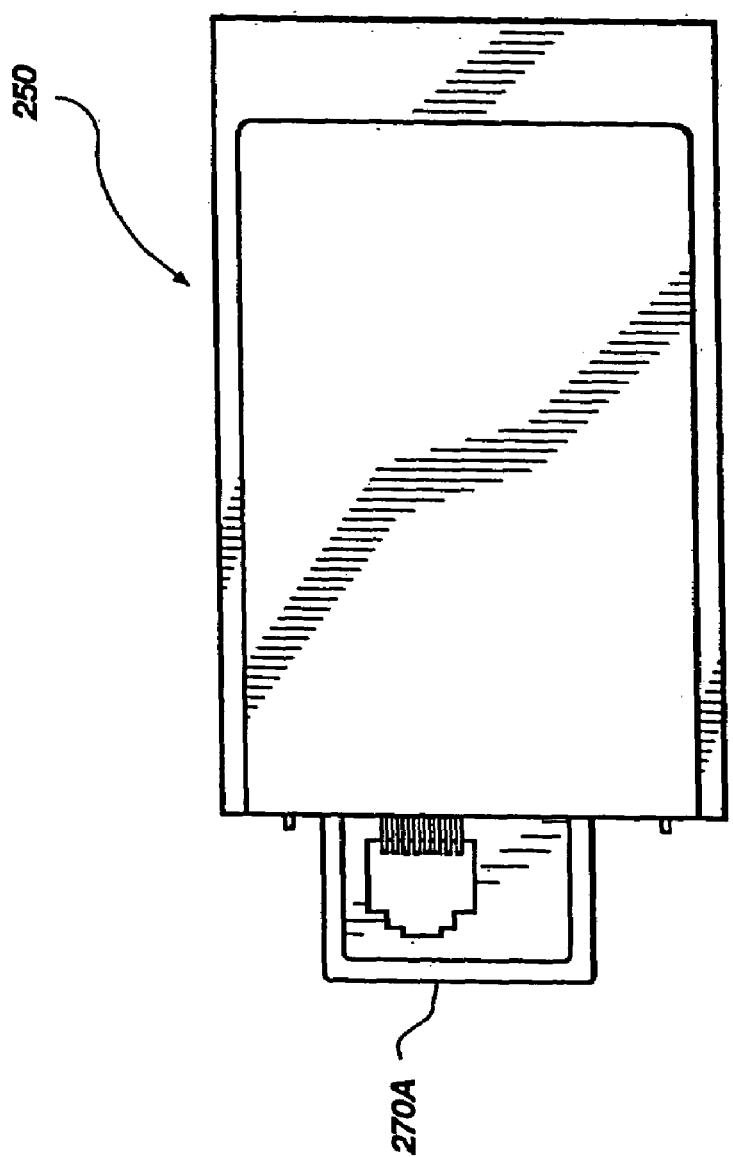
FIG. 14F is a top view of a communications card having another replaceable direct access arrangement unit installed therein.

FIG. 14F shows a receptacle module 270A which includes only a single RJ-xx series receptacle. Some country's regulations require that only a single telephone line be connected to a telecommunications device. The RJ-xx series receptacle illustrated in FIG. 14F is preferably an eight conductor RJ-45 receptacle. The DAA to which the receptacle module 270A is connected preferably provides the interfacing functions needed to directly attach to the telephone system of the particular country or countries.

Reference will next be made to FIGS. 15A–D which are detailed views of the receptacle module 270 and the structures which allow the receptacle module 270 to extend out of or retract into the replaceable DAA 258 (shown in FIG. 14). It will be appreciated that the structures which allow extension and retraction of the receptacle module 270 can be incorporated into the replaceable DAA 258, directly into a communications card 250, or into any other device which would benefit from the compact communications connector described herein.

Prior to the present invention, if the structures providing RJ-xx series connectors were affixed to the PCMCIA pOcommunications card, the connectors would be broken off or damaged and the user would be required to discard the entire communications card and would be stranded with an inoperative communications card. The devices described in U.S. Pat. No. 5,183,404 to Aldous are particularly afflicted by this problem. Prior to the advent of the instant invention, the industry had not recognized the described incidents as a significant problem and the industry has not been able to arrive at the solution described herein.

The present invention allows the structures which provide the communications receptacles to be readily replaced by the user. The user may need to replace the structures which provide the communications receptacles due to damage or in order to interface with different communications lines or devices. The present invention provides these advantages which have not otherwise been available in the industry. Thus, the user can replace damaged receptacle structures, or replace the structure if other functions are necessary, quickly and without any difficulty.

Figure 15B:
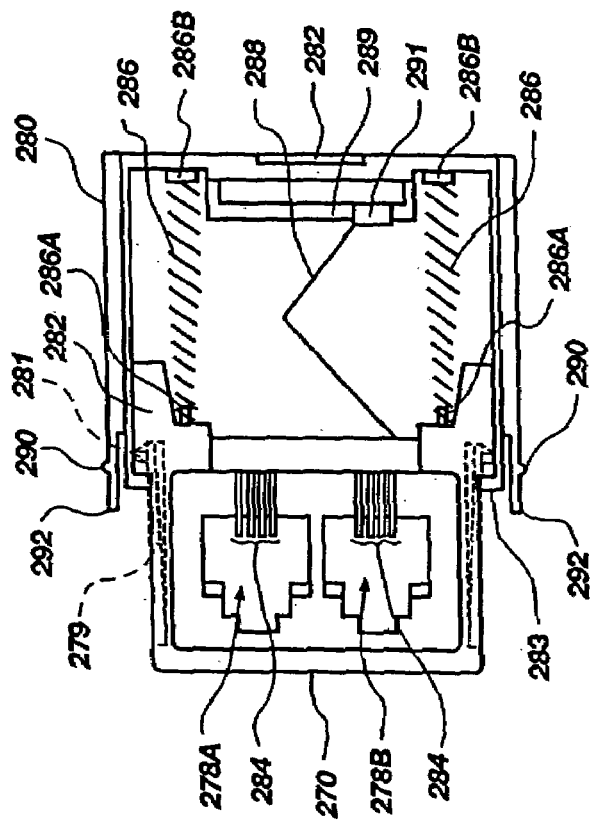
FIGS. 15A and 15B are top views showing the electrical interconnection between the receptacle module and the replaceable direct access arrangement (not shown in these figures) and the accompanying mechanism which retracts and extends the receptacle module into and out of the replaceable direct access arrangement.
Figure 15D:
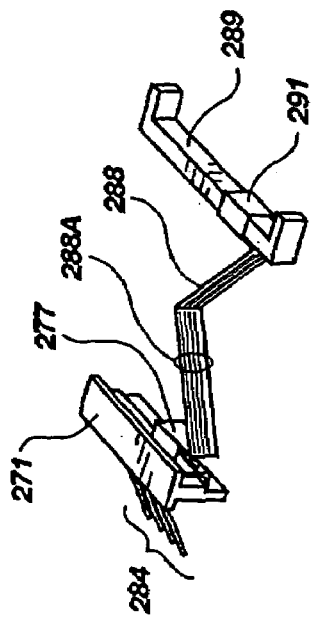
FIG. 15D is a detailed perspective view of the electrical interconnection circuit between the receptacle module and the frame.
Figure 15A:
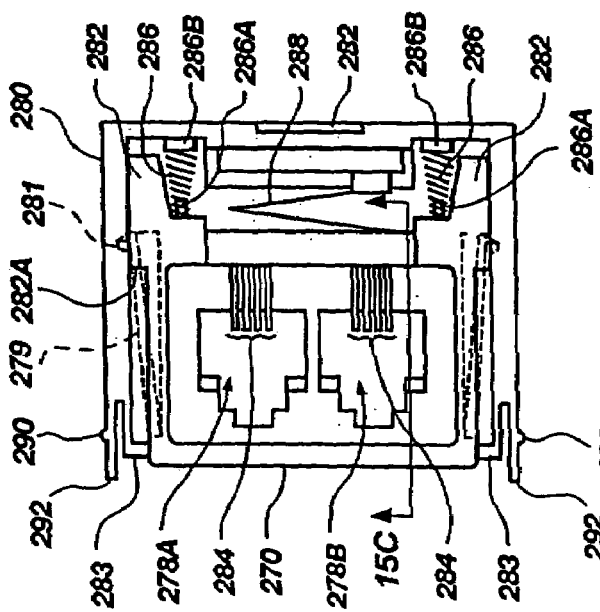

Represented in FIGS. 15A and 15B is a receptacle module 270 which includes two RJ-xx series receptacles, generally represented at 278A&B. FIG. 15A shows the receptacle module 270 in its retracted position. FIG. 15B shows the receptacle module 270 in its extended position. Each of the RJ-xx series receptacles 278A&B is provided with four conductors represented at bracket 284. It will be understood that the representation of the RJ-xx series receptacles 0öde-scribed herein is exemplary of one presently preferred application with inclusion of other types of connectors and devices also being within the scope of the present invention.

A frame 280 is shown in FIGS. 15A&B. The frame 280 is, for example, received into a cavity (not represented in FIGS. 15A&B) provided in the replaceable DAA 258 and is held in place by locking ridges 290 which engage notches 273 (FIG. 14). An electrical connector represented at 282 in FIGS. 15A–B provides electrical connection and provides further physical stability and can be selected by those skilled in the art using the information provided herein. The frame 280 is removed from the replaceable DAA 258 by the user squeezing together tabs 292 and the frame 280 being pulled from the replaceable DAA 258. It will be appreciated that the structures represented in FIGS. 15A&B can be incorporated into many different devices which are now available in the industry or which may become available in the future.

As represented in FIGS. 15A&B, the receptacle module 270 is biased in its extended position by springs 286. The springs 286 are held in place by posts 286A and 286B. A flexible interconnecting circuit 288 provides electrical connection between the connector 282 and the conductors 284. Further information regarding the interconnecting circuit 288 will be provided in connection with FIGS. 15C&D. As will be appreciated by those skilled in the art, the structures described herein provide the advantage of being more compact than previously possible following conventional teachings in the art.

Figure 15C:
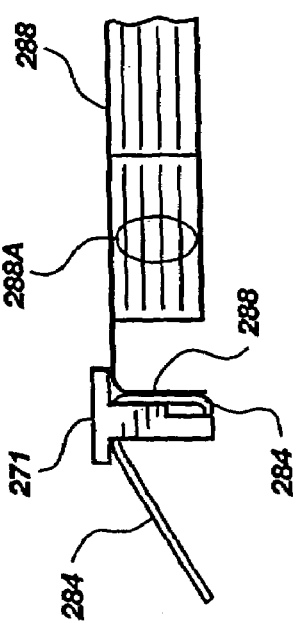
FIG. 15C is a detailed side view of the electrical interconnection circuit between the receptacle module and the frame.

FIGS. 15C&D show a flexible interconnecting circuit 288 which provides a plurality of conductors indicated at 288A. The flexible interconnecting circuit 288, rather than utilizing pin and socket terminal connections, relies on surface mount connections thus making the structures more compact. The electrical signals received at the connector 282 (FIGS. 15A&B) are conveyed to conductors (not illustrated) formed on the surface of a bar 289 and a holding clip 291 presses the conductors 288A onto the appropriate conductors formed on the surface of the bar 289. The flexible interconnecting circuit 288 bends as necessary to accommodate the extension and retraction of the receptacle module 270.

To make a surface electrical connection with the conductors of the RJ-xx series receptacles, the conductors 284 p0being held in place by a member 271, the flexible interconnecting circuit 288 is folded so that the conductors 288A are pressed against a corresponding conductor represented at 284. The flexible interconnecting circuit 288 is held in place on the member 271 by a clip 277. The receptacle module 270 can provide electrical interconnection between the conductors 284 of the RJ-xx series receptacles 278A&B. Using the described structure, a reliable and compact arrangement is provided to make electrical connection with the RJ-xx series receptacles.

Referring again to FIGS. 15A&B, a pair of flexible arms 279 are each provided with a protruding knob 281 which is received into a groove formed in the inner surface of the frame which allows the receptacle module 270 to slide within the frame 280 and hold the receptacle module 270 in either its extended or retracted position. Projecting from the side of the receptacle module 270 are wings 282 which provide further positional stability. The leading edge 282A of the wings 282 abuts a stop 283 on the frame to limit the extension motion of the receptacle module 270. The operation of the flexible arms 279 in the retraction and extension movement will be explained in further detail by reference to FIGS. 16A–D.

FIG. 16A is a side view of the inner surface of the frame 280 showing a groove 306 formed therein and the receptacle module 270 in its retracted position. As can be seen in FIG. 16A, the knob 281 is held in a trough 306A. The shape of the knob 281 and the shape of the trough 306A, together with the biasing action of the springs (286 in FIGS. 15A&B), keep the knob 281 in the trough 306A. When extension of the receptacle module (270 in FIGS. 15A&B) is desired, the user pushes in on the receptacle module 270 so that the sloping rear side of the knob 281 causes the free end of the flexible arm 279 to bend upward allowing the knob 281 to escape the trough 306A and move forward in the groove 306 to the extended position represented in FIG. 16B. FIG. 16C provides a side view of the flexible arm 279 showing its vertical movement as represented by arrow 308. FIG. 16D provides a top view of a portion of the receptacle module 270 further showing the shape of the knob 281 and the horizontal movement of the flexible arm 279. It will be appreciated that the described structures provide a simple and reliable arrangement for extending and retracting the receptacle module 270 and which advantageously is more compact than previously available structures. By making the retraction and extension structures more compact, more room is provided for other components.

Reference will next be made to FIGS. 17A–C which illustrate in detail additional structures which allow the receptacle module 270 to extend out of or retract into the replaceable DAA 258 (shown in FIG. 14) and the electrical interconnection between the connector 287 and the conductors 284 in the RJ-xx series receptacles. Many of the structures represented in FIGS. 17A&B are the same as the correspondingly numbered structures represented in FIGS. 15A&B. Thus, only the differences between the represented structures will be described.

Represented in FIGS. 17A&B is one of at least two exposed conductors represented at 294A which is attached to the inner surface of frame 280. FIG. 17C shows two sliding electrical contacts 296A and 296B. The sliding electrical contacts 296A&B are preferably of the spring type to ensure that each of the sliding electrical contacts 296A&B makes solid electrical contact to each of the respective conductors, one of which is represented at 294A in the top views of FIGS. 17A&B. An electrical connection is made from the sliding electrical contacts 296A&B, through the receptacle module 270, and to the appropriate conductor 284. It will be understood that many variations on the electrical interconnection structures can be carried out within the scope of the present invention using the information set forth herein.

FIGS. 18A&B will be referred to next to describe the structures which allow the receptacle module 270 to extend and retract. FIG. 18A is a cross sectional top view of the receptacle module 270 showing a groove formed therein. Still referring to FIG. 18A, provided on the inner surface of the stop 283 is a pin 301 which is held in a recess 304 and biased outwardly from the recess 304 by a spring 302. In FIG. 18A, the solid image of the stop 283 and the pin 301 shows their position in the groove 300 when the receptacle module 270 is in its extended position. The biasing force of the spring 286, partially represented in FIGS. 18A&B, holds the receptacle module 270 in its extended position.

Reference will now be made to both FIGS. 18A and 18B to explain the movement of the receptacle module 270 from its extended position to its retracted position. When the receptacle module 270 is to be moved to its retracted position, the user (not represented in the figures), pushes the receptacle module 270 toward the frame 280. The pin 301 travels in the groove 300 up the ramp 300A and into the well 300B where the pin 301 is held. The retracted position of the receptacle module 270 is represented by the phantom image in FIG. 18A. To move the receptacle module 270 from its retracted position to its extended position, the user again pushes the receptacle module 270 inward toward the frame 280 which causes the pin 301 to move out of the well 300B up a ramp indicated by arrow 300C. The user then releases the receptacle module 270 which allows the receptacle module 270 to extend and the pin 301 to travel down a ramp indicated by arrow 300D where the pin 301 again enters groove 300 and the receptacle module 270 completes its extension.

Reference will next be made to FIGS. 19A–C. In order to accommodate wireless communication between the communications card and a wireless communication system, an antenna is provided on the communications cards represented in FIGS. 19A–C. The embodiments of the present invention illustrated in FIGS. 19A–C are particularly adapted for accommodating cellular telephone signals but those skilled in the art can readily adapt the embodiments to accommodate other communication systems, including those utilizing radio frequency techniques as well as other mediums.

FIG. 19A illustrates an antenna 312 which pivots into and out of the end of the communications card 250 in the directions of arrow 312A. When use of the antenna is desired, the user depresses a release button 315 which allows the antenna to pivot out of the end of the communications card.

FIG. 19B illustrates an antenna 318 which is pivotally mounted on a retractable block 314. When use of the antenna is desired, the user depresses a release button 315 which allows the antenna 318 to pivot in the directions of arrow 318A. The retractable block 314 can be stored within the communications card and extended and retracted in the directions of arrow 314A and released from its retracted position by depressing button 316.

FIG. 19C illustrates an antenna 322 which is pivotally mounted on a retractable block 320. The retractable block 320 is extended by depression of button 316. When the retractable block 320 is extended, the antenna 322 is pivoted up or down in the direction of arrow 322A. Also provided on the retractable block 320 is a receptacle 324 allowing a communications line to also be attached thereto.

Each of the arrangements represented in FIGS. 19A–C can be best adapted for use with particular types of antenna which may assume shapes and sizes very different than the illustrated antennas. For example, antennas which are vertically polarized, horizontally polarized, or circularly polarized can have application with the embodiments of the present invention. Moreover, the antennas used with the embodiments illustrated in FIGS. 19A–C can include components which extend or further pivot to increase the length of, or change the shape of, the antenna. Those skilled in the art will appreciate that the components necessary to carry out wireless communication, such as cellular telephone communication, can be packaged in the communications card 250 or in a DAA adapted for such purpose. Further information regarding wireless computer networks can be obtained from IEEE 802.11 Standard (and any available drafts thereof) which is now incorporated herein by reference in its entirety.

Figure 20:
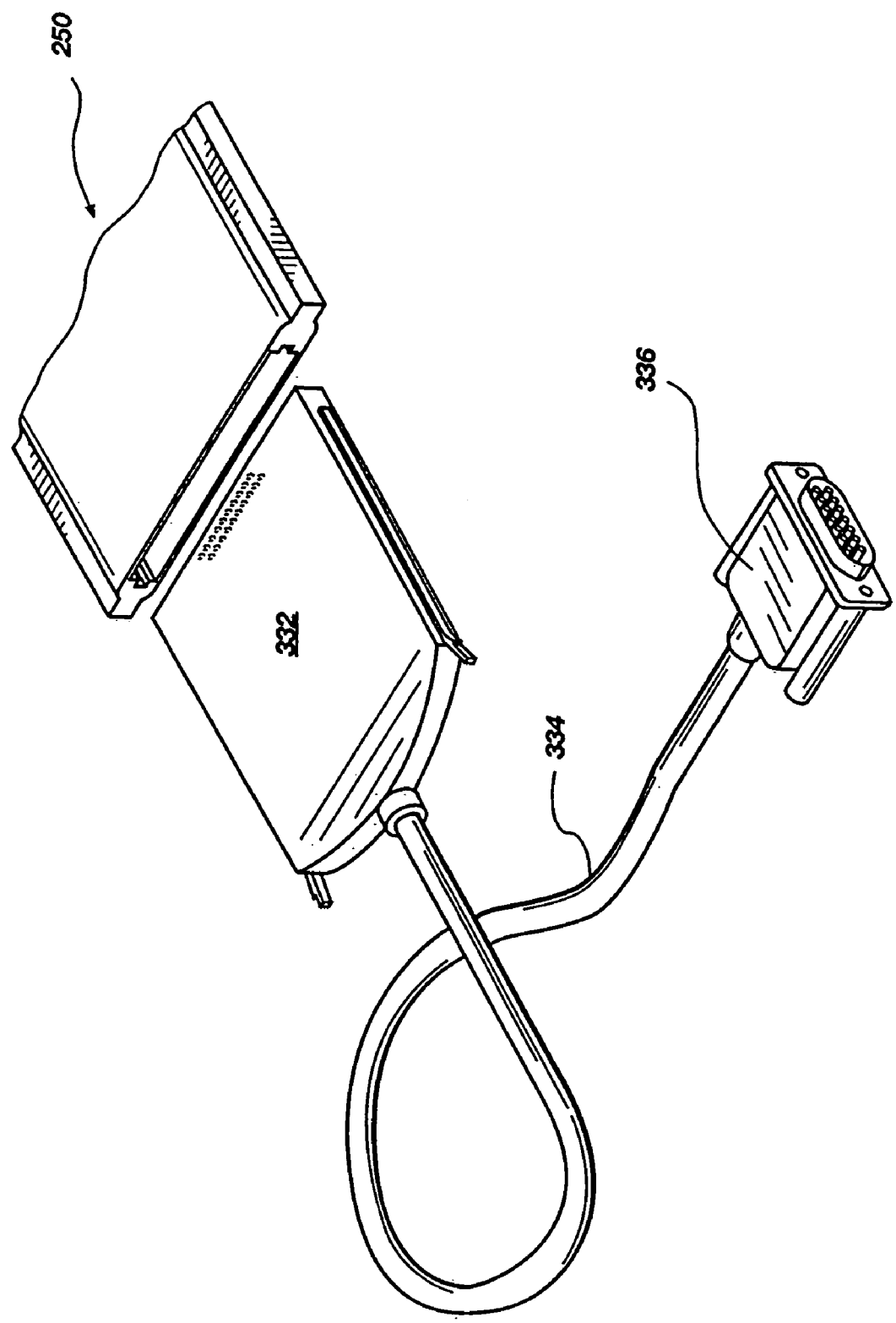
FIG. 20 is a perspective view of an embodiment of the present invention which is adapted for use with a portable cellular telephone.

Reference will next be made to FIG. 20 which shows a communication card 250 and a replaceable DAA 332 which are adapted to interface with a portable cellular telephone via a cable 334 and a connector 336 which attaches directly to a corresponding connector (not illustrated) on the portable cellular telephone (not illustrated). It will be appreciated that those skilled in the art will be able to provide replaceable DAAs 332 and connectors 336 which are adapted to function with any number of cellular telephones or other communications devices and which allow the user to easily and quickly change the application to which the communications card is put.

Figure 21:
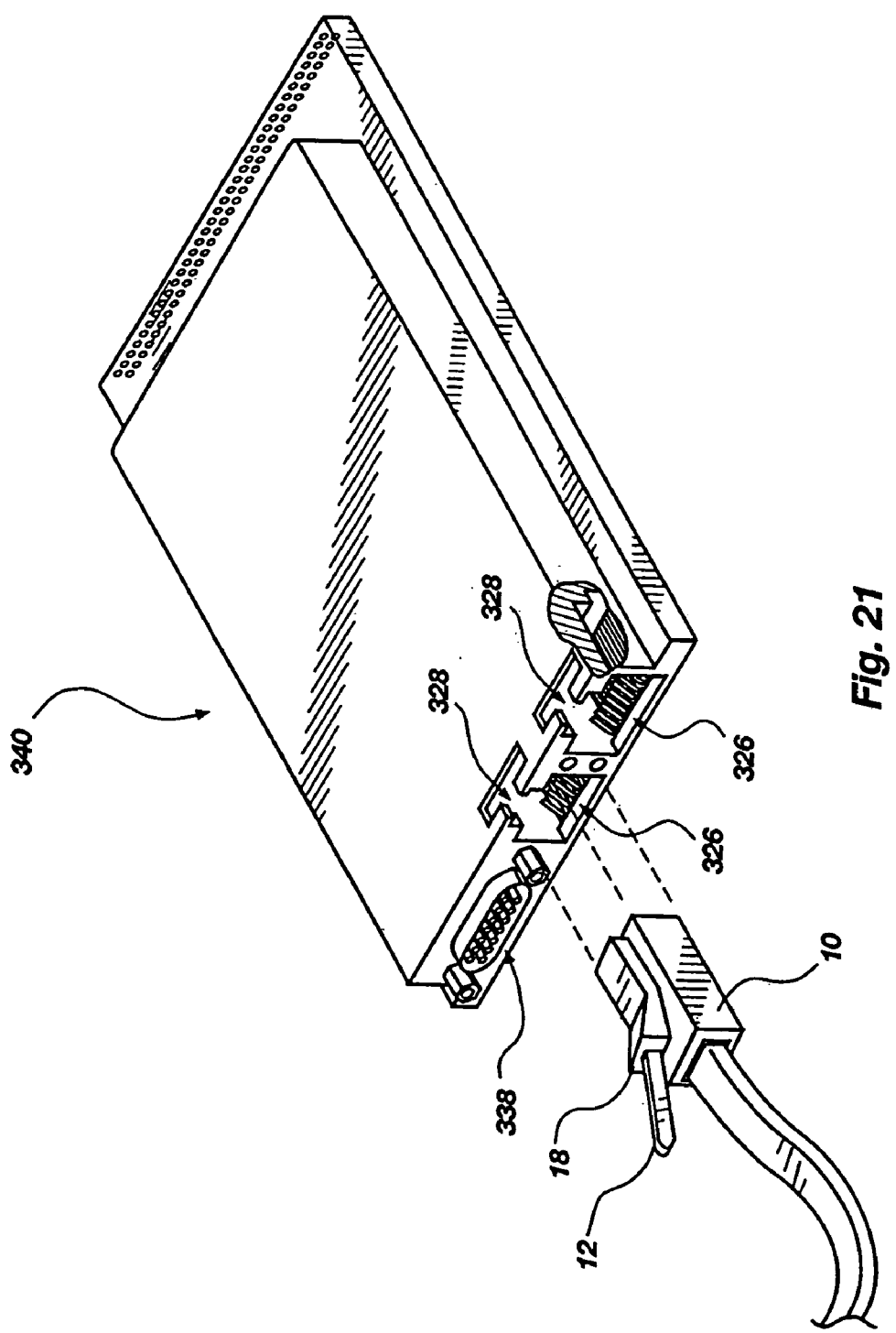
FIG. 21 is a perspective view of a communications card in accordance with the present invention having an RJ-xx series receptacle placed directly in the end thereof.

Reference will next be made to FIG. 21. FIG. 21 provides a perspective view of a communications card generally designated 340. The communications card 340 follows the PCMCIA (also referred to as PC Card) Type III standard for dimensions and configuration. The height of a PCMCIA Type III card is still not great enough to allow a standard RJ-xx series receptacle to be mounted therein. In the communications card 340 illustrated in FIG. 21, a T-shaped cutout 328 is removed from the housing of the communications card 340. The T-shaped cutout 328 accommodates the biased clip 12 and the ridge 18 present on the plug 10. The shape of the T-shaped cutout 328 engages the biased clip 12 and the ridge 18 to hold the plug 10 in place. Represented in FIG. 21 are two receptacles, each generally designated at 326. Preferably, one of the receptacles 326 is an eight conductor RJ-45 receptacle, which is called for in some computer network standards, and the other of the receptacles 326 is an RJ-11 receptacle. As can be seen in the figures, and particularly in FIG. 21, the PCMCIA Type III PC card 340 includes an upper surface 350 and a lower surface 352 which form a portion of the housing for the communication card 340. Also represented in FIG. 21 is a connector 338 which can be used to make a connection to another communication device (in a manner similar to that described in connection with connector 336 illustrated in FIG. 20), as is known in the art.

Figure 21A:
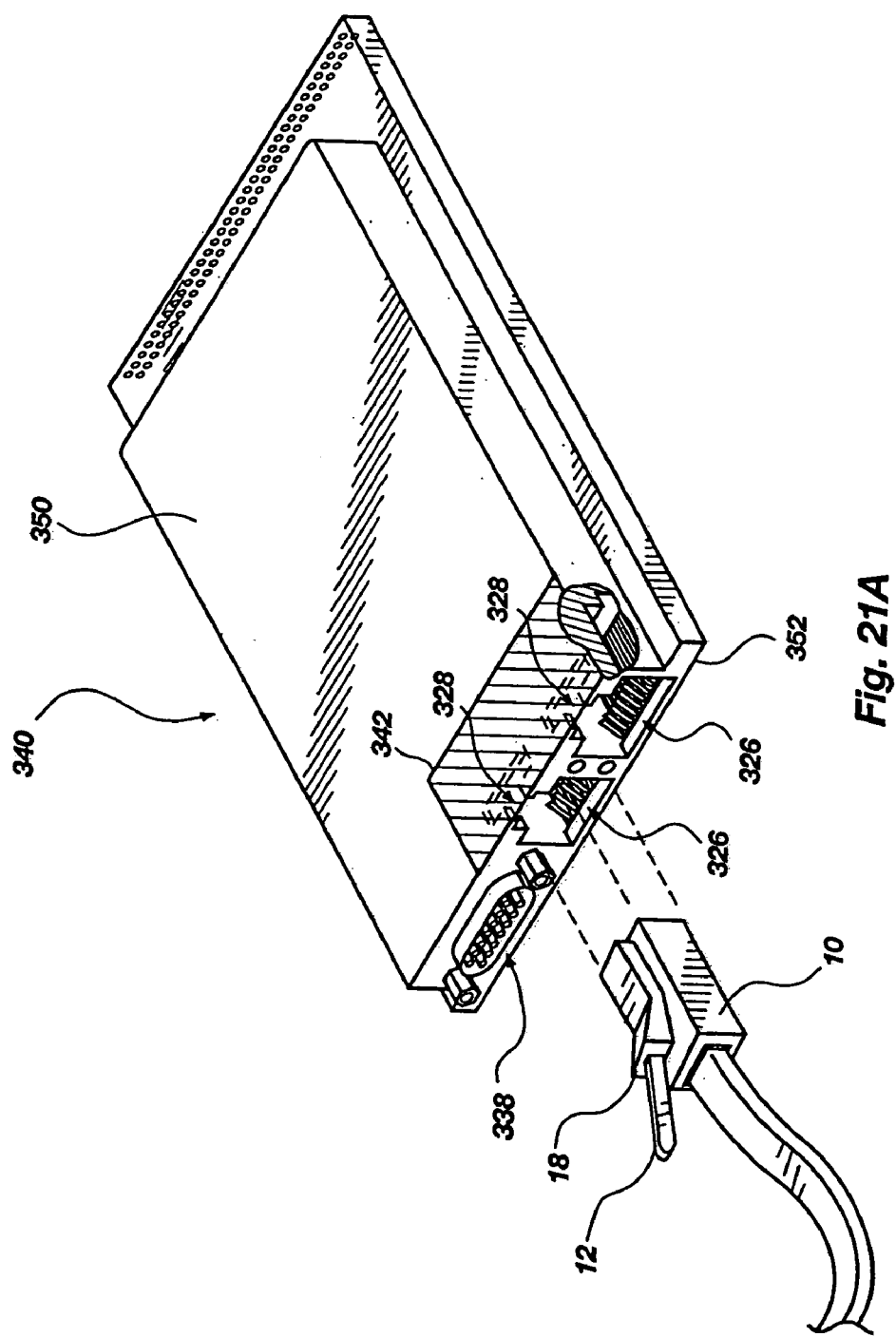
FIG. 21A is a perspective view of another communications card in accordance with the present invention having an RJ-xx series receptacle placed directly in the end thereof.

Reference will next be made to FIG. 21A which shows all of the structures represented in FIG. 21 with the inclusion of a cover 342 which shields the T-shaped cutouts 328 and the receptacles 326. The cover 342 is preferably a thin membrane-like material which is attached to, or integral with, the upper surface. The cover can preferably be fabricated from a material having a thickness in the range from about 0.001 inch to about 0.050 inches thick such that the card 340 maintains compliance, or substantial compliance, with the pertinent PCMCIA card physical thickness standard. It is also within the scope of the present invention to fabricate the cover 342 from an elastic material. Moreover, the cover 342 can be structured to straddle the entire upper surface 350 of the PC Card 340, or just a portion of the upper surface 350, as deemed best for the particular application of the invention.

Figure 22:
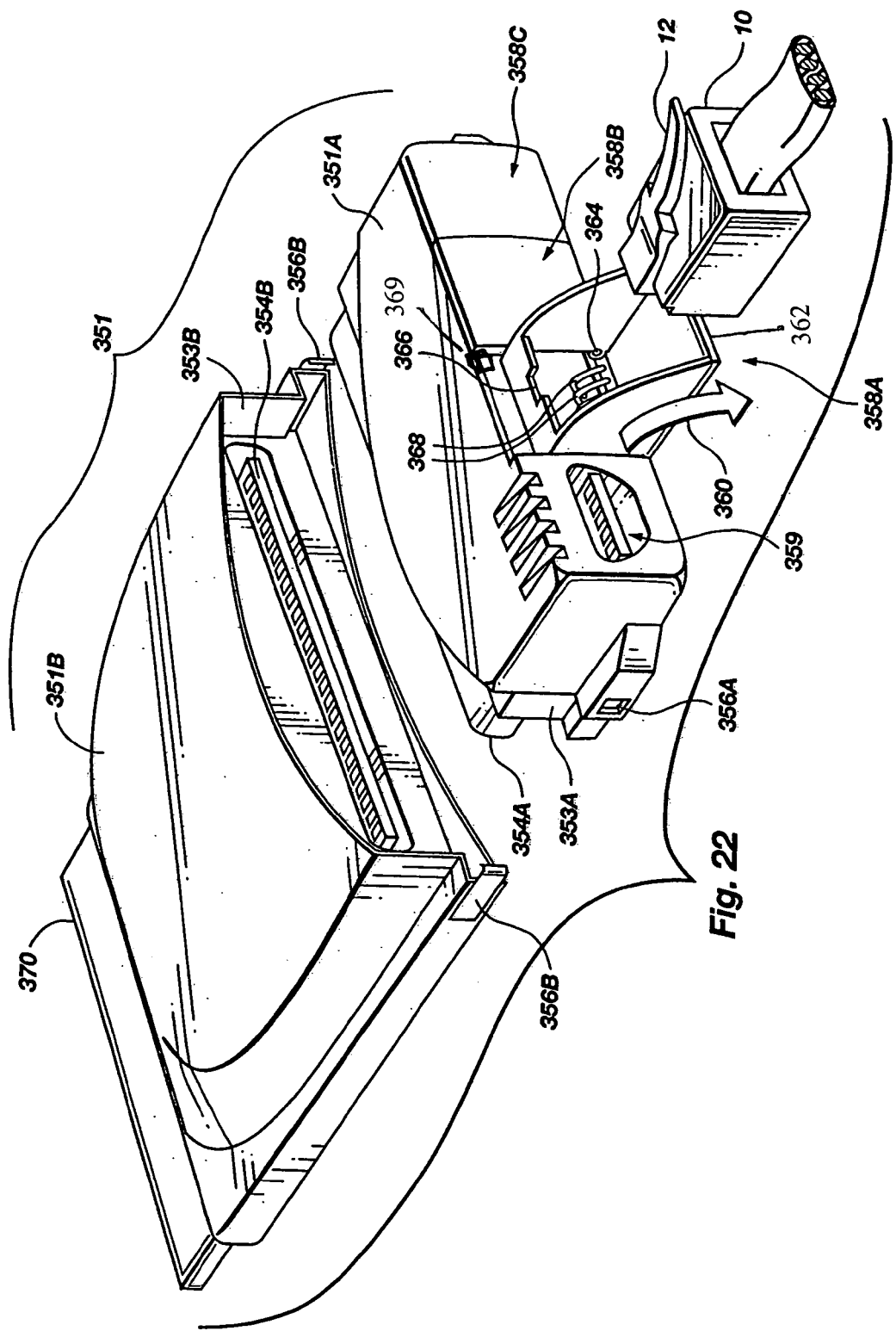
FIG. 22 is a perspective view of a communications card in accordance with the present invention having a plurality of RJ-xx series receptacles with pivoting covers positioned in an end thereof.

Reference will next be made to FIG. 22. FIG. 22 is a perspective view of another communications card, generally indicated by the bracket 351, in accordance with the present invention. The communications card 351 preferably follows the PCMCIA (also referred to as PC Card) Type III standard for dimensions and configuration. The communications card 351 has a plurality of RJ-xx series receptacles 358A–C which are each provided with a pivoting cover, one of which is indicated at 362. The pivoting cover 362 pivots about pin 364 as represented in FIG. 22 and is biased closed by biasing means 369.

The communications card 351 include two major components, a card body 351B and a connector housing 351A. Many of the embodiments of the present invention described hereinafter will have a similar structure and the description provided now will apply to all similarly structured embodiments. The card body 351B includes a front end 370 which provides connector sockets in accordance with the PCMCIA standard. The connector housing 351A provides the necessary physical/electrical components to connect to one or more communications lines. For example, the connector housing 351A includes RJ-xx series receptacles 358A–C and an auxiliary connector, generally indicated at 359, which preferably can be a connector suitable for coupling to a wireless communication device, for example a portable telecommunications device which complies with the GSM (Global System for Mobile Communications) communications standard. The connector housing 351A so preferably includes the DAA components such as those described earlier and others which perform similar functions.

The connector housing 351A can be removed from the card body 351B and replaced with another connector housing 351A in case a connector housing 351A becomes damaged, if another DAA is needed by a user, and/or if different connectors are needed. It is also to be appreciated that the card body 351B and connector housing 351A arrangement illustrated in FIG. 22 provide advantages even if the distribution of components is different than that preferably described herein, for example, if the DAA is located in the card body 351B rather than in the connector housing 351A.

Still referring to FIG. 22, to provide a secure mating between the card body 351B and the connector housing 351A, a female portion 353B receives a male portion 353A when the connector housing 351A is mated to the card body 351B. Moreover, the structure of the electrical connector which provides for communications between the card body 351B and the connector housing 351A, comprising a connector receptacle 354B and a connector plug 354A, further enhances the physical and electrical connection between the card body 351B and the connector housing 351A. Two spring fingers 356B are received by recesses, one of which is represented at 356A, to further secure the card body 361B and the connector housing 351A together. It is to be appreciated that the structures illustrated in FIG. 22, and the other figures herein described, are merely exemplary and many different connector configurations can be used within the scope of the present invention.

When the connector housing 351A and the card body 351B are joined together, and the communications card 351 is received into a computing device, communications via a communications line, such as that shown connected to the RJ plug 10, is read to occur. A pivoting cover, such as that represented at 362, is provided for each one of the RJ-xx series receptacles 358A–C. The RJ-xx series receptacles 358A–C can be fabricated to receive any of the RJ-xx series plugs, such as RJ-11, RJ-12, and RJ-45 plugs. With the pivoting covers in the closed position, the components of the connector housing 351A are protected and the overall length of the communications card 351 is reduced. When the pivoting cover, for example pivoting cover 362, is moved in the direction of arrow 360, the RJ plug 10 can be inserted into the recess formed by the pivoting cover 362. A ledge 366 engages the biased clip 12 and holds a plurality of spring conductors 368 located in the recess in electrical contact with the corresponding contacts in the RJ plug 10 when inserted therein.

Those skilled in the art will readily be able to arrive at numerous alternative structures capable of providing the electrical functions required by the connector housing 351A and the card body 351B using the information set forth herein and known in the industry. Thus, when the pivoting cover 362 is open as illustrated in FIG. 22, an RJ plug is inserted therein and communications via a communications line can efficiently occur.

Figure 23:
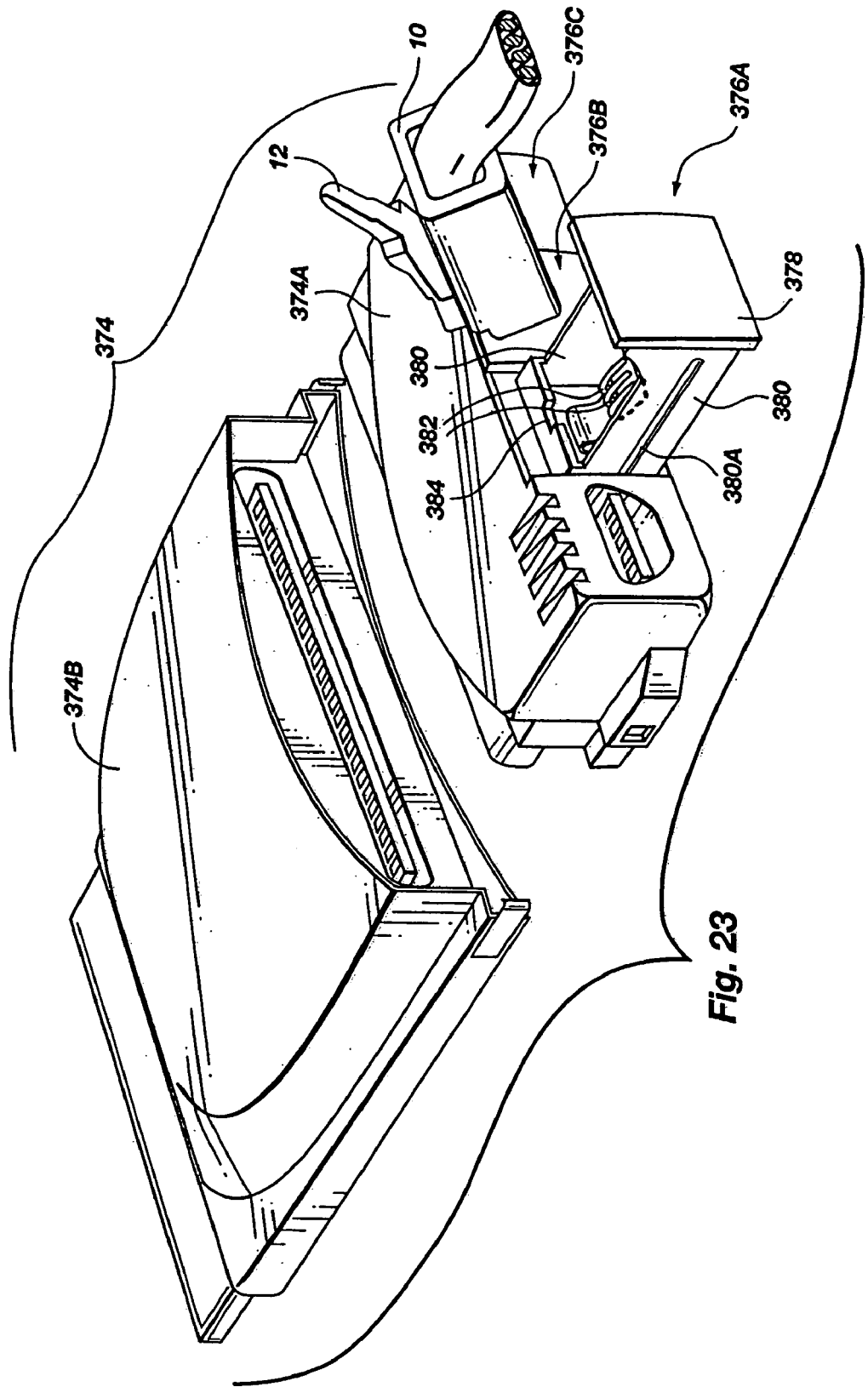
FIG. 23 is a perspective view of a communications card in accordance with the present invention having a plurality of RJ-xx series receptacles located in sliding drawers positioned on the end of the communications card.

Reference will next be made to FIG. 23. FIG. 23 is a perspective view of another communications card, generally indicated by bracket 374. The communications card 374 includes many of the structures described in connection with communications card 351 illustrated in FIG. 22. Thus, only the different and/or additional structures will be discussed in connection with the communications card 374 represented in FIG. 23.

As shown in FIG. 23, a card body 374B and a connector housing 374A are included in the communications card 374. The connector housing 374A includes three RJ-xx series receptacles Which are contained in sliding drawers, generally indicated at 376A–C. The sliding drawers 376A–C each include a drawer front, one of which is shown at 378, and drawer sides, represented at 380. Drawer ridges, one of which is shown at 380A, are provided on the drawer sides 380 and are one example of a structure which can be used to allow the sliding drawers to retract into, and extend from, the connector housing 374A. When the sliding drawers 376A–C are in their closed position, the internal components of the connector housing 374A are shielded from damages and contamination.

As represented in FIG. 23 at sliding drawer 376A, when an RJ plug 10 is to be connected, the sliding drawer 378 is extended from the connector housing 374A, and the RJ plug 10 is inserted therein at an angular orientation as represented in FIG. 23. The sliding drawers 376A–C include structures to hold the RJ plug 10 at the preferred angular orientation when the RJ plug 10 is inserted therein. As the RJ plug 10 is received into the sliding drawer 376A the biased clip 12 engages a ledge 384 which holds the electrical contacts of the RJ plug 10 in continuity with a plurality of conductors, indicated at 382 in the sliding drawer 376A. Those skilled in the art will readily be able to arrive at numerous different structures which provide the electrical functions to be carried out by the connector housing 374A and the card body 374B using the information set forth herein and known in the industry. When the communications card 374 is not being used, all of the sliding drawers 376A–C are closed and components of the connector housing 374A are protected from damage and the overall length of the communications card 374 is preferably and substantially within the PCMCIA Type III standard. Desirably, as is the case with the other embodiments described herein, the components which carry electrical current from the communications line are shielded from contact with structures in the surrounding environment thus preventing the contacts from being inadvertently shorted together or shorted to ground or conveying current to a human being.

Figure 24A:
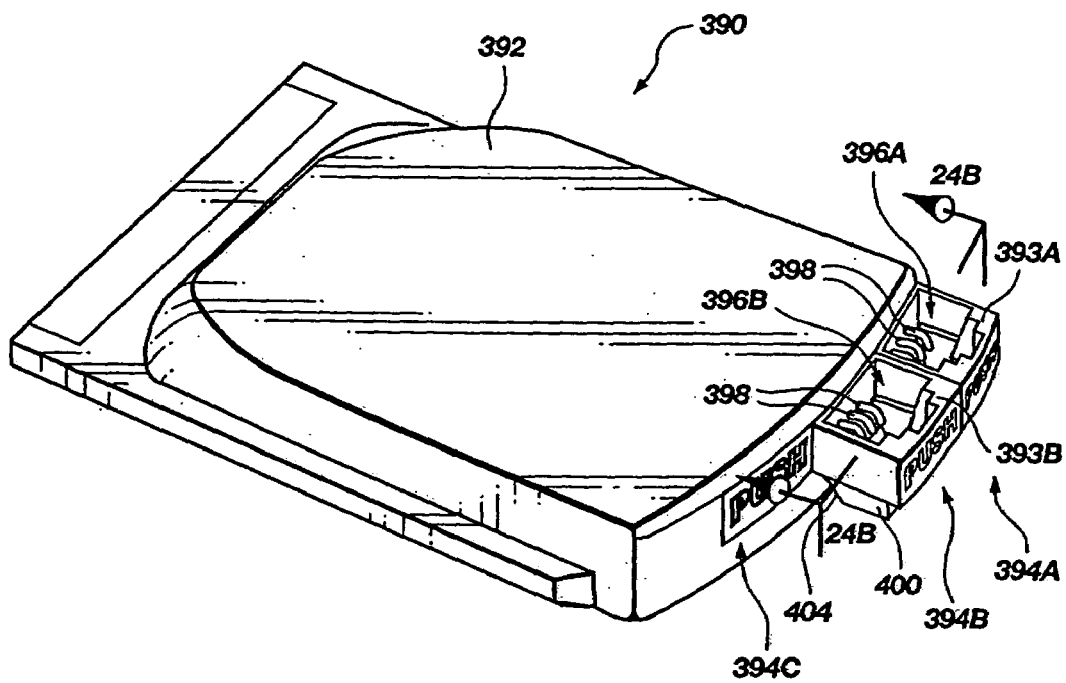
FIG. 24A is a perspective view of a communications card in accordance with the present invention having a plurality of RJ-xx series receptacles positioned in sliding drawers with each drawer provided with a movable bottom.

FIG. 24A will be referred to next to describe another communications card within the scope of the present invention, generally indicated at 390. FIG. 24A is a perspective view of the communications card 390 which includes a plurality of RJ-xx series receptacles positioned in sliding drawers, the sliding drawers being generally indicated at 394A–C, with each of the sliding drawers 394A–C being provided with a movable bottom 400 which functions to shield electrical conductors 398 from contact with the surrounding environment. A card body 392 preferably includes the components necessary to provide the communications functions which are desired by the user and which can be arrived at by those skilled in the art using the information set forth herein and using the information readily available in the industry.

Figure 24B:
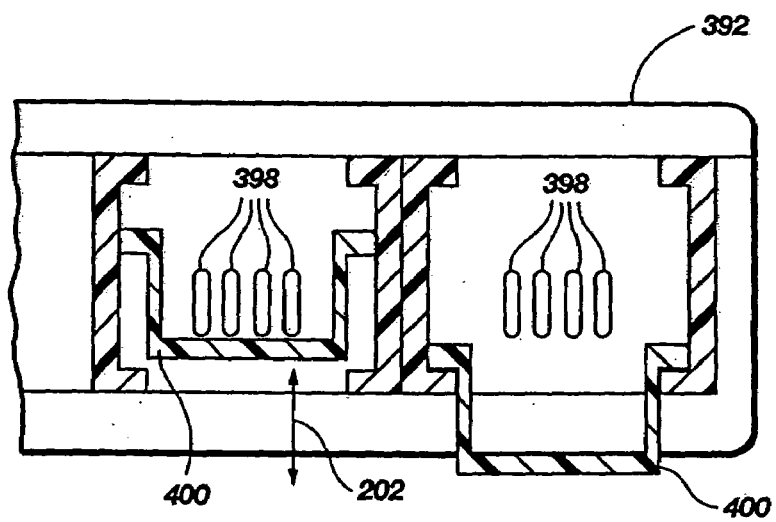
FIG. 24B is a cross sectional view taken along line 24B—24B of FIG. 24A.

As shown best in FIG. 24B, which is a cross sectional view taken along line 24B—24B of FIG. 24A, the structure of the sliding drawers 394A–C each include a movable bottom 400. FIG. 24B shows the movement in the direction of arrow 402 of the movable bottom 400 to shield the electrical conductors 398 when there is no RJ plug present and the position of the movable bottom 400 when an RJ plug is received into the recess, two of which are indicated at 396A&B in FIG. 24A, when an RJ plug is received therein.

As will be appreciated from an examination of FIG. 24A, the recesses 396A&B include structures, such as ledges 393A&B, to engage the biased clip of the RJ plug. Also as shown in FIG. 24A, the moveable bottom 400 preferably includes a bevel 404 to urge the movable bottom 400 in an upward position when the sliding drawers 394A–C are moved into their retracted position.

Figure 25:
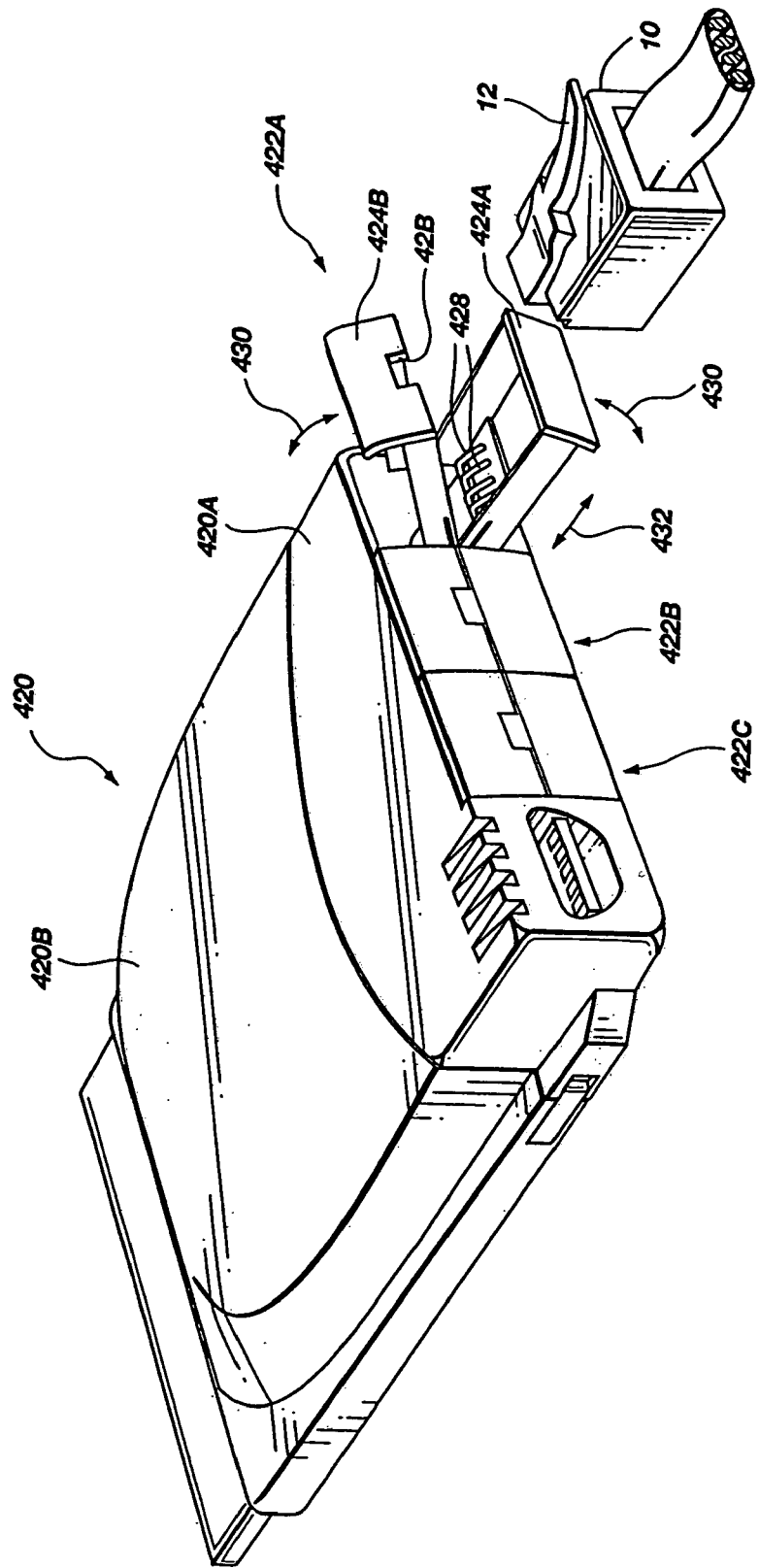
FIG. 25 is a perspective view of a communications card in accordance with the present invention having a plurality of RJ-xx series receptacles each including a pair of retractable expanding jaws.

Reference will next be made to FIG. 25. FIG. 25 is a perspective view of a further communications card, generally indicated at 420, in accordance with the present invention. The communications card 420 includes a plurality of RJ-xx receptacles, generally indicated at 422A–C, each formed by a pair of retractable and expanding jaws, two of which are represented at 424A&B. When in the retracted position, as shown with RJ-xx receptacles 422B&C, the communications card po420 (including card body 420B and connector housing 420A) substantially complies with the dimension requirements of the PCMCIA Type III standard. Included in the connector housing 420A are the structures which allow the jaws 424A&B to be extended out of and retracted into the connector housing 351A in the directions of arrow 432 and also to pivot in the directions of arrows 430 as well as to bias the jaws 424A&B toward each other.

An RJ plug 10 represented in FIG. 25 is received into the receptacle 422A formed by the jaws 424A&B by manually separating the jaws 424A&B and inserting the RJ plug 10 between the jaws 424A&B. The jaws 424A&B are biased toward each other thus capturing the RJ plug 10 therein and holding the electrical contacts of the RJ plug 10 in continuity with the conductors, one of which is represented at 428, in the jaw 424A. A ledge 426 engages the biased clip on the RJ plug 10 to further secure the RJ plug 10 in position in the jaws 424A&B. The structures represented in FIG. 25 provide that the RJ plug 10 and the communications card 420 can be easily connected and disconnected and that the internal components of the communications card 420, including the conductors 428, are shielded from the surrounding environment.

Figure 26A:
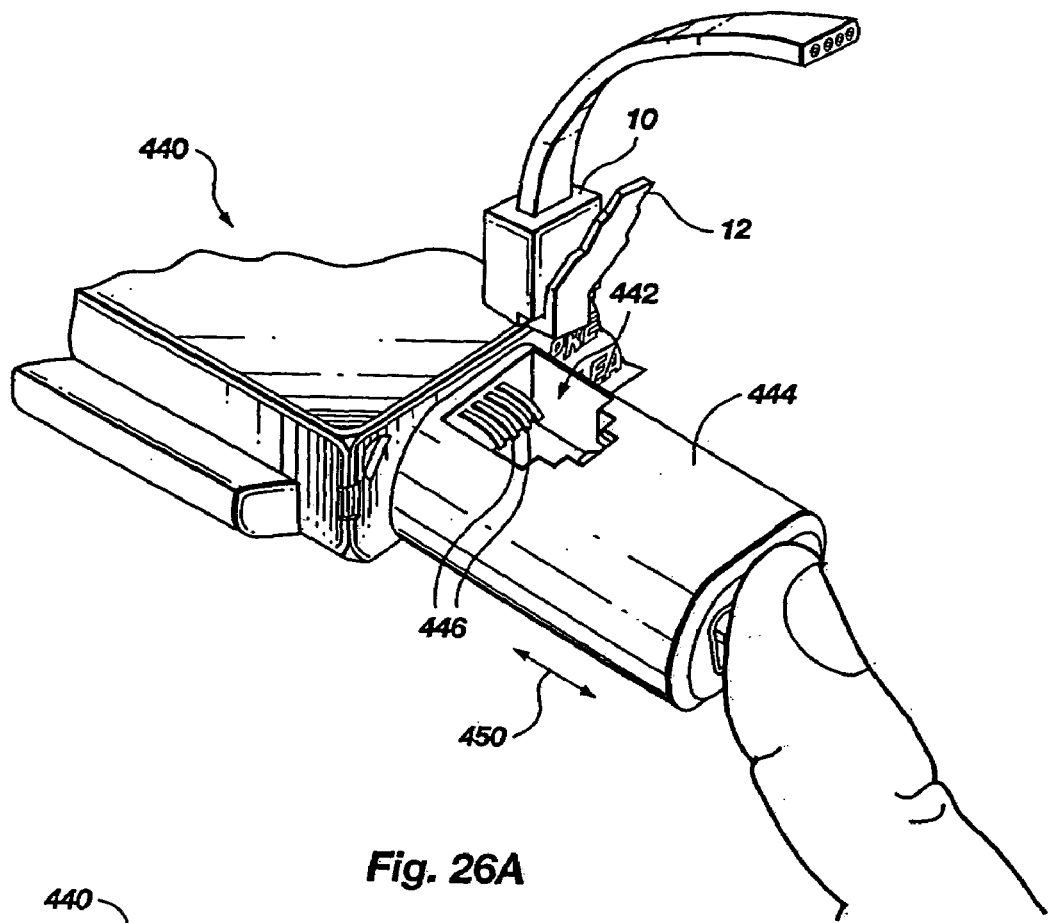
FIG. 26A is a partial perspective view of a communications card in accordance with the present invention having two different connector receptacles positioned on a retractable member shown in an extended position.
Figure 26B:
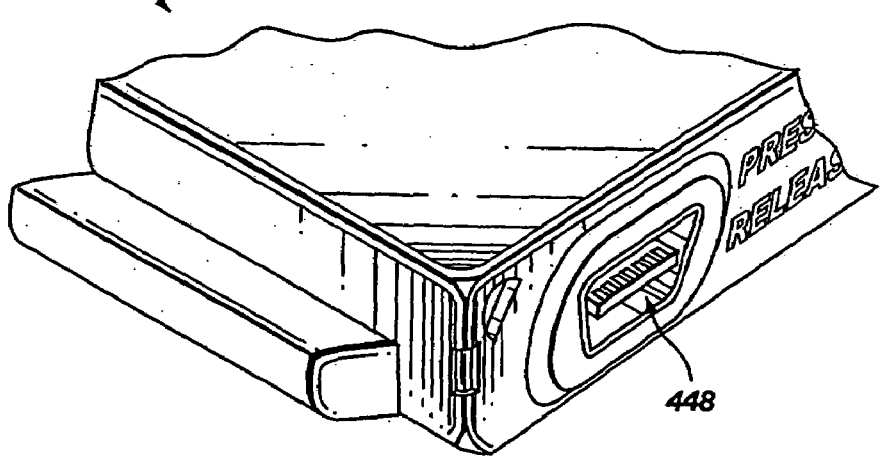
FIG. 26B is a partial perspective view of the communications card represented in FIG. 26A with the retractable member shown in a retracted position.

FIG. 26A is a partial perspective view of a communications card generally indicated at 440 which includes two different connectors, an RJ-xx series receptacle generally indicated at 442 and an auxiliary connector, generally indicated at 448, which preferably can be a connector suitable for coupling to a wireless communications device, for example a portable telecommunications device which complies with the GSM communications standard, both of which are positioned on a retractable/extendable member 444. The retractable/extendable member 444 is shown in an extended position in FIG. 26A and is shown in a retracted position in FIG. 26B. Those skilled in the art can readily arrive at the structures included in the communications card 440 needed to implement the extension and retraction functions of the member 444. The electrical connections included in the communications card 440 can be readily arrived at using the information set forth herein and using the information well-¼known in the industry.

Figure 27:
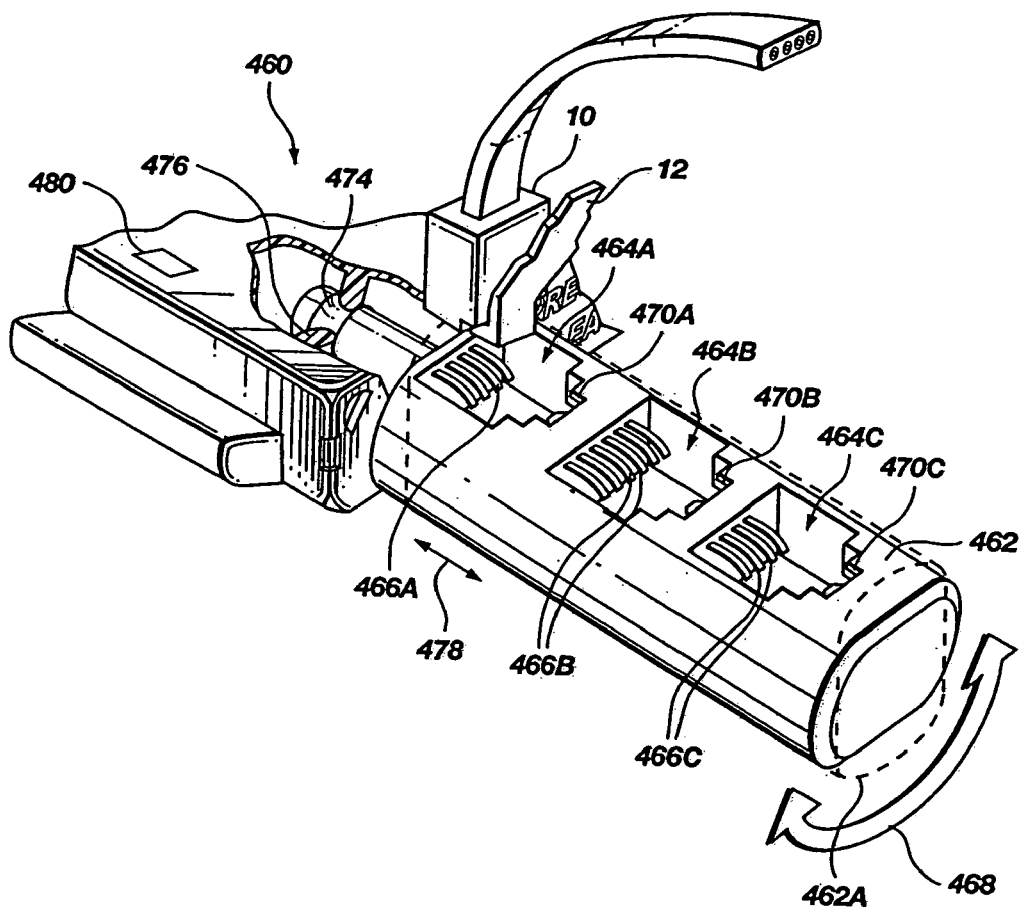
FIG. 27 is a partial perspective view of a communications card in accordance with the present invention having three RJ-xx series receptacles positioned on a rotatable and retractable member shown in an extended position.

Reference will next be made to FIG. 27. FIG. 27 is a partial perspective view of a communications card, generally indicated at 460, in accordance with the present invention. The communications card 460 includes a rotatable and retractable member 462. The rotatable and retractable member 462 includes three RJ-xx series receptacles, generally p0indicated at 464A–C. The RJ-xx series receptacles 464A–C each include conductors, some of which are indicated at 466A–C, which receive corresponding contacts in the RJ plug 10. Each of the RJ-xx series receptacles 464A–C include a ledge 470A–C which engage the biased clip on the RJ plug with the dimensions of the RJ-xx series receptacles 464A–C being such that the appropriate RJ plug is closely received therein, as is preferred with all of the communications cards described herein. Moreover, as with the other communications cards described herein, the RJ-xx series receptacles 464A–C can be fabricated to receive any appropriate RJ-xx series plugs, for example receptacles 464A and 454C preferably receiving an RJ-11 plug and receptacle 464B preferably receiving an RJ-45 plug.

The rotatable and retractable member 462 rotates in the directions of arrow 468 such that after one or more RJ plugs have been operatively received therein the cords extending from the RJ plug can be oriented in a direction which is 90° (as represented in phantom image at 462A), 180°, 270°, or some intermediate orientation, from the orientation illustrated in FIG. 27. One preferred structure to provide for rotation of the rotatable and retractable member 462 is represented by the post 472 with a groove 474 which is engaged by ring 476. The structures which maintain electrical continuity between the components housed within the communications card 460 are represented at 480 with the structures which provide for the retraction/extension of the rotatable and retractable member 462 are represented at 482, all of which can be readily arrived at using information set forth herein and well-known in the industry. As is the case with many of the embodiments described herein, the features represented in the embodiment of FIG. 27 can be implemented in many different platforms, for example PCMCIA Type II and III PC Cards, as well as other platforms known in the industry.

Figure 28:
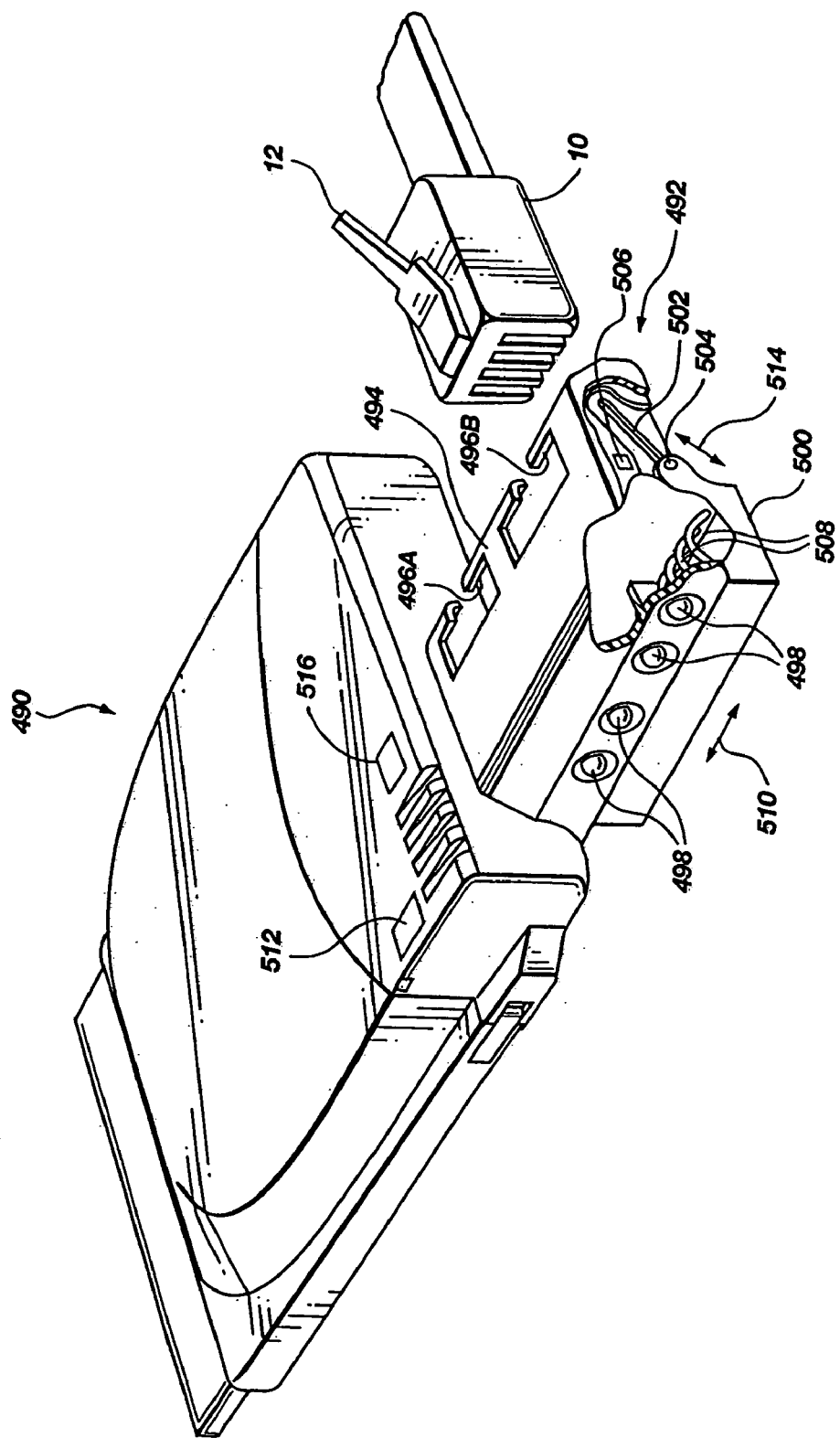
FIG. 28 is a perspective view of a communications card in accordance with the present invention having two RJ-xx series receptacles positioned in a retractable shell member shown in an extended position.

Reference will next be made to FIG. 28 which is a perspective view of a communications card, generally indicated at 490, having two RJ-xx series receptacles positioned in a retractable shell, generally indicated at 492. The retractable shell 492 comprises an upper member 494 and a lower member 500. The lower member 500 is slidably joined to the upper member 494 by a pin 504 resting within a slot 502 which allows the lower member to slide in the directions of arrow 514. The lower member 500 is biased toward the upper member 494 by the structures represented at 506. When an RJ plug is inserted between the upper member 494 and the lower member 500, such that the biased clip on the RJ plug 10 is received by one of the receivers 496A or 496B, the lower member 500 pushes the RJ plug 10 towards the upper member 494 and makes operative contact between the conductors 508 and the corresponding contacts provided in the RJ plug 10.

Provided on the upper member 494 are a plurality of visual indicators 498 which provide an indication of the operation of the communication card 490. The structures which allow the retractable shell 492 to extend and retract in the directions of arrow 510 are represented at 512 with the structures which maintain the necessary electrical coupling being represented at 516. The retractable shell 492 provides for convenient and secure connection to two RJ plugs in accordance with the present invention.

Figure 29A:
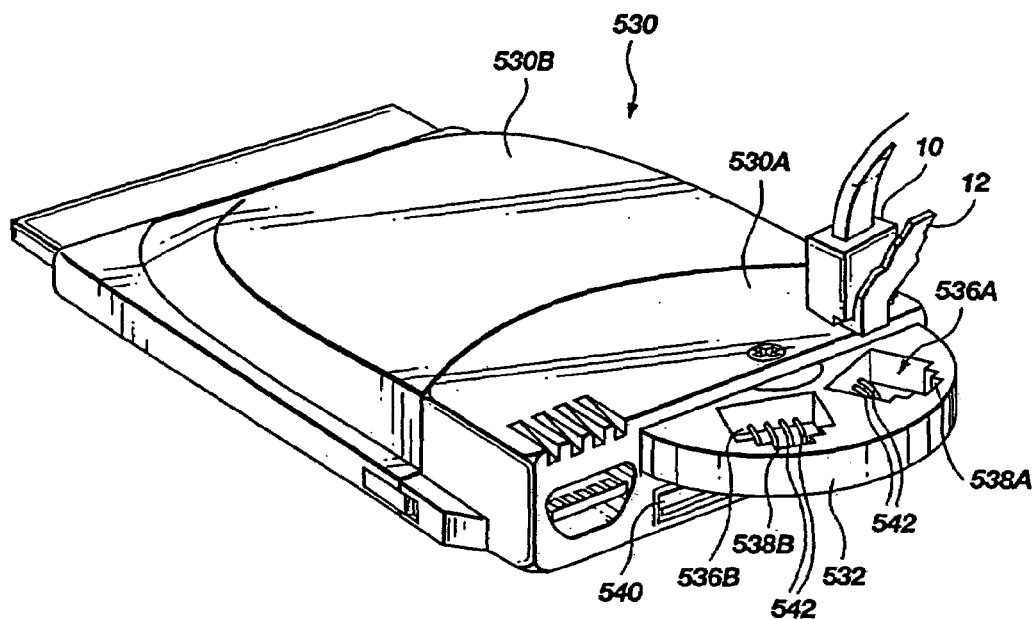
FIGS. 29A&B are a perspective view and a top view, respectively, of a communications card in accordance with the present invention having two RJ-xx series receptacles positioned on a pivoting and retractable member shown in an extended position.
Figure 29B:
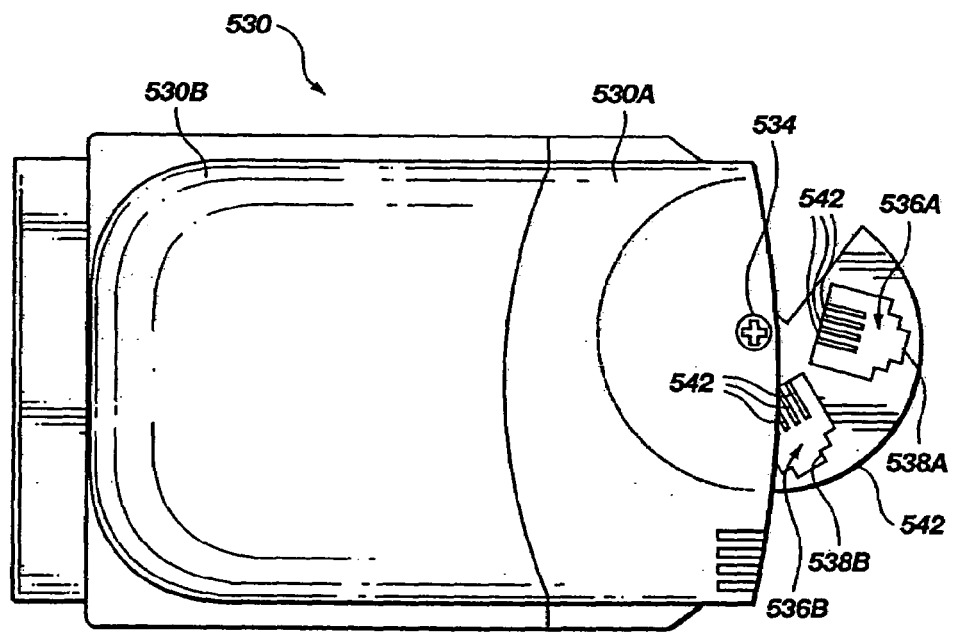

FIGS. 29A&B will be referred to next. FIGS. 29A and 29B are a perspective view and a top view, respectively, of another communications card, generally indicated at 530, in accordance with the present invention. The communications card 530 preferably follows the PCMCIA (also referred to as PC Card) Type III standard for dimensions and configuration and includes a card body 530B and a connector housing 530A. The connector housing 530A includes an auxiliary connector, generally indicated at 544, and an auxiliary slot 540 which can operatively receive a memory card, such as a compact flash memory card, as known in the industry. Further information regarding memory cards adhering to the Compact Flash standard, and to the Miniature Card standard can be obtained from the URLs http://www.mcif.org/spel_ 1.pdf and http://www.mcif.org/mspec_1.pdf and http://www.compactflash.org/, the information contained in all of these URLs as well as the information contained in all links available at such URLs as of the filing date of this application are now incorporated by reference herein in their entireties. The cards adhering to the Compact Flash standard and to the Miniature Card standard are examples of preferred memory cards for use with the present invention.

As represented in FIGS. 29A&B, a receptacle body 532 which is preferably and substantially semicircular in shape, is provided with two recesses 536A&B which each receive an RJ plug 10. The recesses 536A&B each include a ledge 538A&B such that the conductors 542 disposed in the recesses 536A&B can make operative connection with the RJ plug 10.

The receptacle body 532 is preferably semicircular in shape and pivots about a bolt 534. The bolt 534 allows the receptacle body 532 to be rotated in the directions of arrow 546 to an extended position as illustrated in FIGS. 29A&B. In its extended position, the receptacle body 532 allows access to the recesses 536A&B. The communications card 530 allows convenient connection to a communications line via an RJ plug 10 and operative connection to a memory card via the slot 540.

Figure 30A:
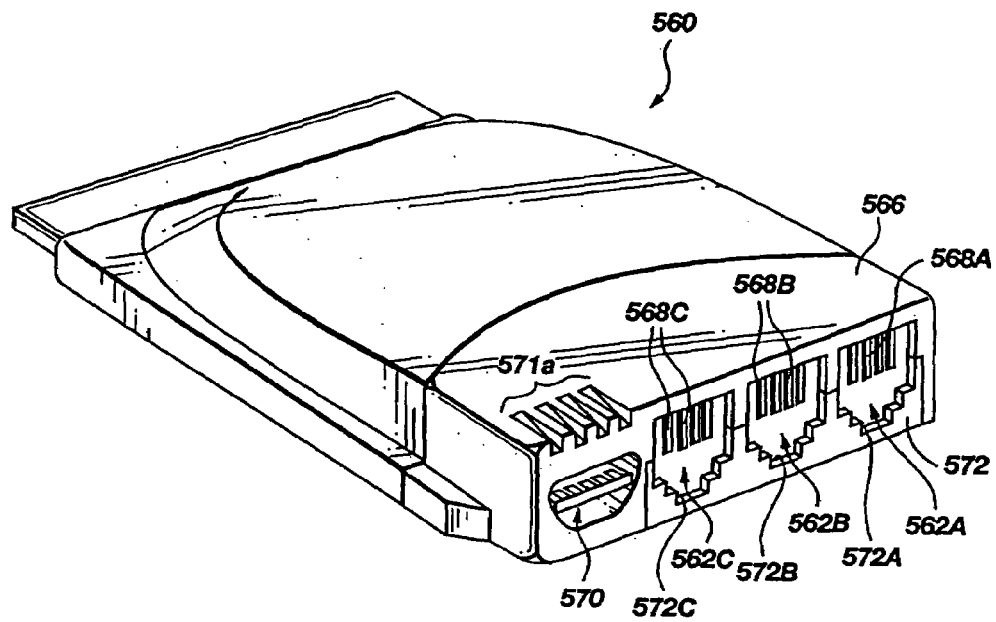
FIGS. 30A&B are perspective views of a communications card in accordance with the present invention including three RJ-xx series receptacles positioned on an end of the communications card with a shell member shown in a compact configuration in FIG. 30A and shown in a an extended configuration in FIG. 30B ready to receive one, two, or three RJ-xx series plugs.
Figure 30B:
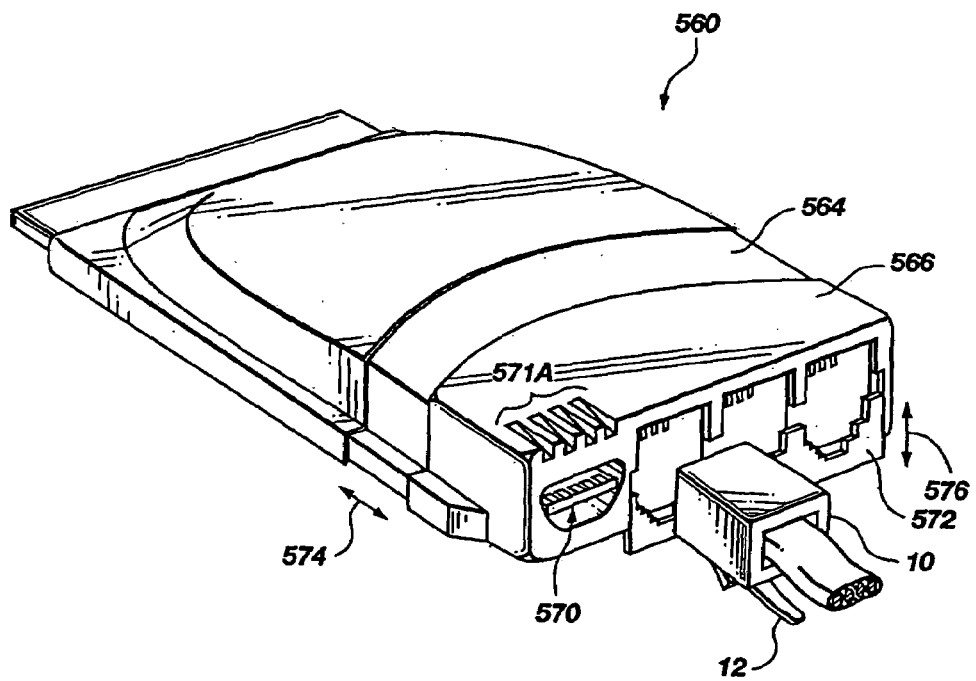
FIGS. 30 C–G provide various perspective views of the receptacles of FIG. 30.
Figure 30E:
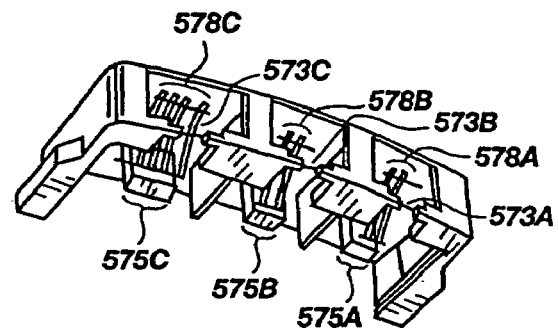
Figure 30D:
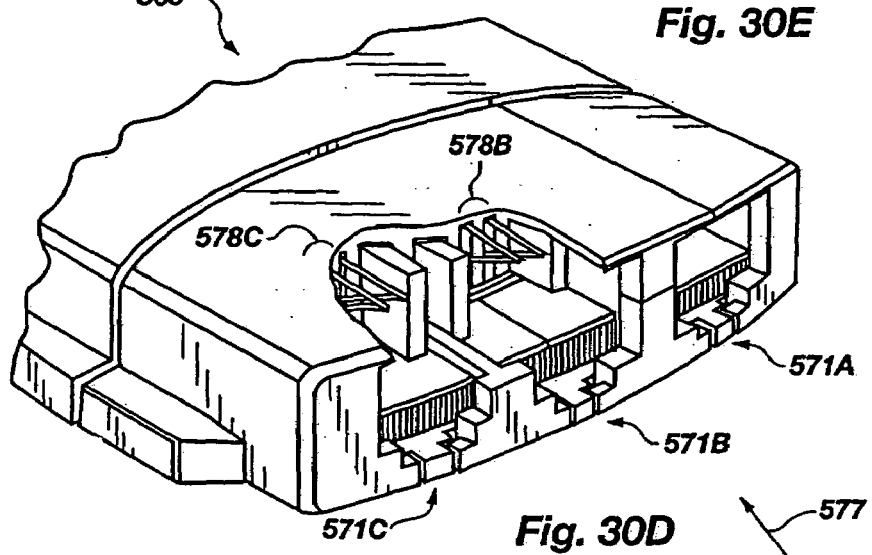
Figure 30F:
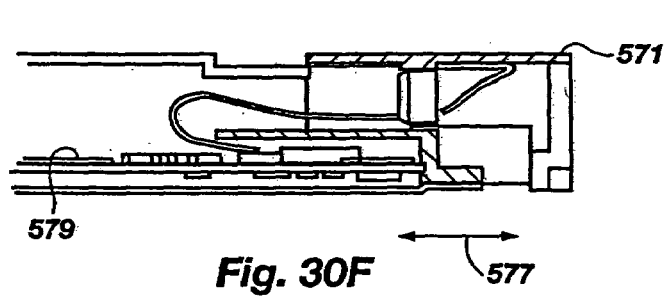
Figure 30G:
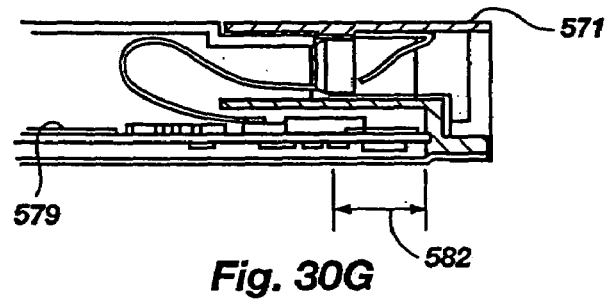

Reference will next be made to FIGS. 30A&B which are perspective views of a communications card, generally indicated at 560, in accordance another aspect the present invention. The communications card 560 includes three RJ-xx series receptacles, each generally indicated at 562A–C, positioned on an end of the communications card 560. As shown best in FIG. 30B, a shell member 566 is extended from a card body 564 as indicated by arrow 574. When the shell member 566 is in the retracted position represented in FIG. 30A, the length of the communications card substantially conforms to the PCMCIA Type III standard. Also illustrated in FIG. 30A are a plurality of contacts 568A–C which are connected to the card body 564 and which make electrical connection with corresponding contacts in the RJ plug 10 (FIG. 30B). When the shell member 566 is in the extended position represented in FIG. 30B, a clip capture member 572 is dropped into the position indicated in FIG. 30B. The clip capture member 572 moves in the directions of arrow 576. When the clip capture member 572 is in its upper position (as represented in FIG. 30A), the communications card 560 substantially conforms to the PCMCIA thickness standard. When the clip capture member 572 is in its lower position (as represented in FIG. 30B), the RJ plug 10 can be received therein. With the shell member 566 in its extended position (FIG. 30B), the contacts provided on the RJ plug 10 impinge upon the corresponding conductors 568C when the RJ plug 10 is inserted into one of the receptacles 562A–C. The communications card 560 is another example of the present invention which provides a convenient connection to one or more RJ plugs which substantially complies the PCMCIA physical dimension standard when not in use, which does not require any additional proprietary cords or connectors to make the necessary connections, and which shields electrical conductors from the surrounding environment.

Figure 31A:
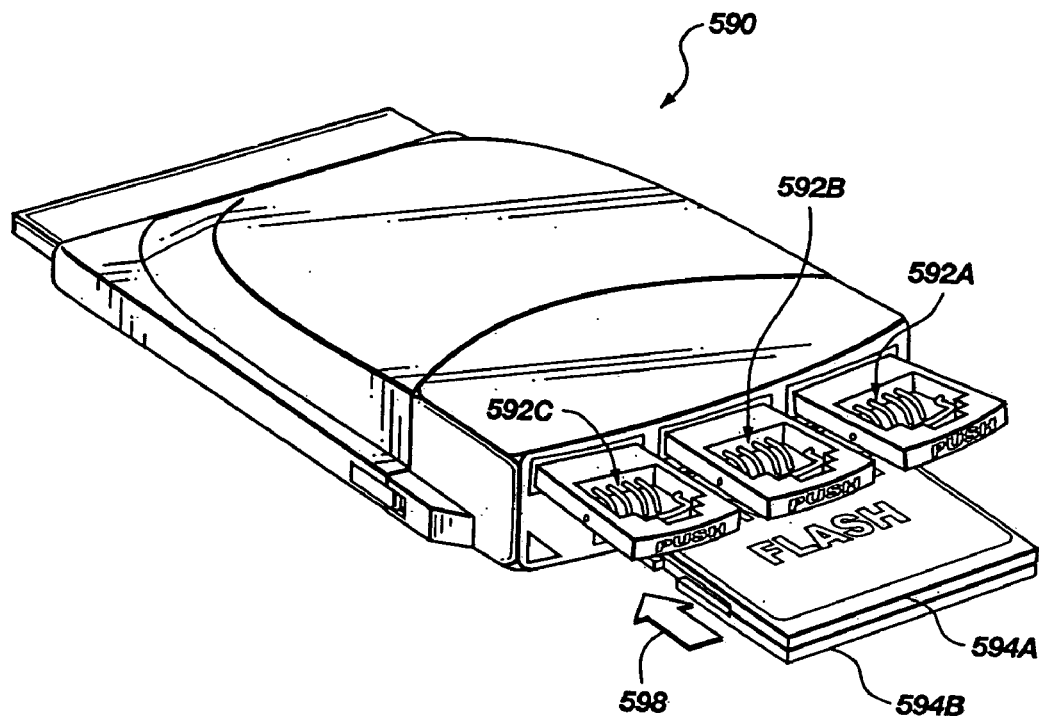
FIGS. 31A&B are perspective views of a communications card in accordance with the present invention including three RJ-xx series receptacles and a memory card operatively and removably received into the communications card.
Figure 31B:
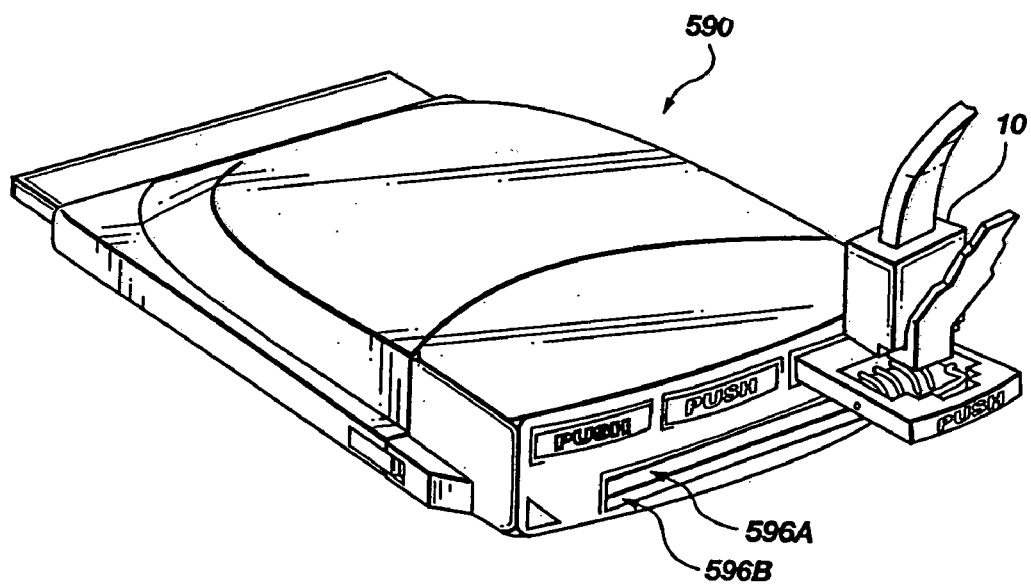

Reference will next be made to FIGS. 31A&B. FIGS. 31A&B are perspective views of a communications card 590 including three RJ-xx series receptacles, generally indicated at 592A–C, and memory card slots, generally indicted at 596A&B which operatively and removably receive memory cards 594A&B, respectively, in the direction of arrow. Those skilled in the art can readily arrive at the necessary hardware and software needed to make an operative connection with the memory cards 596A&B.

Figure 32A:
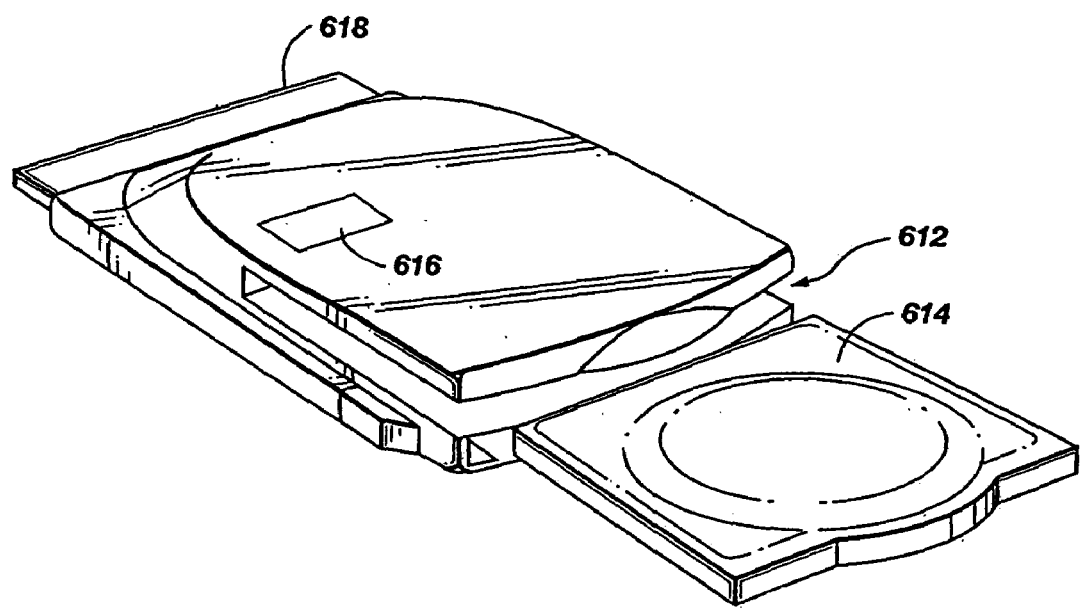
FIGS. 32A&B are perspective views of a PC card in accordance with the present invention which operatively receives a magnetic disk storage medium.
Figure 32B:
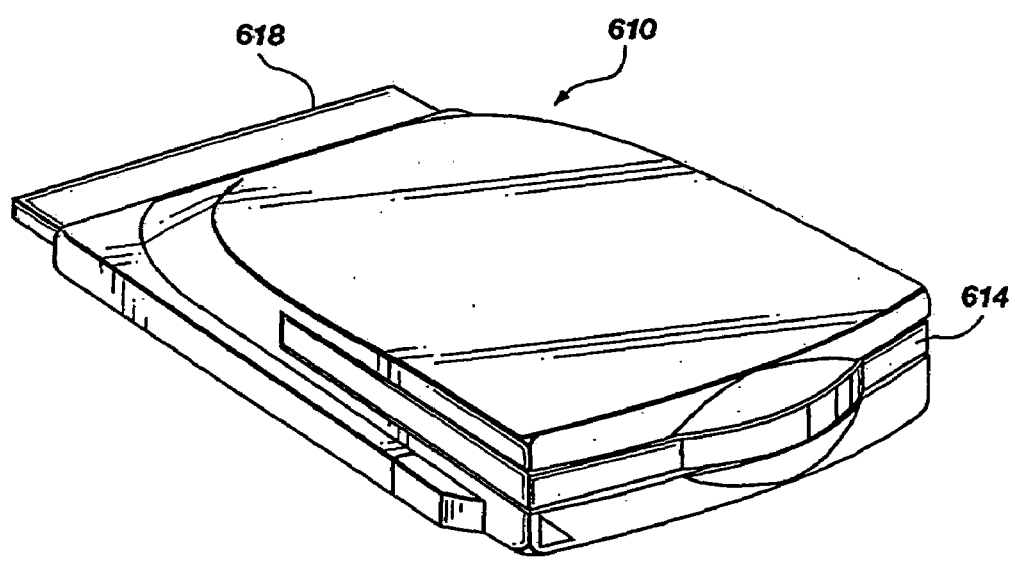

FIGS. 32A&B are perspective views of a PC card 610 which operatively receives a magnetic disk storage medium 614 in a slot 614. When inserted into a PC card slot on a computing device so that a front end 618 engages a PC card socket, the internal components, represented at 616, of the PC card 610 provide for data transfer between the PC card 610 (and thus the computing device) and the magnetic disk storage medium 614. It will be appreciated that the optical storage medium can be used in the place of the magnetic disk storage medium.

One example of the magnetic disk storage medium 614 is the disks used in the clik!™ drive which has been announced by Iomega. Current specifications designate that clik!™ disks (cartridges) will be about 2.16 inches by about 1.98 inches by about 0.077 inches and which hold 40 MB of data and which are suited for applications which currently require flash memory cards. The clik!™ disks and drive are particularly suited for inclusion in miniature apparatus such as Personal Digital Assistants (PDAs) and other miniature digital electronic devices. Further information regarding the clik!™ disk can be p0obtained from the URL http://www.iomega.com/product/clik and the information contained at the URL and the information contained in all links available at such URL as well as the information contained in all links available at such URL as of the filing date of this application is now incorporated by reference herein in their entireties.

Figure 33:
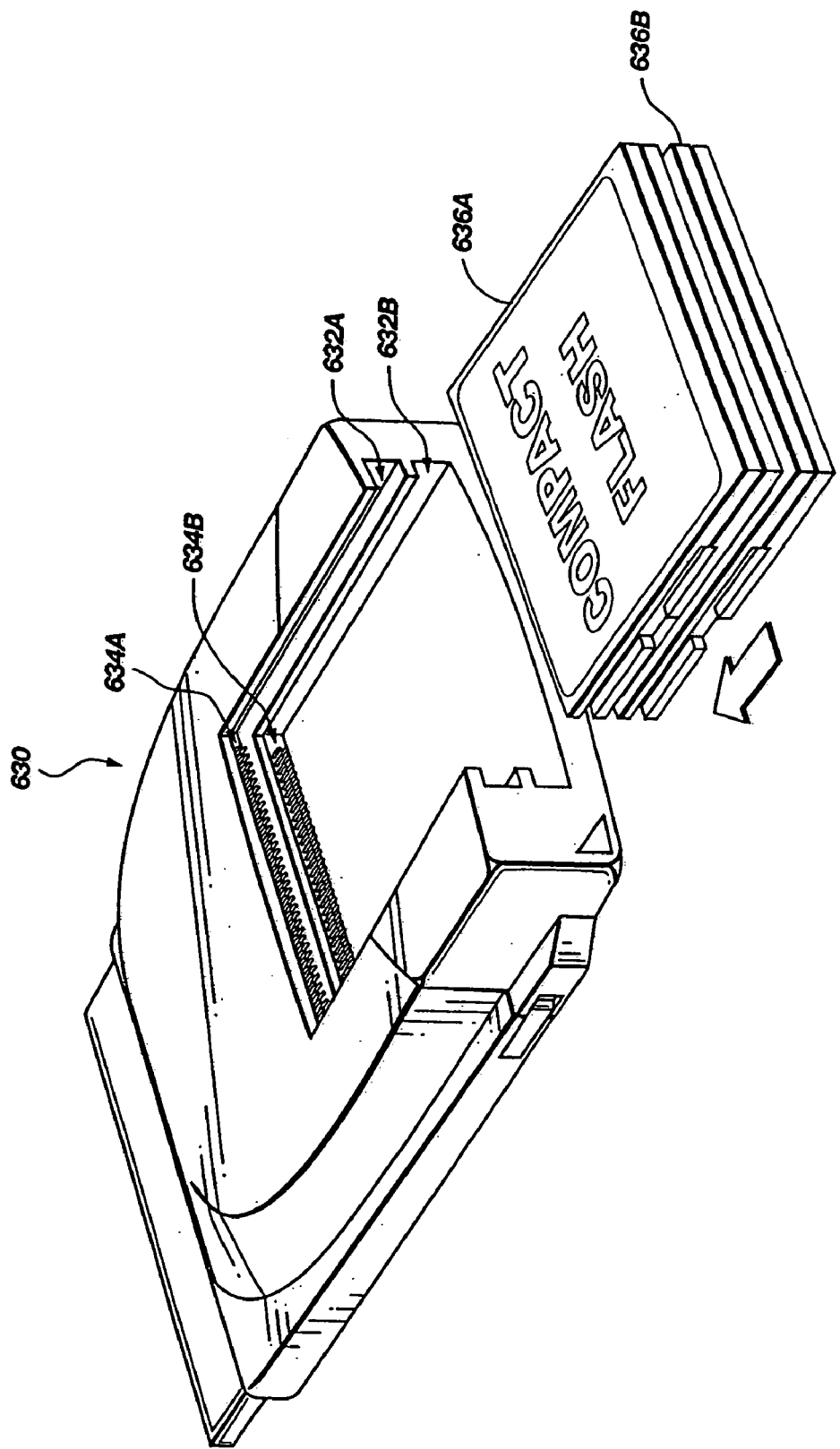
FIG. 33 is a perspective view of a PC card in accordance with the present invention including two memory cards which are operatively received into the PC card.

Reference will next be made to FIG. 33 which is a perspective view of a PC card, generally indicated at 630, which includes a first slot, generally indicated at 632A, and a second slot, generally indicated at 632B, each which operatively receive a memory cards, 636A and 636B, respectively. The slots 632A and 632B are each provided with a set of connector pins 634A and 634B which are arranged in accordance with a memory card standard. Internal to the PC card 630 are the components needed to interface both memory cards 636A&B to a computing device into which the PC card 630 is inserted. The PC Card 630 preferably adheres to the PCMCIA Type III standard and desirably allows two memory cards to be simultaneously interfaced with a computing device. Using the information contained herein, those skilled in the industry will readily arrive at the hardware and software necessary to convey data between a computing device in which the PC Card 630 is inserted and one or both memory cards 636A&B.

Figure 34A:
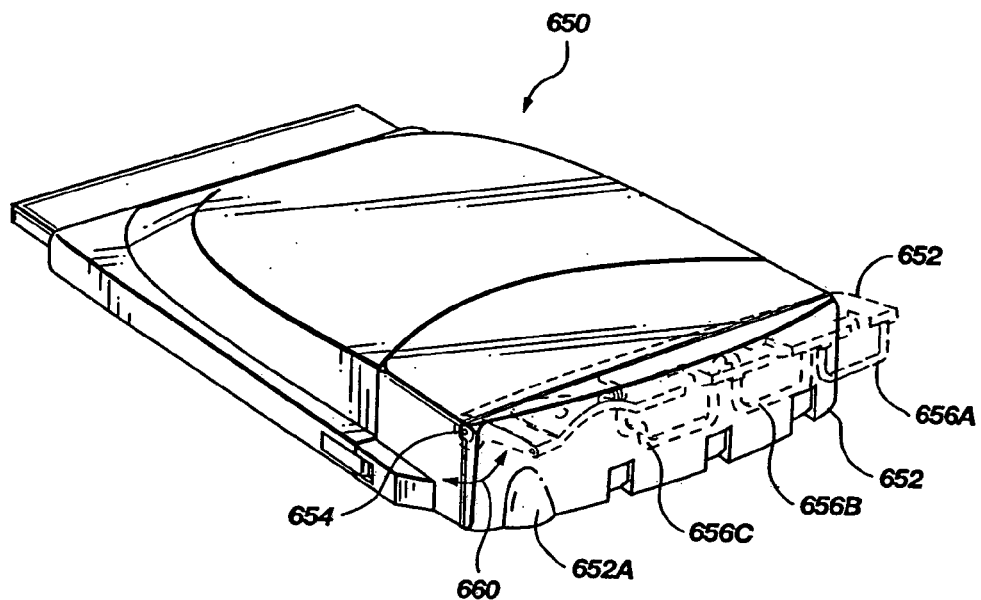
FIG. 34A is a perspective view of a communications card in accordance with the present invention including three RJ-xx series receptacles positioned on an end of the communications card with retracting bails, shown in phantom image, which individually hold an RJ-xx series plug in an operative position.
Figure 34B:
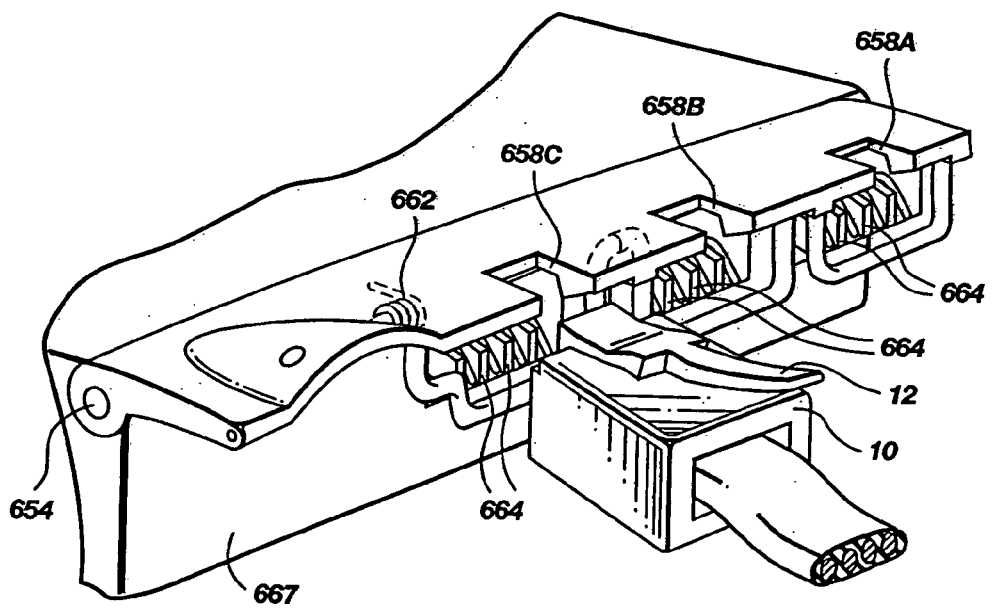
FIG. 34B is a detailed perspective view of the operative structures represented in FIG. 34A.

Reference will next be made to FIGS. 34A&B which are a perspective view and a detailed perspective view, respectively, of a communications card generally indicated at 650. The communications card 350 can simultaneously receive up to three RJ plugs, such as the RJ plug 10 represented in FIG. 34B. As shown best in FIG. 34A, a cover 652 is provided with a finger pull 652A and the cover 652 pivots about an axis 654 in the directions of arrow 660 and as shown by the phantom image. When the cover 652 is moved to its open position represented in FIG. 34B, three sets of conductors 664 are exposed. The sets of conductors 664 are arranged to correspond to the contacts provided in the RJ plug 10. With the cover 652 in the position represented in FIG. 34B, a plurality of plug bails 656A–C are lowered to the position shown in FIG. 34B. The bails 656A–C are biased in an upward direction by spring 662. When an RJ plug 10 is inserted into one of the bails 656A–C, the biased clip 12 engages a ledge 658A–C so that the RJ plug 10 is operatively held in place and signals can be passed between the RJ plug and the communication card 650. The communication card 650 allows more than one RJ plug to be simultaneously and conveniently connected to a computing device.

Figure 35:
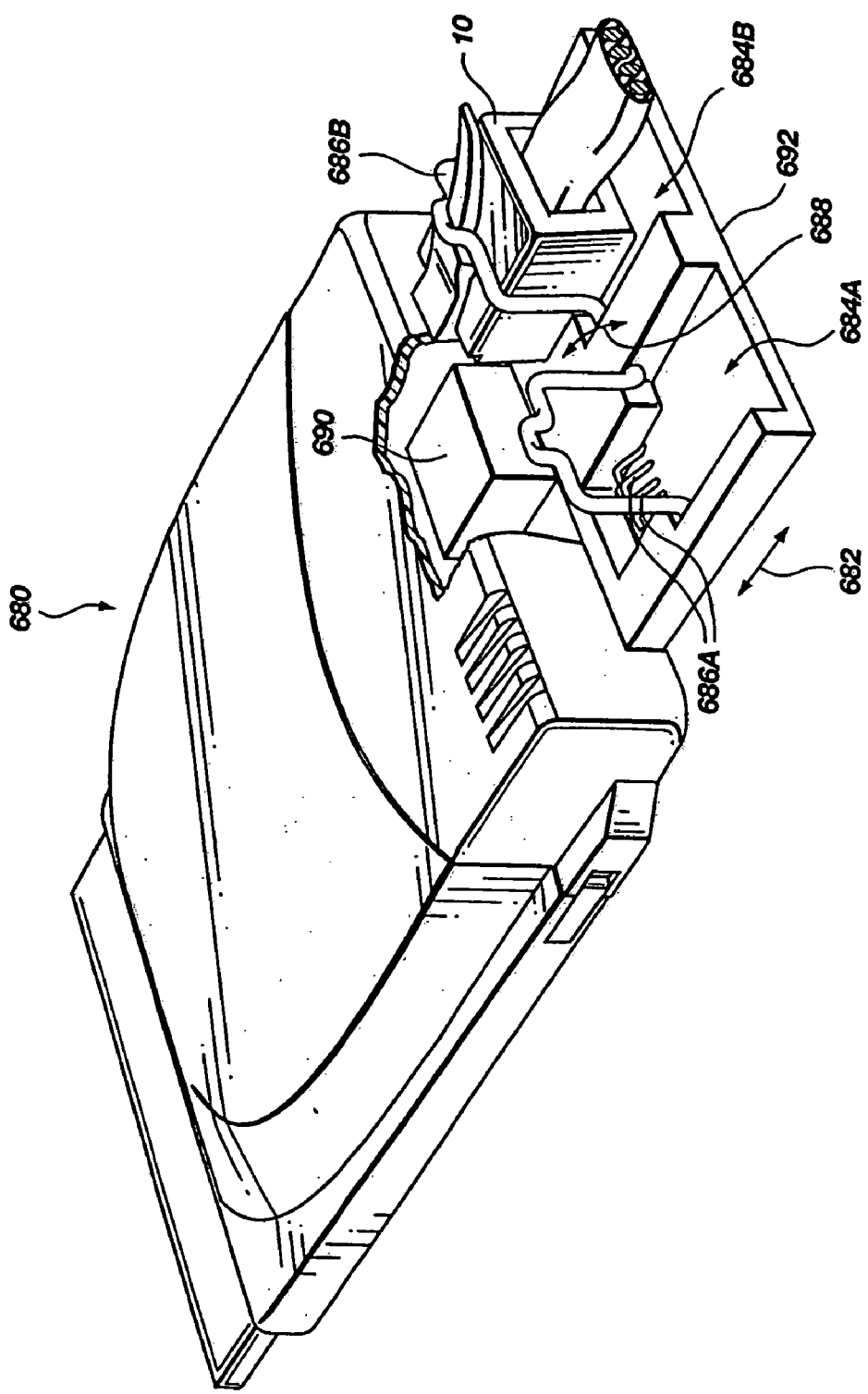
FIG. 35 is a perspective view of a communications card in accordance with the present invention which includes a retractable member providing two RJ-xx series receivers with pivoting bails which hold respective RJ-xx series plugs in operative positions.
Figure 35A:
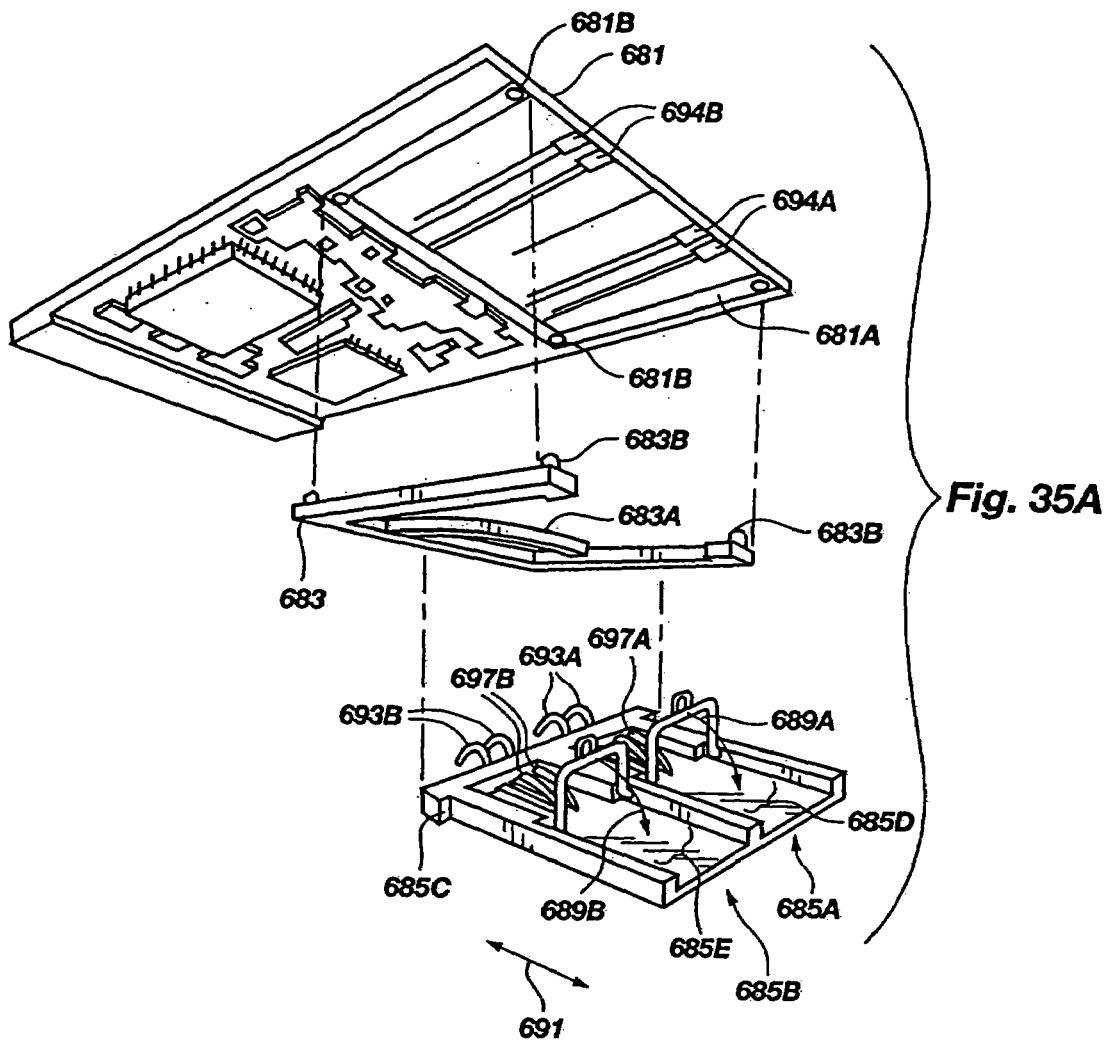
Figure 35B:
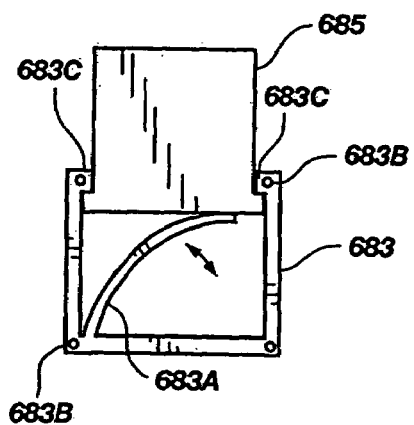
Figure 35C:
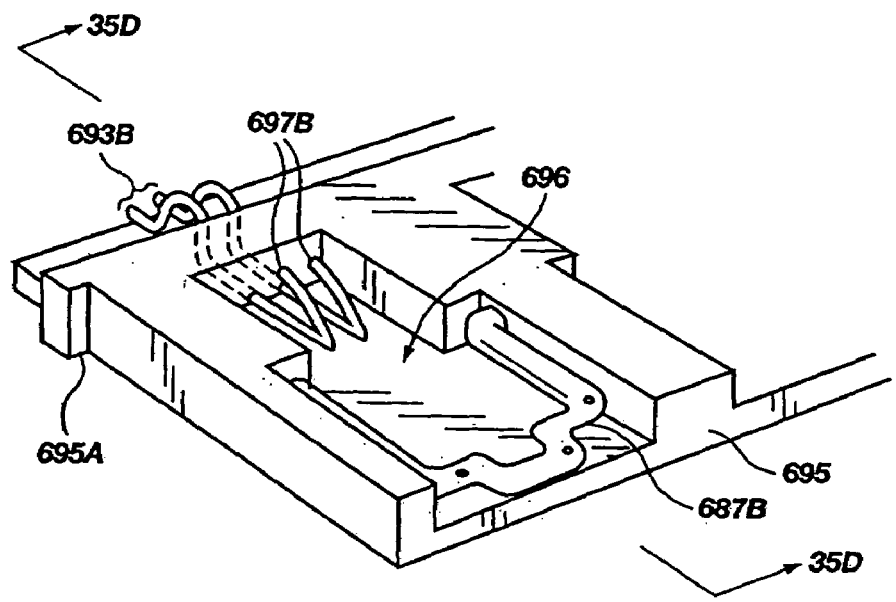
Figure 35D:
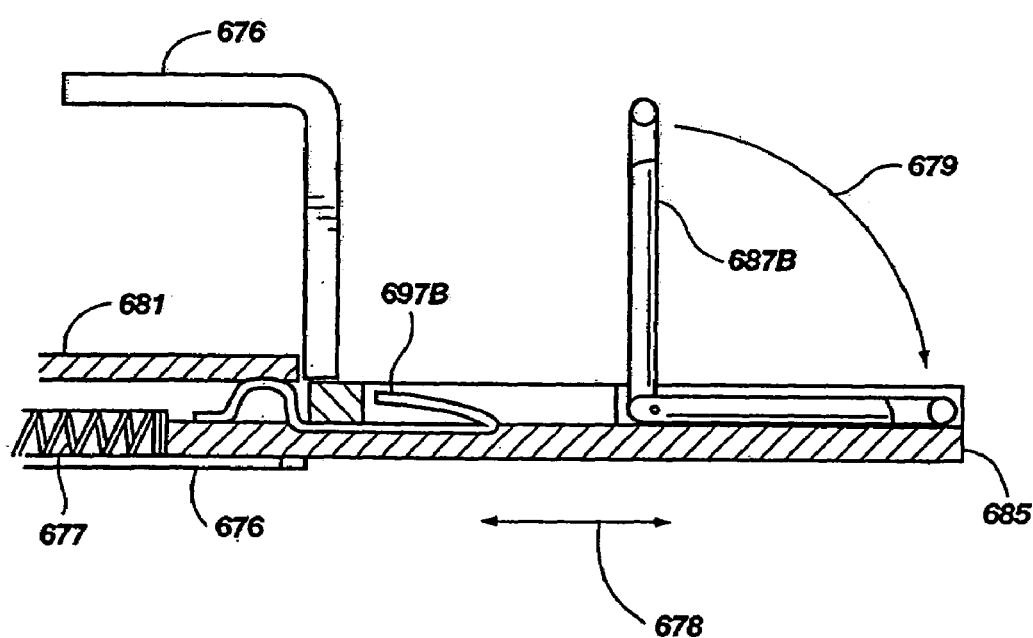

Reference will next be made to FIG. 35 which is a perspective view of a communications card, generally indicated at 680, in accordance with the present invention. The communications card 680 includes a retractable receiver member 692 which provides two RJ-xx series receivers, generally indicated at 684A&B. Each of the receivers 684A&B are provided with pivoting bails 686A&B which pivot in the directions of arrow 688. The pivoting bails 686A&B, when in the position represented in FIG. 35, engage the biased clip and the body of the RJ plug and hold the RJ plug in an operative position so that the conductors, one set of which is represented at 686A, engage the corresponding contacts provided on the RJ plug. The receiver member 692 retracts into, and extends from, the communications card 680 in the directions of arrow 682. The components housed within the communications card 680 which allow electrical continuity to be maintained with the conductors 686A as the receiver member is retracted and extended are represented at box 690.

In view of the foregoing, it will be appreciated that the present invention provides many different communications line receptacles for use with a miniaturized communications device wherein the electrical contacts are shielded from the surrounding environment and which is resistant to breakage and which can be moved out of the way when not being used. The present invention also provides communications line receptacles which are easily replaceable if broken. The present invention also provides communications cards which can be readily adapted to meet various communications standards and which can provide wireless communications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A device comprising:
   a card body;
   a receptacle module to interface with a communications line, the receptacle module having a portion for removable insertion into the card body to form a unitary module; and
   an overall length of the unitary module, in a configuration, that is within the PCMCIA Type III standard.

2. The device of claim 1, wherein the receptacle module comprises a recess to receive a plug of the communications line.

3. The device of claim 2, wherein the recess is to receive an RJ-xx series plug.

4. The device of claim 3, wherein the RJ-xx series plug is selected from the group consisting of an RJ-11, RJ-12, and an RJ-45 plug.

5. The device of claim 2, wherein the receptacle module further comprises first and second electrical conductors provided in each of the recesses, the first and second electrical conductor positioned to make electrical continuity with the first and second electrical contacts in the plug when the plug is received by the recess.

6. The device of claim 1, wherein the receptacle module comprises two recesses to receive two plugs.

7. The device of claim 1, wherein the card body comprises a PCMCIA compliant card body.

8. The device of claim 7, wherein the card body comprises a Type III PCMCIA compliant card body.

9. The device of claim 2, wherein the receptacle module comprises a pivoting cover to mask the recess when the pivoting cover is in a closed position, and to expose the recess when the pivoting cover is in an open position.

10. The device of claim 2, wherein the receptacle module comprises an auxiliary connector, the auxiliary connector to connect to a wireless communications device.

11. The device of claim 10, wherein the wireless communications device comprises a portable telecommunications device, the portable telecommunications device complying with the Global System for Mobile Communications standard.

12. The device of claim 1, wherein the receptacle module comprises a Direct Access Arrangement circuit.

13. The device of claim 2, wherein the receptacle module comprises a sliding drawer to mask the recess when the sliding drawer is retracted into the receptacle module, and to expose the recess when the sliding drawer is extended from the receptacle module.

14. The device of claim 1, wherein the portion of the receptacle module for removable insertion comprises a connector plug, and the card body comprises a connector receptacle, and the receptacle module is removably inserted into the card body by connecting the connector receptacle with the connector plug.

15. A device comprising:
    a card body;
    a sliding drawer moveably coupled with the card body to open and retract;
    a recess positioned in the sliding drawer to receive an RJ-xx series plug when the sliding drawer is open; and
    a moveable bottom of the sliding drawer to move downward when the sliding drawer is open to receive the RJ-xx series plug and to shield electrical conductors of the plug from a surrounding environment.

16. The device of claim 15, wherein the recess is configured for closely receiving an RJ-xx series plug.

17. The device of claim 16, wherein the RJ-xx series plug is selected from the group consisting of an RJ-11, RJ-12, and an RJ-45 plug.

18. A device comprising:
    a card body:
    a sliding drawer moveably coupled with the card body to open and retract;
    a recess positioned in the sliding drawer to receive an RJ-xx series plug when the sliding drawer is open; and
    a moveable bottom of the sliding drawer to move downward when the sliding drawer is open to receive the RJ-xx series plug and to shield electrical conductors of the plug from a surrounding environment, wherein the movable bottom comprises a bevel to urge the movable bottom in an upward position when the sliding drawer is moved into a retracted position.

19. A device comprising:
    a PCMCIA compliant card body;
    a receptacle module to interface with a communications line, the receptacle module and the card body to removably couple to form a unitary module; and an overall length of the unitary module, in a configuration, that is within the PCMCIA Type III standard.

20. The device of claim 19, wherein the receptacle module comprises a recess to receive a plug of the communications line.

21. The device of claim 20, wherein the recess comprises a recess to receive an RJ-xx series plug.

22. The device of claim 21, wherein the RJ-xx series plug is selected from the group consisting of an RJ-11, RJ-12, and an RJ-45 plug.

23. The device of claim 20, wherein the receptacle module further comprises first and second electrical conductors provided in each of the recesses, the first and second electrical conductor positioned to make electrical continuity with the first and second electrical contacts in the plug when the plug is received by the recess.

24. The device of claim 19, wherein the receptacle module comprises two recesses to receive two plugs.

25. A device comprising:
    a lap top computer having a DRAM memory and a recess;
    a card body inserted into the recess;
    a receptacle module to interface with a communications line, the receptacle module having a portion that is removably coupled with the card body to form a unitary module; and
    an overall length of the unitary module, in a configuration, that is within the PCMCIA Type III standard.

26. The device of claim 25, wherein the receptacle module comprises a pivoting cover to mask the recess when the pivoting cover is in a closed position, and to expose the recess when the pivoting cover is in an open position.

27. A device comprising:
    a lap top computer having a DRAM memory and a recess;
    a card body inserted into the recess;

a receptacle module to interface with a communications line, the receptacle module having a portion that is removably coupled with the card body to form a unitary module; and an overall length of the unitary module, in a configuration, that is within the PCMCIA Type III standard, wherein the receptacle module comprises a sliding drawer to mask the recess when the sliding drawer is retracted into the receptacle module, and to expose the recess when the sliding drawer is extended from the receptacle module.

28. The device of claim 27, wherein the sliding drawer comprises a moveable bottom to move downward when the sliding drawer is extended.

29. A device comprising:
a lap top having a DRAM memory and a recess;
a card body inserted into the recess;
a receptacle module to interface with a communications line, the receptacle module having a portion that is removably coupled with the card body to form a unitary module; and an overall length of the unitary module, in a configuration, that is within the PCMCIA Type III standard, wherein the receptacle module comprises a pair of retractable and extendable jaws to capture an RJ-xx type plug.

30. A card to be used in a data utilization device, comprising:
a pivoting cover provided on a first end of the card, the pivoting cover having an open position and a closed position;
a recess to receive an RJ-xx series plug having a biased clip within the pivoting cover if the pivoting cover is in the open position, the recess having dimensions such that the plug is closely received therein;
a first electrical conductor provided in the recess, the first electrical conductor being positioned to make electrical continuity with a first electrical contact in the plug if the plug is received by the recess;
a second electrical conductor provided in the recess, the second electrical conductor being positioned to make electrical continuity with a second electrical contact in the plug if the plug is received by the recess; and
conductors to convey an electrical signal present on the first and second electrical contacts to the data utilization device.

31. The card of claim 30, further comprising a pin about which the cover pivots.

32. The card of claim 30, wherein a width of the card substantially follows a PCMCIA standard width, and wherein in the closed position the card has a first overall length that is substantially within a PCMCIA Type III standard length, and wherein in the open position the card has a second overall length that is greater than the PCMCIA Type III standard length.

33. The card of claim 30, further comprising a card body and a removable connector housing of the card.

34. The card of claim 30, further comprising a component of the card to provide wireless communications.

35. The card of claim 30, implemented in the data utilization device, wherein the data utilization device comprises a lap top having a Flash memory and a PCMCIA slot having the card inserted therein.

36. A card to be used in a data utilization device, comprising:
a sliding drawer provided on a first end of the card, the sliding drawer having an open position and a closed position;
a recess to receive an RJ-xx series plug having a biased clip located within the sliding drawer if the sliding drawer is in the open position, the recess having dimensions such that the plug is closely received therein;
a movable bottom on the sliding drawer to move out of the sliding drawer if the plug is received into the recess;
a first electrical conductor provided in the recess, the first electrical conductor being positioned to make electrical continuity with a first electrical contact in the plug if the plug is received by the recess;
at least a second electrical conductor provided in the recess, the second electrical conductor being positioned to make electrical continuity with a second electrical contact in the plug if the plug is received by the recess; and
conductors to convey an electrical signal present on the first and second electrical contacts to the data utilization device,
wherein the moveable bottom is able to shield the first electrical contact and the second electrical contact of the plug from a surrounding environment.

37. The card of claim 36, further comprising a bevel to urge the moveable bottom upward if the sliding drawer is moved to the closed position.

38. The card of claim 36, wherein a width of the card substantially follows a PCMCIA standard width, and wherein in the closed position the card has a first overall length that is substantially within a PCMCIA Type III standard length, and
wherein in the open position the card has a second overall length that is greater than the PCMCIA Type III standard length.

39. The card of claim 36, further comprising structure of the sliding drawers to hold the plug in an angular orientation.

40. The card of claim 36, further comprising a card body and a removable connector housing of the card.

41. The card of claim 36, further comprising a component of the card to provide wireless communications.

42. The card of claim 36, implemented in the data utilization device, wherein the data utilization device comprises a lap top having a Flash memory and a PCMCIA slot having the card inserted therein.

* * * * *